(12) United States Patent
Mokuya et al.

(10) Patent No.: US 7,710,997 B2
(45) Date of Patent: May 4, 2010

(54) SECURITY OUTPUT DEVICE, SECURITY OUTPUT SYSTEM, OUTPUT DEVICE CONTROL PROGRAM AND STORAGE MEDIUM, AND SECURITY OUTPUT METHOD

(75) Inventors: Senichi Mokuya, Nagano (JP); Yusuke Takahashi, Nagano (JP); Toru Takahashi, Nagano (JP)

(73) Assignee: Seiko Epson Corporation (JP)

( * ) Notice: Subject to any disclaimer, the term of this patent is extended or adjusted under 35 U.S.C. 154(b) by 1357 days.

(21) Appl. No.: 11/155,024

(22) Filed: Jun. 16, 2005

(65) Prior Publication Data

US 2006/0021008 A1   Jan. 26, 2006

(30) Foreign Application Priority Data

Jul. 21, 2004 (JP) .............................. 2004-212608
Jan. 18, 2005 (JP) .............................. 2005-010444

(51) Int. Cl.
*H04J 3/22* (2006.01)
*H04L 29/02* (2006.01)

(52) U.S. Cl. .......................................... 370/465; 726/4

(58) Field of Classification Search ................ 370/389, 370/392, 394, 464, 465, 474; 380/255, 270, 380/33, 287, 51, 55; 713/150, 153, 164, 713/165; 726/2, 3, 4, 21, 26, 27; 358/1.1, 358/3.24, 1.14, 1.15, 1.18

See application file for complete search history.

(56) References Cited

U.S. PATENT DOCUMENTS

2005/0235145 A1* 10/2005 Slick et al. .................. 713/165
2006/0064742 A1*  3/2006 Takahashi et al. .............. 726/4
2006/0139686 A1*  6/2006 Suzuki et al. .............. 358/1.15

FOREIGN PATENT DOCUMENTS

| JP | 09-259351 | 10/1997 |
| JP | 2001-345803 | 12/2001 |
| JP | 2003-114789 | 4/2003 |
| JP | 2004-032523 | 1/2004 |

* cited by examiner

*Primary Examiner*—Aung S Moe
*Assistant Examiner*—Feben Haile
(74) *Attorney, Agent, or Firm*—Harness, Dickey & Pierce, P.L.C.

(57) ABSTRACT

A security output device including: an output data receiving unit that receives output data on the basis of communication setting related to setting of a communication path; an output unit that performs output on the basis of the output data received by the output data receiving unit; an output start notification receiving unit that receives an output start notification indicating start of output of the output data; a communication setting content deciding unit that decides a content of the communication setting in accordance with the output start notification received by the output start notification receiving unit; and a communication setting execution unit that executes the communication setting on the basis of the content decided by the communication setting content deciding unit.

13 Claims, 24 Drawing Sheets

(PROTOCOLS/MESSAGES THAT ARE NOT SHOWN IN TABLE ARE PERMITTED)

| PROTOCOL | message | in | out |
|---|---|---|---|
| ICMP | Echo Reply | ○ | × |
| | Redirect | × | × |
| | Echo | × | ○ |
| | Router Advertisement | × | × |
| | Router Solicitation | × | × |
| | Parameter Problem | × | × |
| | Time Stamp | × | × |
| | Time Stamp Reply | × | × |
| | Information Request | × | × |
| | Information Request Reply | × | × |
| | Address Mask Request | × | × |
| | Address Mask Request Reply | × | × |

| DIVISION NUMBER | 1 | 2 | 3 | 4 | 5 | 6 | 7 | 8 |
|---|---|---|---|---|---|---|---|---|
| DIVISION RATE | 5% | 5% | 5% | 5% | 5% | 5% | 5% | 5% |

FIG. 8A

| DIVISION NUMBER | 1 | 2 | 3 | 4 | 5 | 6 | 7 | 8 |
|---|---|---|---|---|---|---|---|---|
| DIVISION RATE | 5% | 5% | 5% | 5% | 10% | 5% | 5% | 5% |

FIG. 8B

| DIVISION NUMBER | 1 | 2 | 3 | 4 | 5 | 6 | 7 | 8 |
|---|---|---|---|---|---|---|---|---|
| PORT NUMBER | 46 | 11564 | 22465 | 348 | 8080 | 161 | 5487 | 11115 |
| DIVISION RATE | 10% | 15% | 10% | 15% | 15% | 20% | 5% | 10% |

FIG. 9

SECURITY OUTPUT DEVICE, SECURITY OUTPUT SYSTEM, OUTPUT DEVICE CONTROL PROGRAM AND STORAGE MEDIUM, AND SECURITY OUTPUT METHOD

RELATED APPLICATIONS

This application claims priority to Japanese Patent Application Nos. 2004-212608 filed Jul. 21, 2004 and 2005-010444 filed Jan. 18, 2005 which are hereby expressly incorporated by reference herein in their entirety.

BACKGROUND

1. Technical Field

The present invention relates to a device, system, program and method for performing security communication and output, and particularly to a security output device, a security output system, an output device control program and storage medium, and a security output method that are suitable for improving security in an environment used by unspecified multiple host terminals.

2. Related Art

There is a need for a technique of allowing only authorized access to a network printer used via a network and eliminating unauthorized access to the network printer. When using the network printer, in some cases, only authorized access should be accepted. For example, in the case of providing a charging service, first, a printer server or the like should perform necessary charging processing in response to a print request and then the network printer should start printing. Therefore, if the network printer accepts a direct print request for which charging processing has not been performed, charging cannot be done.

As techniques of eliminating unauthorized access, for example, there have been an image forming device disclosed in Japanese Patent Application Publication 2003-114789 and a printer device disclosed in Japanese Patent Application Publication 9-259351.

According to the technique disclosed in Japanese Patent Application Publication 2003-114789, identification information representing each user or host terminal is stored into a storage unit in advance. Identification information is acquired from received data, and it is judged whether or not a user or host terminal represented by the acquired identification information is included in the users or host terminals represented by the identification information in the storage unit. On the basis of the result of this judgment, whether print processing should be executed or not is determined.

The technique disclosed in Japanese Patent Application Publication 9-259351 includes a charging device for limiting users, and a network printer. The charging device allocates ID when a coin is put therein. When starting the printing, a user sends the allocated ID together with print data. The ID to be sent is sent in the form of code that can be decoded by the network printer. On receiving the print data, the network printer judges whether it is an ID confirmation command or not. If the ID is not authenticated, the network printer will not accept the remaining print data. Therefore, an ID confirmation command is sent from a host terminal before all the other commands. If an ID confirmation command is received, the network printer checks whether it is an ID to be authenticated or not, and then authenticates the sent ID with the stored ID.

However, in the technique disclosed in Japanese Patent Application Publication 2003-114789, in a situation where the network printer accepts accesses from unspecified multiple host terminals, it is difficult to perform setting of host terminals in the network printer in advance.

In the technique disclosed in Japanese Patent Application Publication 9-259351, since the allocated ID is sent together with the print data, if a malicious user analyzes the ID creation rules, unauthorized access may be made.

Thus, both of the techniques disclosed in Japanese Patent Application Publication 2003-114789 and Japanese Patent Application Publication 9-259351 have a problem of insufficient security.

Such a problem may occur not only in the case of performing printing by the network printer but also in other cases, for example, where a display device such as a projector or LCD (liquid crystal display) is connected to a network to perform display on the display device.

SUMMARY

Thus, the invention is made in view of the unresolved problem of the foregoing techniques and provides a security output device, a security output system, an output device control program and storage medium, and a security output method that are suitable for improving security in an environment used by unspecified multiple host terminals.

Mode 1. A security output device according to mode 1 includes: an output data receiving unit that receives output data on the basis of a communication setting related to setting of a communication path; an output unit that performs output on the basis of the output data received by the output data receiving unit; an output start notification receiving unit that receives an output start notification indicating a start of output of the output data; a communication setting content deciding unit that decides a content of the communication setting in accordance with the output start notification received by the output start notification receiving unit; and a communication setting execution unit that executes the communication setting on the basis of the content decided by the communication setting content deciding unit.

With such a structure, a host terminal, a printer server or other terminals (hereinafter referred to as host terminal or the like) sends an output start notification to the security output device prior to the output and then sends output data.

In the security output device, as the output start notification receiving unit receives the output start notification, the communication setting content deciding unit decides the content of communication setting in accordance with the received output start notification, and the communication setting execution unit executes communication setting based on the decided content. Then, the output data receiving unit receives the output data via a certain communication path on the basis of the communication setting, and the output unit performs output based on the received output data.

Thus, since the communication setting in the security output device is changed every time output is performed, the communication path cannot be easily specified from outside and the possibility of unauthorized access can be reduced. Also, as a printer driver or the like that corresponds to changes of the communication setting can be installed in an authorized host terminal or the like, it is not necessary to perform setting with respect to the security output device. Therefore, security in an environment used by unspecified multiple host terminals or the like can be improved, compared with the foregoing techniques.

The output data receiving unit may have any structure as long as it receives output data on the basis of the communication setting. For example, it may actively acquire output data from outside via a communication path set in accordance with the communication setting, or may receive output data sent via a communication path set in accordance with the communication setting. This structure also applies to a security output device according to mode 9 and security output systems according to modes 15 and 26, which will be described later.

The output unit may have any structure as long as it performs output based on output data. This includes, for example, a print unit that performs printing based on print data, a display unit that performs display based on display data, or an audio output unit that outputs sound based on audio data. Devices including the output unit may be, for example, a printer, a projector, a PC monitor, and an optical disc device for CD-R (compact disc-recordable) or the like. This structure also applies to security output devices according to modes 9 and 10, and security output systems according to modes 15, 26 and 27, which will be described later.

The decision in accordance with to the output start notification includes decision triggered by the output start notification. This also applies to a security output system according to mode 15, an output device control program according to mode 39, a storage medium according to mode 53, and security output methods according to modes 67 and 68, which will be described later.

Mode 2. It is preferable that, as a security output device according to mode 2, the security output device according to mode 1 further includes a communication setting invalidating unit that invalidates the communication setting when end of reception of the output data or end of output by the output unit is detected.

With such a structure, in the security output device, the communication setting invalidating unit invalidates the communication setting when end of reception of output data or end of output by the output unit is detected. Therefore, during a period from the invalidation of the communication setting by the communication setting invalidating unit until the communication setting execution unit executes communication setting again, the communication setting is invalid and the output data cannot be received.

Thus, as the number of opportunities to communicate with the security output device is reduced, the possibility of unauthorized access can be reduced. This enables further improvement in security.

The end of reception refers to a time point when all the output data is received. For example, in the case where the data size of the output data is included in the output start notification, a time point when the output data of that data size is received is determined as the end. Moreover, in the case where information such as EOF is included in the output data, a time point when the information such as EOF is received is determined as the end. The end of output can be determined with reference to a value of MIB data. This also applies to a security output device according to mode 10, security output systems according to modes 16 and 28, output device control programs according to modes 40 and 48, storage media according to modes 54 and 62, and security output methods according to modes 69, 78 and 79, which will be described later.

The invalidation of the communication setting includes disabling communication (inhibiting transmission and reception), and no processing even if data is received. This also applies to a security output device according to mode 10, security output systems according to modes 16 and 28, output device control programs according to modes 40 and 48, storage media according to modes 54 and 62, and security output methods according to modes 67, 78 and 79, which will be described later.

Mode 3. It is also preferable that, as a security output device according to mode 3, the security output device according to mode 1 further includes a communication setting information sending unit that sends communication setting information representing the content of the communication setting performed by the communication setting execution unit to a source of the output start notification or a specified destination.

With such a structure, in the security output device, when communication setting is performed, the communication setting information sending unit sends communication setting information representing the content of the communication setting to the source of the output start notification or a specified destination.

Therefore, when the host terminal or another terminal sends an output start notification to the security output device, the host terminal or the like can receive communication setting information and therefore can send output data to the security output device on the basis of the received communication setting information.

Thus, even when rules for deciding the content of the communication setting are changed in the security output device, the host terminal or the like can be continuously used without updating the printer driver or the like.

Mode 4. It is also preferable that, as a security output device according to mode 4, in the security output device according to mode 1, the communication setting is setting related to setting of plural above-described communication paths. The output data receiving unit receives divided output data that are divided into plural data by a predetermined division technique, via the plural communication paths. The security output device includes an output data forming unit that forms the output data based on each divided output data received by the output data receiving unit. The communication setting content deciding unit decides the plural communication paths. The output unit performs output based on the output data formed by the output data forming unit.

With such a structure, in the security output device, the communication setting content deciding unit decides plural communication paths, and the communication setting execution unit executes communication setting based on the decided content. Then, the output data receiving unit receives output data via the plural communication paths on the basis of the communication setting, and the output data forming unit forms output data based on each of the received divided output data. The output unit performs output based on the formed output data.

Thus, since the output data cannot be outputted without dividing the output data and sending each of the divided output data via the plural communication paths, the possibility of unauthorized access can be further reduced. This can further improve security.

Mode 5. It is also preferable that, as a security output device according to mode 5, in the security output device according to mode 4, the communication setting content deciding unit decides a division rate of the output data, and the output data receiving unit receives the divided output data via the plural communication paths on the basis of the division rate decided by the communication setting content deciding unit.

With such a structure, in the security output device, the communication setting content deciding unit decides the division rate of the output data, and the output data receiving unit receives each divided output data via the plural communication paths on the basis of the decided division rate.

Thus, since the output data cannot be outputted unless the output data is divided at the division rate decided in the security output device, the possibility of unauthorized access can be further reduced. This enables further improvement in security.

Mode 6. It is also preferable that, as a security output device according to mode 6, the security output device according to mode 5 further includes a division rate information sending unit that sends division rate information representing the division rate decided by the communication setting content deciding unit to a source of the output start notification or a specific destination.

With such a structure, in the security output device, the division rate information sending unit sends the division rate information representing the decided division rate to the source of the output start notification or a specific destination.

Thus, when the host terminal or another terminal sends an output start notification to the security output device, the host terminal or the like can receive the division rate information and therefore can divide output data on the basis of the received division rate information.

Thus, even when rules for deciding the division rate are changed in the security output device, the host terminal or the like can be continuously used without updating the printer driver or the like.

Mode 7. It is also preferable that, as a security output device according to mode 7, in the security output device according to mode 4, the communication setting content deciding unit decides correspondence between the plural communication paths and the divided output data, and the output data forming unit combines the divided output data received by the output data receiving unit on the basis of the correspondence decided by the communication setting content deciding unit.

With such a structure, in the security output device, the communication setting content deciding unit decides correspondence between the plural communication paths and the divided output data, and the output data forming unit combines the divided output data received via the plural communication paths on the basis of the decided correspondence.

Thus, since the output data cannot be outputted unless each divided output data is sent via the communication path specified by the correspondence decided in the security output device, the possibility of unauthorized access can be further reduced. This can further improve security.

Mode 8. It is also preferable that, as a security output device according to mode 8, the security output device according to mode 7 further includes a communication path correspondence information sending unit that sends communication path correspondence information representing the correspondence decided by the communication setting content deciding unit to a source of the output start notification or a specific destination.

With such a structure, in the security output device, the communication path correspondence information sending unit sends communication path correspondence information representing the decided correspondence to the source of the output start notification or a specific destination.

Thus, when the host terminal or another terminal sends an output start notification to the security output device, the host terminal or the like can receive the communication path correspondence information and therefore can send each divided output data on the basis of the received communication path correspondence information.

Thus, even when rules for deciding the correspondence between the communication paths and the divided output data are changed in the security output device, the host terminal or the like can be continuously used without updating the printer driver or the like.

Mode 9. A security output device according to mode 9 includes: an output data receiving unit that receives output data; an output data saving unit that saves the output data received by the output data receiving unit to an output data storage unit; a communication setting content deciding unit that decides a content of communication setting related to setting of a communication path; an output start notification receiving unit that receives an output start notification indicating start of output of the output data on the basis of the communication setting; an output unit that performs output on the basis of the output data in the output data storage unit in accordance with the output start notification received by the output start notification receiving unit; and a communication setting execution unit that executes the communication setting on the basis of the content decided by the communication setting content deciding unit.

With such a structure, a host terminal or the like sends output data to the security output device before output, and then sends an output start notification.

In the security output device, as the output data receiving unit receives the output data, the output data saving unit saves the received output data to the output data storage unit. The communication setting content deciding unit decides the content of communication setting, and the communication setting execution unit executes the communication setting based on the decided content. Then, as the output start notification receiving unit receives the output start notification on the basis of the communication setting, the output unit performs output based on the output data in the output data storage unit in accordance with the received output start notification.

Thus, since the communication setting in the security output device is changed every time output is performed, the communication path cannot be easily specified from outside and the possibility of unauthorized access can be reduced. Also, since a printer driver or the like that corresponds to changes of the communication setting can be installed in an authorized host terminal or the like, it is not necessary to perform setting with respect to the security output device. Therefore, security can be improved in an environment used by unspecified multiple host terminals or the like, compared with the foregoing techniques.

Mode 10. A security output device according to mode 10 includes: an output data receiving unit that receives output data on the basis of communication setting related to setting of a communication path; an output unit that performs output on the basis of the output data received by the output data receiving unit; a communication setting information receiving unit that receives communication setting information representing a content of the communication setting; a communication setting execution unit that executes the communication setting on the basis of the communication setting information received by the communication setting information receiving unit; and a communication setting invalidating unit that invalidates the communication setting when end of reception of the output data or end of output by the output unit is detected.

With such a structure, a host terminal or the like sends communication setting information to the security output device before output, and then sends output data.

In the security output device, as the communication setting information receiving unit receives the communication setting information, the communication setting execution unit executes the communication setting based on the received communication setting information. Then, the output data receiving unit receives the output data via a certain communication path on the basis of the communication setting, and the output unit performs output based on the received output data. The communication setting invalidating unit invalidates the communication setting when the end of reception of the output data or the end of output by the output unit is detected. Therefore, during a period from the invalidation of the communication setting by the communication setting invalidating unit until the communication setting execution unit executes communication setting again, the communication setting is invalid and therefore the output data cannot be received.

Thus, since the communication setting in the security output device is changed every time output is performed, the communication path cannot be easily specified from outside and the number of opportunities to communicate with the security output device is reduced. This can reduce the possibility of unauthorized access. Also, since a printer driver or the like that generates communication setting information can be installed in an authorized host terminal or the like, it is not necessary to perform setting with respect to the security output device. Therefore, security can be improved in an environment used by unspecified multiple host terminals or the like, compared with the foregoing techniques.

Mode 11. It is preferable that, as a security output device according to mode 11, in the security output device according to mode 10, the communication setting is setting related to setting of plural above-described communication paths, and the output data receiving unit receives divided output data that are divided into plural data by a predetermined division technique, via the plural communication paths. The security output device includes an output data forming unit that forms the output data on the basis of each of the divided output data received by the output data receiving unit, and the output unit performs output based on the output data formed by the output data forming unit.

With such a structure, in the security output device, the output data receiving unit receives output data via the plural communication paths on the basis of the communication setting, and the output data forming unit forms output data based on each of the received divided output data. The output unit performs output based on the formed output data.

Thus, since the output data cannot be outputted without dividing the output data and sending each of the divided output data via the plural communication path, the possibility of unauthorized access can be further reduced. This can further improve security.

Mode 12. It is also preferable that, as a security output device according to mode 12, the security output device according to mode 11 includes a division rate information receiving unit that receives division rate information representing a division rate of the output data, and the output data receiving unit receives the divided output data via the plural communication paths on the basis of the division rate information received by the division rate information receiving unit.

With such a structure, a host terminal or the like sends division rate information to the security output device before output.

In the security output device, as the division rate information receiving unit receives the division rate information, the output data receiving unit receives each divided output data via the plural communication paths on the basis of the received division rate information.

Thus, since the output data cannot be outputted unless the output data is divided at a division rate decided at an authorized host terminal or the like, the possibility of unauthorized access from the other terminals can be further reduced. This can further improve security.

Mode 13. It is also preferable that, as a security output device according to mode 13, the security output device according to mode 11 further includes a communication path correspondence information receiving unit that receives communication path correspondence information representing correspondence between the plural communication paths and the divided output data, and the output data forming unit combines the divided output data received by the output data receiving unit on the basis of the communication path correspondence information received by the communication path correspondence information receiving unit.

With such a structure, a host terminal or the like sends communication path correspondence information to the security output device before output.

In the security output device, as the communication path correspondence information receiving unit receives the communication path correspondence information, the output data forming unit combines the divided output data received via the plural communication paths.

Thus, since the output data cannot be outputted unless each divided output data is sent via the communication path specified by the correspondence decided at an authorized host terminal or the like, the possibility of unauthorized access from the other terminals can be further reduced. This enables further improvement in security.

Mode 14. It is also preferable that, as a security output device according to mode 14, the security output device according to mode 1 further includes: a communication protocol setting unit that sets a communication protocol for permitting communication; and a communication protocol limiting unit that rejects an access using communication protocols other than the communication protocol set by the communication protocol setting unit.

With such a structure, in the security output device, the communication protocol setting unit sets a communication protocol for permitting communication, and the communication protocol limiting unit rejects an access using communication protocols other than the preset communication protocol.

Thus, since the output data cannot be outputted without using the communication protocol set in the security output device, the possibility of unauthorized access can be further reduced. This enables further improvement in security.

The rejection of an access includes, for example, discard after receiving a part or all of the access, and no reception of the access at all. This also applies to a security output system according to mode 38, an output device control program according to mode 52, a storage medium according to mode 66, and a security output method according to mode 83, which will be described later.

Mode 15. A security output system according to mode 15 includes: an output device that performs output; an output request device that requests output from the output device; and an output management device that manages the output device; the output device, the output request device and the output management device being connected in a manner that enables communication between them. The output management device includes an output start notification sending unit that sends an output start notification indicating start of output of output data to the output device in response to the output request from the output request device. The output device includes: an output start notification receiving unit that receives the output start notification; a communication setting content deciding unit that decides a content of communication setting of a communication path in accordance with the output start notification received by the output start notification receiving unit; a communication setting execution unit that executes the communication setting on the basis of the content decided by the communication setting content deciding unit; an output data receiving unit that receives the output data on the basis of the communication setting, and an output unit that performs output on the basis of the output data received by the output data receiving unit.

With such a structure, in the output management device, the output start notification sending unit sends an output start notification to the output device in response to an output request from the output request device.

In the output device, as the output start notification receiving unit receives the output start notification, the communication setting content deciding unit decides the content of communication setting in accordance with the received output start notification, and the communication setting execution unit executes communication setting based on the decided content. Then, the output data receiving unit receives the output data via a certain communication path on the basis of the communication setting, and the output unit performs output based on the received output data.

This has effects equivalent to those of the security output device according to mode 1.

Mode 16. It is preferable that, as a security output system according to mode 16, in the security output system according to mode 15, the output device further includes a communication setting invalidating unit that invalidates the communication setting when end of reception of the output data or end of output by the output unit is detected.

With such a structure, effects and advantages equivalent to those of the security output device according to mode 2 can be achieved.

Mode 17. It is also preferable that, as a security output system according to mode 17, in the security output system according to mode 15, the output device further includes a communication setting information sending unit that sends communication setting information representing a content of communication setting performed by the communication setting execution unit to the output management device, and the output request device further includes an output data sending unit that sends the output data together with the output request to the output management device. The output management device further includes: a communication setting information receiving unit that receives the communication setting information; a second output data receiving unit that receives the output data; and a second output data sending unit that sends the output data received by the second output data receiving unit to the output device on the basis of the communication setting information received by the communication setting information receiving unit.

With such a structure, in the output request device, the output data sending unit sends the output data together with the output request to the output management device.

In the output management device, when the output request is received, the output start notification sending unit sends an output start notification to the output device in response to the received output request. The second output data receiving unit receives the output data.

In the output device, when the output start notification is received, the communication setting execution unit executes the communication setting, and the communication setting information sending unit sends communication setting information representing the content of the communication setting to the output management device.

In the output management device, as the communication setting information receiving unit receives the communication setting information, the second output data sending unit sends the received output data to the output device on the basis of the received communication setting information.

This has effects equivalent to those of the security output device according to mode 3.

Mode 18. It is also preferable that, as a security output system according to mode 18, in the security output system according to mode 15, the output device further includes a communication setting information sending unit that sends communication setting information representing a content of communication setting performed by the communication setting execution unit to the output management device. The output management device further includes: a communication setting information receiving unit that receives the communication setting information; and a second communication setting information sending unit that sends the communication setting information received by the communication setting information receiving unit to the output request device. The output request device further includes: a second communication setting information receiving unit that receives the communication setting information; and an output data sending unit that sends the output data to the output device on the basis of the communication setting information received by the second communication setting information receiving unit.

With such a structure, in the output device, when communication setting is performed, the communication setting information sending unit sends communication setting information representing the content of the communication setting to the output management device.

In the output management device, as the communication setting information receiving unit receives the communication setting information, the second communication setting information sending unit sends the received communication setting information to the output request device.

In the output request device, as the second communication setting information receiving unit receives the communication setting information, the output data sending unit sends the output data to the output device on the basis of the received communication setting information.

This has effects equivalent to those of the security output device according to mode 3.

Mode 19. It is also preferable that, as a security output system according to mode 19, in the security output system according to mode 15, the communication setting is setting related to setting of plural above-described communication paths. The output data receiving unit receives divided output data that are divided into plural data by a predetermined division technique, via the plural communication paths. The output device includes an output data forming unit that forms the output data based on each divided output data received by the output data receiving unit. The communication setting content deciding unit decides the plural communication paths. The output unit performs output based on the output data formed by the output data forming unit With such a structure, effects and advantages equivalent to those of the security output device according to mode 4 can be achieved.

Mode 20. It is also preferable that, as a security output system according to mode 20, in the security output system according to mode 19, the communication setting content deciding unit decides a division rate of the output data, and the output data receiving unit receives the divided output data via the plural communication paths on the basis of the division rate decided by the communication setting content deciding unit.

With such a structure, effects and advantages equivalent to those of the security output device according to mode 5 can be achieved.

Mode 21. It is also preferable that, as a security output system according to mode 21, in the security output system according to mode 20, the output device further includes a division rate information sending unit that sends division rate information representing the division rate decided by the communication setting content deciding unit to the output management device. The output management device further includes a division rate information receiving unit that receives the division rate information. The second output data sending unit divides the output data received by the second output data receiving unit on the basis of the division rate information received by the division rate information receiving unit, and sends each of the divided output data to the output device via the plural communication paths.

With such a structure, in the output device, the division rate information sending unit sends division rate information representing the decided division rate to the output management device.

In the output management device, as the division rate information receiving unit receives the division rate information, the second output data sending unit divides the output data on the basis of the received division rate information and sends each divided output data to the output device via the plural communication paths.

This has effects equivalent to those of the security output device according to mode 6.

Mode 22. It is also preferable that, as a security output system according to mode 22, in the security output system according to mode 20, the output device further includes a division rate information sending unit that sends division rate information representing the division rate decided by the communication setting content deciding unit to the output management device. The output management device further includes: a division rate information receiving unit that receives the division rate information; and a second division rate information sending unit that sends the division rate information received by the division rate information receiving unit to the output request device. The output request device includes a second division rate information receiving unit that receives the division rate information. The output data sending unit divides the output data on the basis of the division rate information received by the second division rate information receiving unit, and sends each of the divided output data to the output device via the plural communication paths.

With such a structure, in the output device, the division rate information sending unit sends division rate information representing the decided division rate to the output management device.

In the output management device, as the division rate information receiving unit receives the division rate information, the second division rate information sending unit sends the received division rate information to the output request device.

In the output request device, as the second division rate information receiving unit receives the division rate information, the output data sending unit divides the output data on the basis of the received division rate information and sends each divided output data to the output device via the plural communication paths.

This has effects equivalent to those of the security output device according to mode 6.

Mode 23. It is also preferable that, as a security output system according to mode 23, in the security output system according to mode 19, the communication setting content deciding unit decides correspondence between the plural communication paths and the divided output data, and the output data forming unit combines the divided output data received by the output data receiving unit on the basis of the correspondence decided by the communication setting content deciding unit.

With such a structure, effects and advantages equivalent to those of the security output device according to mode 7 can be achieved.

Mode 24. It is also preferable that, as a security output system according to mode 24, in the security output system according to mode 23, the output device further includes a communication path correspondence information sending unit that sends communication path correspondence information representing the correspondence decided by the communication setting content deciding unit to the output management device. The output management device further includes a communication path correspondence information receiving unit that receives the communication path correspondence information. The second output data sending unit divides the output data received by the second output data receiving unit and sends each of the divided output data to the output device via the plural communication paths on the basis of the communication path correspondence information received by the communication path correspondence information receiving unit.

With such a structure, in the output device, the communication path correspondence information sending unit sends communication path correspondence information representing the decided correspondence to the output management device.

In the output management device, as the communication path correspondence information receiving unit receives the communication path correspondence information, the second output data sending unit divides the received output data and sends each divided output data to the output device via the plural communication paths on the basis of the received communication path correspondence information.

This has effects equivalent to those of the security output device according to mode 8.

Mode 25. It is also preferable that, as a security output system according to mode 25, in the security output system according to mode 23, the output device includes a communication path correspondence information sending unit that sends communication path correspondence information representing the correspondence decided by the communication setting content deciding unit to the output management device. The output management device includes: a communication path correspondence information receiving unit that receives the communication path correspondence information; and a second communication path correspondence information sending unit that sends the communication path correspondence information received by the communication path correspondence information receiving unit to the output request device. The output request device includes a second communication path correspondence information receiving unit that receives the communication path correspondence information. The output data sending unit divides the output data and sends each of the divided output data to the output device via the plural communication paths on the basis of the communication path-correspondence information received by the second communication path correspondence information receiving unit.

With such a structure, in the output device, the communication path correspondence information sending unit sends communication path correspondence information representing the decided correspondence to the output management device.

In the output management device, as the communication path correspondence information receiving unit receives the communication path correspondence information, the second communication path correspondence information sending unit sends the received communication path correspondence information to the output request device.

In the output request device, as the second communication path correspondence information receiving unit receives the communication path correspondence information, the output data sending unit divides the output data and sends each divided output data to the output device via the plural communication paths on the basis of the received communication path correspondence information.

This has effects equivalent to those of the security output device according to mode 8.

Mode 26. A security output system according to mode 26 includes: an output device that performs output; an output request device that requests output from the output device; and an output management device that manages the output device, the output device, the output request device and the output management device being connected to enable communication between them. The output management device includes an output data sending unit that sends output data to the output device in response to an output request from the output request device. The output device includes: an output data receiving unit that receives the output data; an output data saving unit that saves the output data received by the output data receiving unit to an output data storage unit; a communication setting content deciding unit that decides a content of communication setting related to setting of a communication path; an output start notification receiving unit that receives an output start notification indicating start of output of the output data on the basis of the communication setting; an output unit that performs output based on the output data in the output data storage unit in accordance with the output start notification received by the output start notification receiving unit; and a communication setting execution unit that executes the communication setting on the basis of the content decided by the communication setting content deciding unit.

With such a structure, in the output management device, the output data sending unit sends output data to the output device in response to an output request from the output request device.

In the output device, as the output data receiving unit receives the output data, the output data saving unit saves the received output data to the output data storage unit. The communication setting content deciding unit decides the content of communication setting, and the communication setting execution unit executes the communication setting based on the decided content. Then, as the output start notification receiving unit receives an output start notification on the basis of the communication setting, the output unit performs output based on the output data in the output data storage unit in accordance with the received output start notification.

This has effects equivalent to those of the security output device according to mode 9.

Mode 27. A security output system according to mode 27 includes: an output device that performs output; an output request device that requests output from the output device; and an output management device that manages the output device, the output device, the output request device and the output management device being connected to enable communication between them. The output management device includes: a communication setting content deciding unit that decides a content of communication setting related to setting of a communication path in response to an output request from the output request device; and a communication setting information sending unit that sends communication setting information representing the content of communication setting decided by the communication setting content deciding unit to the output device. The output device includes: a communication setting information receiving unit that receives the communication setting information; a communication setting execution unit that executes the communication setting on the basis of the communication setting information received by the communication setting information receiving unit; an output data receiving unit that receives output data on the basis of the communication setting; and an output unit that performs output based on the output data received by the output data receiving unit.

With such a structure, in the output management device, the communication setting content deciding unit decides the content of communication setting in response to an output request from the output request device, and the communication setting information sending unit sends communication setting information representing the decided content of communication setting to the output device.

In the output device, as the communication setting information receiving unit receives the communication setting information, the communication setting execution unit executes the communication setting on the basis of the received communication setting information. Then, the output data receiving unit receives output data via a certain communication path on the basis of the communication setting, and the output unit performs output based on the received output data.

This has effects equivalent to those of the security output device according to mode 1.

The decision in response to the output request includes decision triggered by the output request.

Mode 28. It is preferable that, as a security output system according to mode 28, in the security output system according to mode 27, the output device includes a communication setting invalidating unit that invalidates the communication setting when end of reception of the output data or end of output by the output unit is detected.

With such a structure, in the output device, the communication setting invalidating unit invalidates the communication setting when the end of reception of the output data or the end of output by the output unit is detected. Therefore, during a period from the invalidation of the communication setting by the communication setting invalidating unit until the communication setting execution unit executes communication setting again, the communication setting is invalid and the output data cannot be received.

This has effects equivalent to those of the security output device according to mode 10.

Mode 29. It is also preferable that, as a security output system according to mode 29, in the security output system according to mode 27, the output request device includes an output data sending unit that sends the output data together with the output request to the output management device. The output management device includes: a second output data receiving unit that receives the output data; and a second output data sending unit that sends the output data received by the second output data receiving unit to the output device on the basis of the communication setting of the content decided by the communication setting content deciding unit.

With such a structure, in the output request device, the output data sending unit sends the output data together with the output request to the output management device.

In the output management device, as the second output data receiving unit receives the output data, the second output data sending unit sends the received output data to the output device on the basis of the communication setting of the decided content.

Mode 30. It is also preferable that, as a security output system according to mode 30, in the security output system according to mode 27, the output management device includes a second communication setting information sending unit that sends communication setting information representing the content of communication setting decided by the communication setting content deciding unit to the output request device. The output request device includes: a second communication setting information receiving unit that receives the communication setting information; and an output data sending unit that sends the output data to the output device on the basis of the communication setting information received by the second communication setting information receiving unit.

With such a structure, in the output management device, the second communication setting information sending unit sends communication setting information representing the decided content of communication setting to the output request device.

In the output request device, as the second communication setting information receiving unit receives the communication setting information, the output data sending unit sends the output data to the output device on the basis of the received communication setting information.

Mode 31. It is also preferable that, as a security output system according to mode 31, in the security output system according to mode 27, the communication setting is setting related to setting of plural above-described communication paths, and the output data receiving unit receives divided output data that are divided into plural data by a predetermined division technique via the plural communication paths. The output device includes an output data forming unit that forms the output data on the basis of each of the divided output data received by the output data receiving unit. The communication setting content deciding unit decides the plural communication path. The output unit performs output based on the output data formed by the output data forming unit.

With such a structure, effects and advantages equivalent to those of the security output device according to mode 11 can be achieved.

Mode 32. It is also preferable that, as a security output system according to mode 32, in the security output system according to mode 31, the communication setting content deciding unit decides a division rate of the output data. The output management device includes a division rate information sending unit that sends division rate information representing the division rate decided by the communication setting content deciding unit to the output device. The output device includes a division rate information receiving unit that receives the division rate information. The output data receiving unit receives the divided output data via the plural communication paths on the basis of the division rate information received by the division rate information receiving unit.

With such a structure, in the output management device, the communication setting content deciding unit decides a division rate of the output data, and the division rate information sending unit sends division rate information representing the decided division rate to the output device.

In the output device, as the division rate information receiving unit receives the division rate information, the output data receiving unit receives the divided output data via the plural communication paths on the basis of the received division rate information.

This has effects equivalent to those of the security output device according to mode 12.

Mode 33. It is also preferable that, as a security output system according to mode 33, in the security output system according to mode 32, the second output data sending unit divides the output data received by the second output data receiving unit on the basis of the division rate decided by the communication setting content deciding unit, and sends the divided output data to the output device via the plural communication paths.

With such a structure, in the output management device, the second output data sending unit divides the received output data on the basis of the decided division rate and sends each divided output data to the output device via the plural communication paths.

Mode 34. It is also preferred that, as a security output system according to mode 34, in the security output system according to mode 32, the output management device includes a second division rate information sending unit that sends division rate information representing the division rate decided by the communication setting content deciding unit to the output request device. The output request device includes a second division rate information receiving unit that receives the division rate information. The output data sending unit divides the output data on the basis of the division rate information received by the second division rate information receiving unit, and sends the divided output data to the output device via the plural communication paths.

With such a structure, in the output management device, the second division rate information sending unit sends division rate information representing the decided division rate to the output request device.

In the output request device, as the second division rate information receiving unit receives the division rate information, the output data sending unit divides the output data on the basis of the received division rate information and sends each divided output data to the output device via the plural communication paths.

Mode 35. It is also preferable that, as a security output system according to mode 35, in the security output system according to mode 31, the communication setting content deciding unit decides correspondence between the plural communication paths and the divided output data. The output management device includes a communication path correspondence information sending unit that sends communication path correspondence information representing the correspondence decided by the communication setting content deciding unit to the output device. The output device includes a communication path correspondence information receiving unit that receives the communication path correspondence information. The output data forming unit combines the divided output data received by the output data receiving unit on the basis of the communication path correspondence information received by the communication path correspondence information receiving unit.

With such a structure, in the output management device, the communication setting content deciding unit decides correspondence between the plural communication paths and the divided output data, and the communication path correspondence information sending unit sends communication path correspondence information representing the decided correspondence to the output device.

In the output device, as the communication path correspondence information receiving unit receives the communication path correspondence information, the output data forming unit combines the divided output data received via the plural communication paths.

This has effects equivalent to those of the security output device according to mode 13.

Mode 36. It is also preferable that, as a security output system according to mode 36, in the security output system according to mode 35, the second output data sending unit divides the output data received by the second output data receiving unit and sends the divided output data to the output device via the plural communication paths on the basis of the correspondence decided by the communication setting content deciding unit.

With such a structure, in the output management device, the second output data sending unit divides the received output data and sends the divided output data to the output device via the plural communication paths on the basis of the decided correspondence.

Mode 37. It is also preferred that, as a security output system according to mode 37, in the security output system according to mode 35, the output management device includes a second communication path correspondence information sending unit that sends communication path correspondence information representing the correspondence decided by the communication setting content deciding unit to the output request device. The output request device includes a second communication path correspondence information receiving unit that receives the communication path correspondence information. The output data sending unit divides the output data and sends the divided output data to the output device via the plural communication paths on the basis of the communication path correspondence information received by the second communication path correspondence information receiving unit.

With such a structure, in the output management device, the second communication path correspondence information sending unit sends communication path correspondence information representing the decided correspondence to the output request device.

In the output request device, as the second communication path correspondence information receiving unit receives the communication path correspondence information, the output data sending unit divides the output data and sends the divided output data to the output device via the plural communication paths on the basis of the received communication path correspondence information.

Mode 38. It is also preferable that, as a security output system according to mode 38, in the security output system according to mode 15, the output device includes: a communication protocol setting unit that sets a communication protocol for permitting communication; and a communication protocol limiting unit that rejects an access using communication protocols other than the communication protocol set by the communication protocol setting unit.

With such a structure, effects and advantages equivalent to those of the security output device according to mode 14 can be achieved.

Mode 39. An output device control program according to mode 39 is an output device control program for causing a computer that operates as an output device to execute processing including: receiving an output start notification indicating start of output of output data; deciding a content of communication setting related to setting of a communication path in accordance with the output start notification received in the reception of the output start notification; executing the communication setting on the basis of the content decided in the decision of communication setting content; receiving the output data on the basis of the communication setting; and performing output based on the output data received in the reception of the output data.

With such a structure, as the computer reads the program and executes the processing in accordance with the read program, effects and advantages equivalent to those of the security output device according to mode 1 can be achieved.

The reception of output data may be carried out in any form as long as the output data is received on the basis of the communication setting. For example, output data may be actively acquired from outside via a communication path set in accordance with the communication setting. Alternatively, output data sent via a communication path set in accordance with the communication setting may be received. This also applies to an output device control program according to mode 47, storage media according to modes 53 and 61, and security output methods according to modes 67, 68, 76 and 77, which will be described later.

The output may be in any form as long as the output is performed on the basis of output data. This includes, for example, printing based on print data, display based on display data, or output of sound based on audio data. The display includes, for example, display by a projector or LCD. This also applies to output device control programs according to modes 47 and 48, storage media according to modes 53, 61 and 62, and security output methods according to modes 67, 68, 76 to 79, which will be described later.

Mode 40. It is preferable that, as an output device control program according to mode 40, the output device control program according to mode 39 includes a program for causing the computer to execute processing including invaliding the communication setting when end of reception of the output data or end of the output is detected.

With such a structure, as the computer reads the program and executes the processing according to the read program, effects and advantages equivalent to those of the security output device according to mode 2 can be achieved.

Mode 41. It is also preferable that, as an output device control program according to mode 41, the output device control program according to mode 39 includes a program for causing the computer to execute processing including sending communication setting information representing the content of the communication setting performed in the execution of the communication setting execution to a source of the output start notification or a specified destination.

With such a structure, as the computer reads the program and executes the processing according to the read program, effects and advantages equivalent to those of the security output device according to mode 3 can be achieved.

Mode 42. It is also preferable that, as an output device control program according to mode 42, in the output device control program according to mode 39, the communication setting is setting related to setting of plural above-described communication paths. In the reception of the output data, divided output data that are divided into plural data by a predetermined division technique are received via the plural communication paths. The program includes a program for causing the computer to execute processing including forming the output data based on each divided output data received in the reception of the output data. In the decision of the communication setting content, the plural communication paths are decided. The output is performed on the basis of the output data formed in the forming of the output data.

With such a structure, as the computer reads the program and executes the processing according to the read program, effects and advantages equivalent to those of the security output device according to mode 4 can be achieved.

Mode 43. It is also preferable that, as an output device control program according to mode 43, in the output device control program according to mode 42, in the decision of the communication setting content, a division rate of the output data is decided, and in the reception of the output data, the divided output data are received via the plural communication paths on the basis of the division rate decided in the decision of the communication setting content.

With such a structure, as the computer reads the program and executes the processing according to the read program, effects and advantages equivalent to those of the security output device according to mode 5 can be achieved.

Mode 44. It is also preferable that, as an output device control program according to mode 44, the output device control program according to mode 43 further includes a program for causing the computer to execute processing including sending division rate information representing the division rate decided in the decision of the communication setting content to a source of the output start notification or a specific destination.

With such a structure, as the computer reads the program and executes the processing according to the read program, effects and advantages equivalent to those of the security output device according to mode 6 can be achieved.

Mode 45. It is also preferable that, as an output device control program according to mode 45, in the output device control program according to mode 42, in the decision of the communication setting content, correspondence between the plural communication paths and the divided output data is decided, and in the forming of the output data, the divided output data received in the reception of the output data are combined on the basis of the correspondence decided in the decision of the communication setting content.

With such a structure, as the computer reads the program and executes the processing according to the read program, effects and advantages equivalent to those of the security output device according to mode 7 can be achieved.

Mode 46. It is also preferable that, as an output device control program according to mode 46, the output device control program according to mode 45 further includes a program for causing the computer to execute processing including sending communication path correspondence information representing the correspondence decided in the decision of the communication setting content to a source of the output start notification or a specific destination.

With such a structure, as the computer reads the program and executes the processing according to the read program, effects and advantages equivalent to those of the security output device according to mode 8 can be achieved.

Mode 47. An output device control program according to mode 47 is an output device control program for causing a computer that operates as an output device to execute processing including: receiving output data; saving the output data received in the reception of the output data to an output data storage unit; deciding a content of communication setting related to setting of a communication path; receiving an output start notification indicating start of output of the output data on the basis of the communication setting; performing output on the basis of the output data in the output data storage unit in accordance with the output start notification received in the reception of the output start notification; and executing the communication setting on the basis of the content decided in the decision of the communication setting content.

With such a structure, as the computer reads the program and executes the processing according to the read program, effects and advantages equivalent to those of the security output device according to mode 9 can be achieved.

Mode 48. An output device control program according to mode 48 is an output device control program for causing a computer that operates as an output device to execute processing including: receiving communication setting information representing a content of communication setting related to setting of a communication path; executing the communication setting on the basis of the communication setting information received in the reception of the communication setting information; receiving output data on the basis of the communication setting; performing output on the basis of the output data received in the reception of the output data; and invalidating the communication setting when end of the reception of the output data or end of the output is detected.

With such a structure, as the computer reads the program and executes the processing according to the read program, effects and advantages equivalent to those of the security output device according to mode 10 can be achieved.

Mode 49. It is preferable that, as an output device control program according to mode 49, in the output device control program according to mode 48, the communication setting is setting related to setting of plural above-described communication paths, and in the reception of the output data, divided output data that are divided into plural data by a predetermined division technique are received via the plural communication paths. The program includes a program for causing the computer to execute processing including forming the output data on the basis of each of the divided output data received in the reception of the output data, and the output is performed on the basis of the output data formed in the forming of the output data.

With such a structure, as the computer reads the program and executes the processing according to the read program, effects and advantages equivalent to those of the security output device according to mode 11 can be achieved.

Mode 50. It is also preferable that, as an output device control program according to mode 50, the output device control program according to mode 49 includes a program for causing the computer to execute processing including receiving division rate information representing a division rate of the output data, and in the reception of the output data, the divided output data are received via the plural communication paths on the basis of the division rate information received in the reception of the division rate information.

With such a structure, as the computer reads the program and executes the processing according to the read program, effects and advantages equivalent to those of the security output device according to mode 12 can be achieved.

Mode 51. It is also preferable that, as an output device control program according to mode 51, the output device control program according to mode 49 further includes a program for causing the computer to execute processing including receiving communication path correspondence information representing correspondence between the plural communication paths and the divided output data, and in the forming of the output data, the divided output data received in the reception of the output data are combined on the basis of the communication path correspondence information received in the reception of the communication path correspondence information.

With such a structure, as the computer reads the program and executes the processing according to the read program, effects and advantages equivalent to those of the security output device according to mode 13 can be achieved.

Mode 52. It is also preferable that, as an output device control program according to mode 52, the output device control program according to mode 39 further includes a program for causing the computer to execute processing including: setting a communication protocol for permitting communication; and limiting a communication protocol to reject an access using communication protocols other than the communication protocol set in the setting of the communication protocol.

With such a structure, as the computer reads the program and executes the processing according to the read program, effects and advantages equivalent to those of the security output device according to mode 14 can be achieved.

Mode 53. A storage medium according to mode 53 is a computer-readable storage medium storing an output device control program for causing a computer that operates as an output device to execute processing including: receiving an output start notification indicating start of output of output data; deciding a content of communication setting related to setting of a communication path in accordance with the output start notification received in the reception of the output start notification; executing the communication setting on the basis of the content decided in the decision of communication setting content; receiving the output data on the basis of the communication setting; and performing output based on the output data received in the reception of the output data.

With such a structure, as the computer reads the program from the storage medium and executes the processing in accordance with the read program, effects and advantages equivalent to those of the security output device according to mode 1 can be achieved.

Mode 54. It is preferable that, as a storage medium according to mode 54, the storage medium according to mode 53 stores a program for causing the computer to execute processing including invaliding the communication setting when end of the reception of the output data or end of the output is detected.

With such a structure, as the computer reads the program from the storage medium and executes the processing according to the read program, effects and advantages equivalent to those of the security output device according to mode 2 can be achieved.

Mode 55. It is also preferable that, as a storage medium according to mode 55, the storage medium according to mode 53 stores a program for causing the computer to execute processing including sending communication setting information representing the content of the communication setting performed in the execution of the communication setting to a source of the output start notification or a specified destination.

With such a structure, as the computer reads the program from the storage medium and executes the processing according to the read program, effects and advantages equivalent to those of the security output device according to mode 3 can be achieved.

Mode 56. It is also preferable that, as a storage medium according to mode 56, in the storage medium according to mode 53, the communication setting is setting related to setting of plural above-described communication paths. In the reception of the output data, divided output data that are divided into plural data by a predetermined division technique are received via the plural communication paths. The storage medium stores a program for causing the computer to execute processing including forming the output data based on each divided output data received in the reception of the output data. In the decision of the communication setting content, the plural communication paths are decided. The output is performed on the basis of the output data formed in the forming of the output data.

With such a structure, as the computer reads the program from the storage medium and executes the processing according to the read program, effects and advantages equivalent to those of the security output device according to mode 4 can be achieved.

Mode 57. It is also preferable that, as a storage medium according to mode 57, in the storage medium according to mode 56, in the decision of the communication setting content, a division rate of the output data is decided, and in the reception of the output data, the divided output data are received via the plural communication paths on the basis of the division rate decided in the decision of the communication setting content.

With such a structure, as the computer reads the program from the storage medium and executes the processing according to the read program, effects and advantages equivalent to those of the security output device according to mode 5 can be achieved.

Mode 58. It is also preferable that, as a storage medium according to mode 58, the storage medium according to mode 57 stores a program for causing the computer to execute processing including sending division rate information representing the division rate decided in the decision of the communication setting content to a source of the output start notification or a specific destination.

With such a structure, as the computer reads the program from the storage medium and executes the processing according to the read program, effects and advantages equivalent to those of the security output device according to mode 6 can be achieved.

Mode 59. It is also preferable that, as a storage medium according to mode 59, in the storage medium according to mode 56, in the decision of the communication setting content, correspondence between the plural communication paths and the divided output data is decided, and in the forming of the output data, the divided output data received in the reception of the output data are combined on the basis of the correspondence decided in the decision of the communication setting content.

With such a structure, as the computer reads the program from the storage medium and executes the processing according to the read program, effects and advantages equivalent to those of the security output device according to mode 7 can be achieved.

Mode 60. It is also preferable that, as a storage medium according to mode 60, the storage medium according to mode 59 stores a program for causing the computer to execute processing including sending communication path correspondence information representing the correspondence decided in the decision of the communication setting content to a source of the output start notification or a specific destination.

With such a structure, as the computer reads the program from the storage medium and executes the processing according to the read program, effects and advantages equivalent to those of the security output device according to mode 8 can be achieved.

Mode 61. A storage medium according to mode 61 is a computer-readable storage medium storing an output device control program for causing a computer that operates as an output device to execute processing including: receiving output data; saving the output data received in the reception of the output data to an output data storage unit; deciding a content of communication setting related to setting of a communication path; receiving an output start notification indicating start of output of the output data on the basis of the communication setting; performing output on the basis of the output data in the output data storage unit in accordance with the output start notification received in the reception of the output start notification; and executing the communication setting on the basis of the content decided in the decision of the communication setting content.

With such a structure, as the computer reads the program from the storage medium and executes the processing according to the read program, effects and advantages equivalent to those of the security output device according to mode 9 can be achieved.

Mode 62. A storage medium according to mode 62 is a computer-readable storage medium storing an output device control program for causing a computer that operates as an output device to execute processing including: receiving communication setting information representing a content of communication setting related to setting of a communication path; executing the communication setting on the basis of the communication setting information received in the reception of the communication setting information; receiving output data on the basis of the communication setting; performing output on the basis of the output data received in the reception of the output data; and invalidating the communication setting when end of the reception of the output data or end of the output is detected.

With such a structure, as the computer reads the program from the storage medium and executes the processing according to the read program, effects and advantages equivalent to those of the security output device according to mode 10 can be achieved.

Mode 63. It is preferable that, as a storage medium according to mode 63, in the storage medium according to mode 62, the communication setting is setting related to setting of plural above-described communication paths, and in the reception of the output data, divided output data that are divided into plural data by a predetermined division technique are received via the plural communication paths. The storage medium stores a program for causing the computer to execute processing including forming the output data on the basis of each of the divided output data received in the reception of the output data, and the output is performed on the basis of the output data formed in the forming of the output data.

With such a structure, as the computer reads the program from the storage medium and executes the processing according to the read program, effects and advantages equivalent to those of the security output device according to mode 11 can be achieved.

Mode 64. It is also preferable that, as a storage medium according to mode 64, the storage medium according to mode 63 stores a program for causing the computer to execute processing including receiving division rate information representing a division rate of the output data, and in the reception of the output data, the divided output data are received via the plural communication paths on the basis of the division rate information received in the reception of the division rate information.

With such a structure, as the computer reads the program from the storage medium and executes the processing according to the read program, effects and advantages equivalent to those of the security output device according to mode 12 can be achieved.

Mode 65. It is also preferable that, as a storage medium according to mode 65, the storage medium according to mode 63 stores a program for causing the computer to execute processing including receiving communication path correspondence information representing correspondence between the plural communication paths and the divided output data, and in the forming of the output data, the divided output data received in the reception of the output data are combined on the basis of the communication path correspondence information received in the reception of the communication path correspondence information.

With such a structure, as the computer reads the program from the storage medium and executes the processing according to the read program, effects and advantages equivalent to those of the security output device according to mode 13 can be achieved.

Mode 66. It is also preferable that, as a storage medium according to mode 66, the storage medium according to mode 53 stores a program for causing the computer to execute processing including: setting a communication protocol for permitting communication; and limiting a communication protocol to reject an access using communication protocols other than the communication protocol set in the setting of the communication protocol.

With such a structure, as the computer reads the program from the storage medium and executes the processing according to the read program, effects and advantages equivalent to those of the security output device according to mode 14 can be achieved.

Mode 67. A security output method according to mode 67 includes: receiving output data on the basis of communication setting related to setting of a communication path; performing output based on the output data received in the reception of the output data; receiving an output start notification indicating start of output of the output data; deciding a content of the communication setting in accordance with the output start notification received in the reception of the output start notification; and executing the communication setting on the basis of the content decided in the decision of the communication setting content.

This has effects equivalent to those of the security output device according to mode 1.

Mode 68. A security output method according to mode 68 includes: receiving output data on the basis of communication setting related to setting of a communication path, by a communication unit; performing output based on the output data received in the reception of the output data, by an arithmetic operation unit; receiving an output start notification indicating start of output of the output data, by the communication unit; deciding a content of the communication setting in accordance with the output start notification received in the reception of the output start notification, by the arithmetic operation unit; and executing the communication setting on the basis of the content decided in the decision of the communication setting content, by the arithmetic operation unit.

This has effects equivalent to those of the security output device according to mode 1.

Mode 69. It is preferable that, as a security output method according to mode 69, the security output method according to mode 67 includes invaliding the communication setting when end of the reception of the output data or end of the output is detected.

This has effects equivalent to those of the security output device according to mode 2.

Mode 70. It is also preferable that, as a security output method according to mode 70, the security output method according to mode 67 includes sending communication setting information representing the content of the communication setting performed in the execution of the communication setting execution to a source of the output start notification or a specified destination.

This has effects equivalent to those of the security output device according to mode 3.

Mode 71. It is also preferable that, as a security output method according to mode 71, in the security output method according to mode 67, the communication setting is setting related to setting of plural above-described communication paths. In the reception of the output data, divided output data that are divided into plural data by a predetermined division technique are received via the plural communication paths. The method further includes forming the output data based on each divided output data received in the reception of the output data. In the decision of the communication setting content, the plural communication paths are decided. The output is performed on the basis of the output data formed in the forming of the output data.

This has effects equivalent to those of the security output device according to mode 4.

Mode 72. It is also preferable that, as a security output method according to mode 72, in the security output method according to mode 71, in the decision of the communication setting content, a division rate of the output data is decided, and in the reception of the output data, the divided output data are received via the plural communication paths on the basis of the division rate decided in the decision of the communication setting content.

This has effects equivalent to those of the security output device according to mode 5.

Mode 73. It is also preferable that, as a security output method according to mode 73, the security output method according to mode 72 further includes sending division rate information representing the division rate decided in the decision of the communication setting content to a source of the output start notification or a specific destination.

This has effects equivalent to those of the security output device according to mode 6.

Mode 74. It is also preferable that, as a security output method according to mode 74, in the security output method according to mode 71, in the decision of the communication setting content, correspondence between the plural communication paths and the divided output data is decided, and in the forming of the output data, the divided output data received in the reception of the output data are combined on the basis of the correspondence decided in the decision of the communication setting content.

This has effects equivalent to those of the security output device according to mode 7.

Mode 75. It is also preferable that, as a security output method according to mode 75, the security output method according to mode 74 further includes sending communication path correspondence information representing the correspondence decided in the decision of the communication setting content to a source of the output start notification or a specific destination.

This has effects equivalent to those of the security output device according to mode 8.

Mode 76. A security output method according to mode 76 includes: receiving output data; saving the output data received in the reception of the output data to an output data storage unit; deciding a content of communication setting related to setting of a communication path; receiving an output start notification indicating start of output of the output data on the basis of the communication setting; performing output on the basis of the output data in the output data storage unit in accordance with the output start notification received in the reception of the output start notification; and executing the communication setting on the basis of the content decided in the decision of the communication setting content.

This has effects equivalent to those of the security output device according to mode 9.

Mode 77. A security output method according to mode 77 includes: receiving output data by a communication unit; saving the output data received in the reception of the output data to an output data storage unit, by an arithmetic operation unit; deciding a content of communication setting related to setting of a communication path, by the arithmetic operation unit; receiving an output start notification indicating start of output of the output data on the basis of the communication setting, by the communication unit; performing output on the basis of the output data in the output data storage unit in accordance with the output start notification received in the reception of the output start notification, by the arithmetic operation unit; and executing the communication setting on the basis of the content decided in the decision of the communication setting content, by the arithmetic operation unit.

This has effects equivalent to those of the security output device according to mode 9.

Mode 78. A security output method according to mode 78 includes: receiving output data on the basis of communication setting related to setting of a communication path; performing output on the basis of the output data received in the reception of the output data; receiving communication setting information representing a content of the communication setting; executing the communication setting on the basis of the communication setting information received in the reception of the communication setting information; and invalidating the communication setting when end of the reception of the output data or end of the output is detected.

This has effects equivalent to those of the security output device according to mode 10.

Mode 79. A security output method according to mode 79 includes: receiving output data on the basis of communication setting related to setting of a communication path, by a communication unit; performing output on the basis of the output data received in the reception of the output data, by an arithmetic operation unit; receiving communication setting information representing a content of the communication setting, by the communication unit; executing the communication setting on the basis of the communication setting information received in the reception of the communication setting information, by the arithmetic operation unit; and invalidating the communication setting when end of the reception of the output data or end of the output is detected, by the arithmetic operation unit.

This has effects equivalent to those of the security output device according to mode 10.

Mode 80. It is preferable that, as a security output method according to mode 80, in the security output method according to mode 78, the communication setting is setting related to setting of plural above-described communication paths, and in the reception of the output data, divided output data that are divided into plural data by a predetermined division technique are received via the plural communication paths. The method includes forming the output data on the basis of each of the divided output data received in the reception of the output data, and the output is performed on the basis of the output data formed in the forming of the output data.

This has effects equivalent to those of the security output device according to mode 11.

Mode 81. It is also preferable that, as a security output method according to mode 81, the security output method according to mode 80 includes receiving division rate information representing a division rate of the output data, and in the reception of the output data, the divided output data are received via the plural communication paths on the basis of the division rate information received in the reception of the division rate information.

This has effects equivalent to those of the security output device according to mode 12.

Mode 82. It is also preferable that, as a security output method according to mode 82, the security output method according to mode 80 further includes receiving communication path correspondence information representing correspondence between the plural communication paths and the divided output data, and in the forming of the output data, the divided output data received in the reception of the output data are combined on the basis of the communication path correspondence information received in the reception of the communication path correspondence information.

This has effects equivalent to those of the security output device according to mode 13.

Mode 83. It is also preferable that, as a security output method according to mode 83, the security output method according to mode 67 further includes: setting a communication protocol for permitting communication; and limiting a communication protocol to reject an access using communication protocols other than the communication protocol set in the setting of the communication protocol.

This has effects equivalent to those of the security output device according to mode 14.

BRIEF DESCRIPTION OF THE DRAWINGS

The invention will be described with reference to the accompanying drawings, wherein like numbers refer to like elements, and wherein:

FIGS. 8A and 8B are views for explaining a case of deciding division rates;

FIG. 9 shows results of deciding communication port number, division rate and port allocation;

DETAILED DESCRIPTION

Hereinafter, a first embodiment of the invention will be described with reference to the drawings. FIGS. 1 to 14 are views showing a first embodiment of a security output device, a security output system, an output device control program and storage medium, and a security output method according to the invention.

Figure 1:
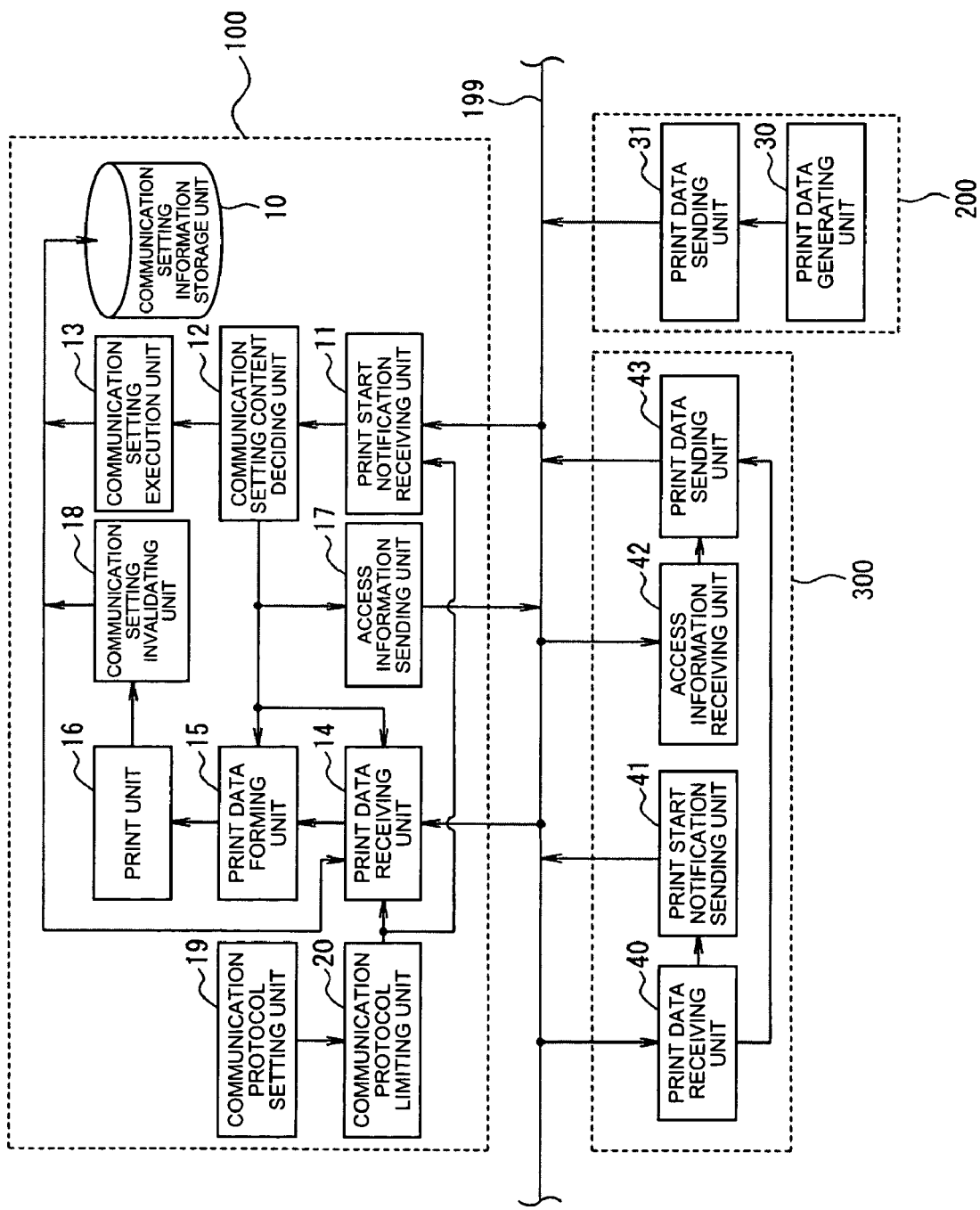
FIG. 1 is a functional block diagram showing an outline of functions of a network system.

In this embodiment, a security output device, a security output system, an output device control program and storage medium, and a security output method according to the invention are applied to a case of performing security communication (which means communication conformable to specified rules to print only authorized print data, and it means the same throughout the following description) at a network printer 100 and thus performing printing, as shown in FIG. 1.

First, an outline of functions of the network system to which the invention is applied will be described with reference to FIG. 1.

FIG. 1 is a functional block diagram showing an outline of functions of the network system.

A network printer 100 that performs print, a host terminal 200 that request the network printer 100 to perform printing, and a printer server 300 that manages the network printer 100 are connected to a network 199, as shown in FIG. 1.

The network printer 100 has a communication setting information storage unit 10 storing communication setting information representing the content of communication setting related to setting of IP address and a communication port used by TCI/IP, a print start notification receiving unit 11 that receives a print start notification, a communication setting content deciding unit 12 that decides the content of communication setting in accordance with the print start notification received by the print start notification receiving unit 11, and a communication setting execution unit 13 that executes the communication setting based on the content decided by the communication setting content deciding unit 12.

The communication setting content deciding unit 12 decides the IP address, the number of communication ports and communication port numbers, and in the case of dividing print data by the decided number of communication ports, decides a division rate representing data size by which each divided printed data should be divided and also decides allocation of the divided print data to the decided plural communication ports (hereinafter referred to as port allocation).

The communication setting execution unit 13 updates the communication setting information in the communication setting information storage unit 10 on the basis of the IP address and communication port numbers decided by the communication setting content deciding unit 12.

The network printer 100 also has a print data receiving unit 14 that receives print data, a print data forming unit 15 that forms print data on the basis of each divided print data received by the print data receiving unit 14, and a print unit 16 that performs printing based on the print data formed by the print data forming unit 15.

The print data receiving unit 14 receives the divided print data via the plural communication ports specified by the communication setting information in the communication setting information storage unit 10 on the basis of the division rate decided by the communication setting content deciding unit 12.

The print data forming unit 15 combines the divided print data received by the print data receiving unit 14 on the basis of the port allocation decided by the communication setting content deciding unit 12 and thus forms the print data.

The network printer 100 also has an access information sending unit 17 that sends access information representing the IP address, communication port numbers, division rate and port allocation decided by the communication setting content deciding unit 12 to the source of the print start notification, a communication setting invalidating unit 18 that invalidates the communication setting information in the communication setting information storage unit 10 at the time when printing by the print unit 16 ends, a communication protocol setting unit 19 that sets a communication protocol for permitting communication, and a communication protocol limiting unit 20 that rejects an access using the communication protocols other than the communication protocol set by the communication protocol setting unit 19.

The host terminal 200 has a print data generating unit 30 that generates print data in response to a request from a document preparation application or the like, and a print data sending unit 31 that sends the print data generated by the print data generating unit 30 to the printer server 300.

The printer server 300 has a print data receiving unit 40 that receives print data, a print start notification sending unit 41 that sends a print start notification to the network printer 100 at the time when the print data is received by the print data receiving unit 40, an access information receiving unit 42 that receives access information, and a print data sending unit 43 that sends the print data received by the print data receiving unit 40 to the network printer 100 on the basis of the access information received by the access information receiving unit 42.

The print data sending unit 43 divides the print data on the basis of the division rate contained in the access information and sends the divided print data to the network printer 100 via plural communication ports on the basis of the IP address, communication port numbers and port allocation contained in the access information.

Next, the structure of the network printer 100 will be described.

Figure 2:
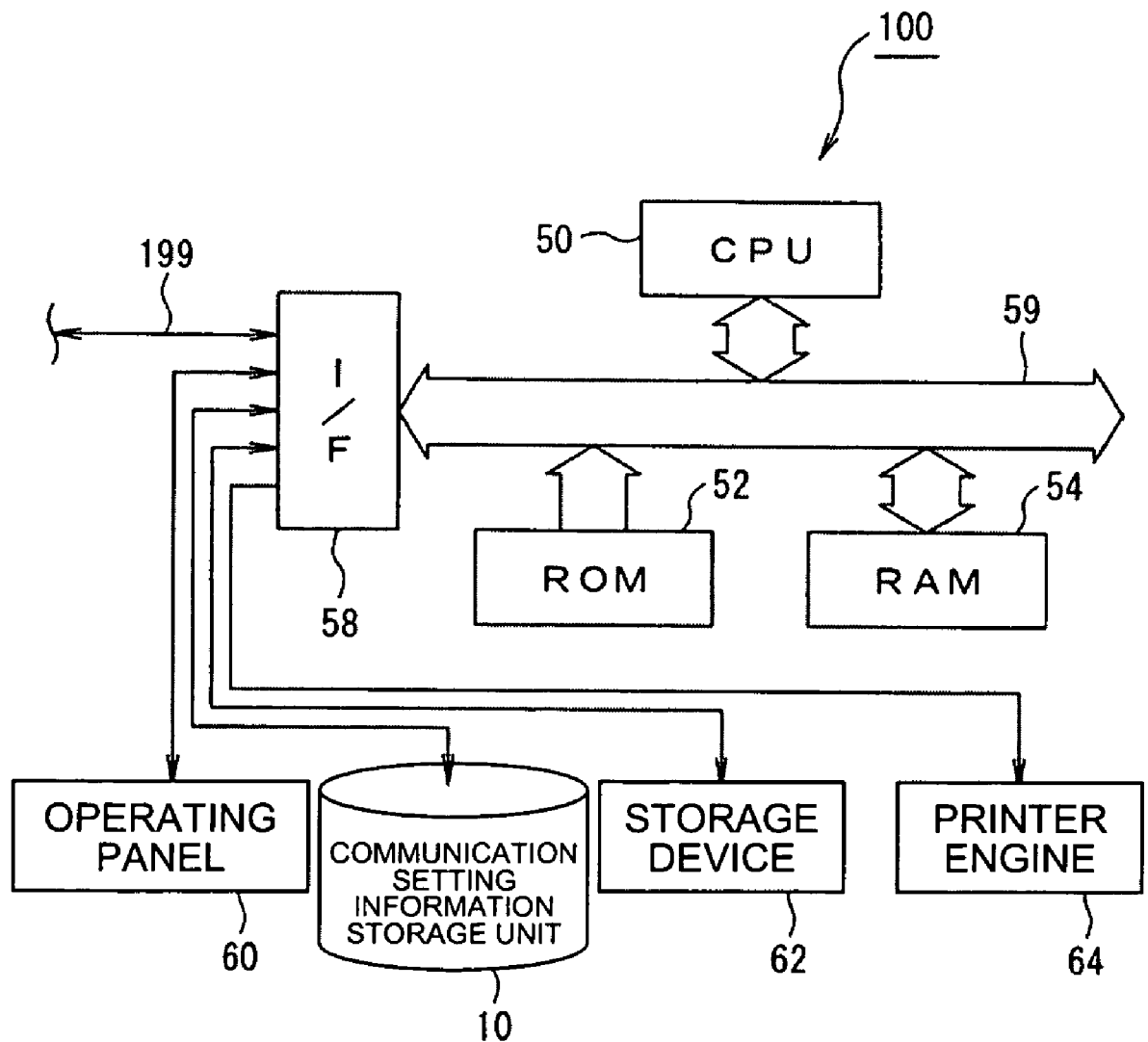
FIG. 2 is a block diagram showing the hardware structure of a network printer 100.

FIG. 2 is a block diagram showing the hardware structure of the network printer 100.

The network printer 100 includes a CPU 50 that controls arithmetic operations and the entire system on the basis of a control program, a ROM 52 storing the control program and the like of the CPU 50 in its predetermined area in advance, a RAM 54 for storing data read out from the ROM 52 or the like and the results of arithmetic operations that are necessary in the arithmetic operations at the CPU 50, and an I/F 58 that mediates input and output of data from and to an external device, as shown in FIG. 2. These parts are connected to each other and enable transmission and reception of data by a bus 59, which is a signal line for transferring data.

To the I/F 58, an operating panel 60 including a touch panel or the like that enables input and display of data as a human interface, the communication setting information storage unit 10, a storage device 62 storing data, tables and the like as files, a printer engine 64 including a print head, a head driving unit and other necessary mechanisms for printing, and a signal line for connecting to the network 199, are connected as external devices.

The CPU 50 includes a micro-processing unit or the like. It starts predetermined programs stored in a predetermined area in the ROM 52 and time-divisionally executes communication protocol setting processing, communication setting processing and print control processing shown in flowcharts of FIGS. 3, 5 and 10 in accordance with the programs.

First, the communication protocol setting processing will be described in detail with reference to FIG. 3.

Figures 3, 4:
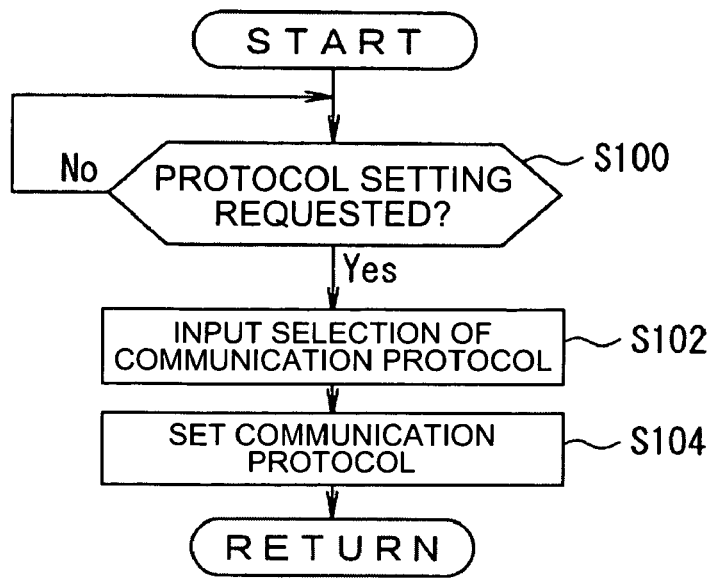
FIG. 3 is a flowchart showing communication protocol setting processing executed by the network printer 100.
FIG. 4 shows a list of ICMP communication messages.

FIG. 3 is a flowchart showing the communication protocol setting processing executed by the network printer 100.

As the communication protocol setting processing is executed at the CPU 50, the processing first shifts to step S100 as shown in FIG. 3.

At step S100, it is judged whether or not it is requested from the operating panel 60 that a communication protocol should be set. If it is judged that it is requested that a protocol should be set (Yes), the processing shifts to step S102. However, if it is judged otherwise (No), the processing waits at step S100 until it is requested that a protocol should be set.

FIG. 4 shows a list of ICMP communication messages.

At step S102, selection of a communication protocol is inputted from the operating panel 60. For example, for ICMP, which is a communication protocol, a list of ICMP communication messages is displayed on the operating panel 60, as shown in FIG. 4, and a user selects a communication message that permits reception or transmission. In the example shown in FIG. 4, when the user wants to select a communication message that permits reception, the user inputs "O" into the field "in" for a corresponding communication message. When the user wants to select a communication messages that rejects reception, the user inputs "x" into the field "in" for a corresponding communication message. When the user wants to select a communication message that permits or rejects transmission, the user makes similar input into the field "out".

Referring again to FIG. 3, the processing shifts to step S104 and the communication protocol selected at step S102 is set as a communication protocol for permitting communication. Then, the series of processing ends and the original processing is restored.

Next, the communication setting processing will be described in detail with reference to FIG. 5.

Figure 5:
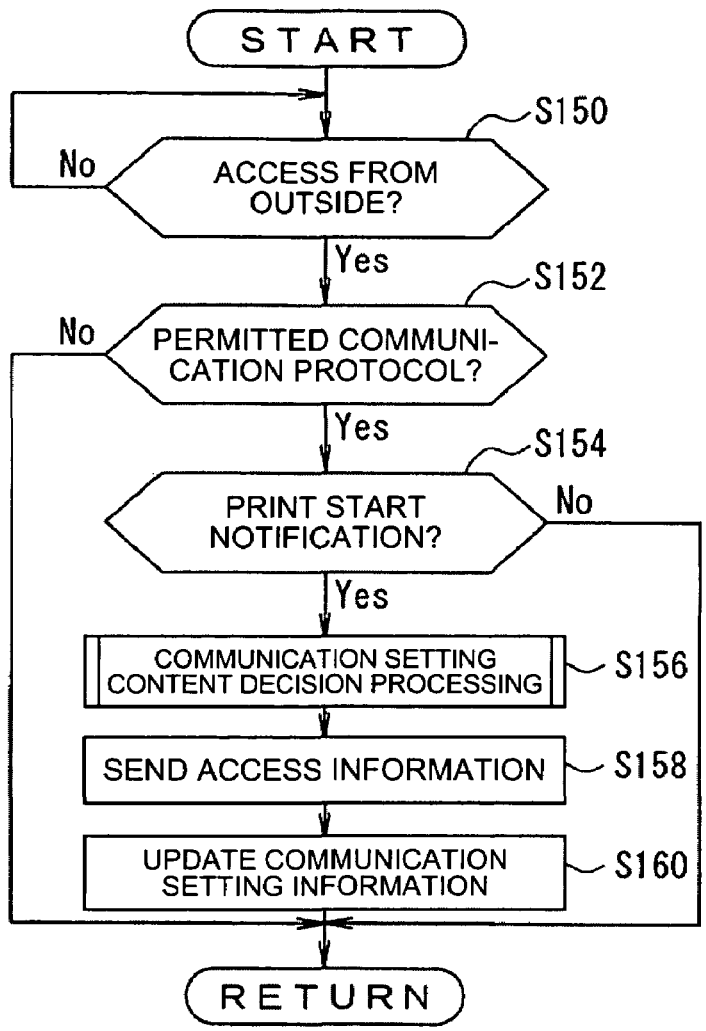
FIG. 5 is a flowchart showing communication setting processing executed by the network printer 100.

FIG. 5 is a flowchart showing the communication setting processing executed by the network printer 100.

As the communication setting processing is executed at the CPU 50, the processing first shifts to step S150 as shown in FIG. 5.

At step S150, it is judged whether there is an access from outside or not. If it is judged that there is an access from outside (Yes), the processing shifts to step S152. However, if it is judged otherwise (No), the processing waits at step S150 until an access is made from outside.

At step S152, it is judged whether the access from outside is an access using a permitted communication protocol or not. If it is judged that the access is an access using a permitted communication protocol (Yes), the processing shifts to step S154. However, if it is judged otherwise (No), the series of processing ends and the original processing is restored.

At step S154, it is judged whether the access from outside is a print start request or not.

Figure 6:
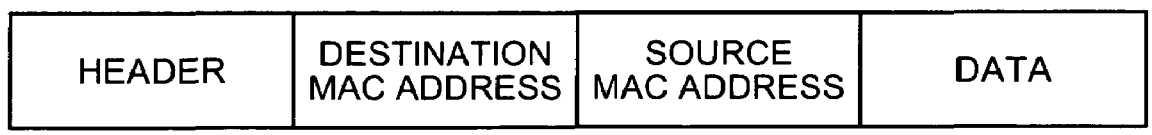
FIG. 6 shows the data structure of a packet received by the network printer 100.

FIG. 6 shows the data structure of a packet received by the network printer 100.

A packet includes an area storing a header, an area storing MAC address of a terminal to be a destination of data, an area storing MAC address of a terminal to be a source of data, and an area storing data, as shown in FIG. 6.

A print start notification is contained in the packet of FIG. 6, which is then sent and received. In the data area of the packet containing the print start notification, a flag indicating that a print request is received by the printer server 300 and the date and time of reception of the print request by the printer server 300 are stored.

Also divided print data are contained in the packet of FIG. 6, which is then sent and received. In the data area of the packet containing the divided print data, the total data size of the print data and the divided print data are stored.

Referring again to FIG. 5, if it is judged at step S154 that the access from outside is a print start request (Yes), the processing shifts to step S156 and the communication setting content decision processing to decide IP address, communication port numbers, division rate and port allocation is executed. Then, the processing shifts to step S158 and access information representing the decided IP address, communication port numbers, division rate and port allocation is sent to the source of the print start notification. Then, the processing shifts to step S160 and the communication setting information in the communication setting information storage unit 10 is updated on the basis of the decided IP address and communication port numbers. The series of processing ends and the original processing is restored.

Meanwhile, if it is judged at step S154 that the access from outside is not a print start request (No), or if it is judged at step S152 that the access from outside is not an access using a permitted communication protocol (No), the series of processing ends and the original processing is restored.

Next, the communication setting content decision processing of step S156 will be described in detail with reference to FIG. 7.

Figure 7:
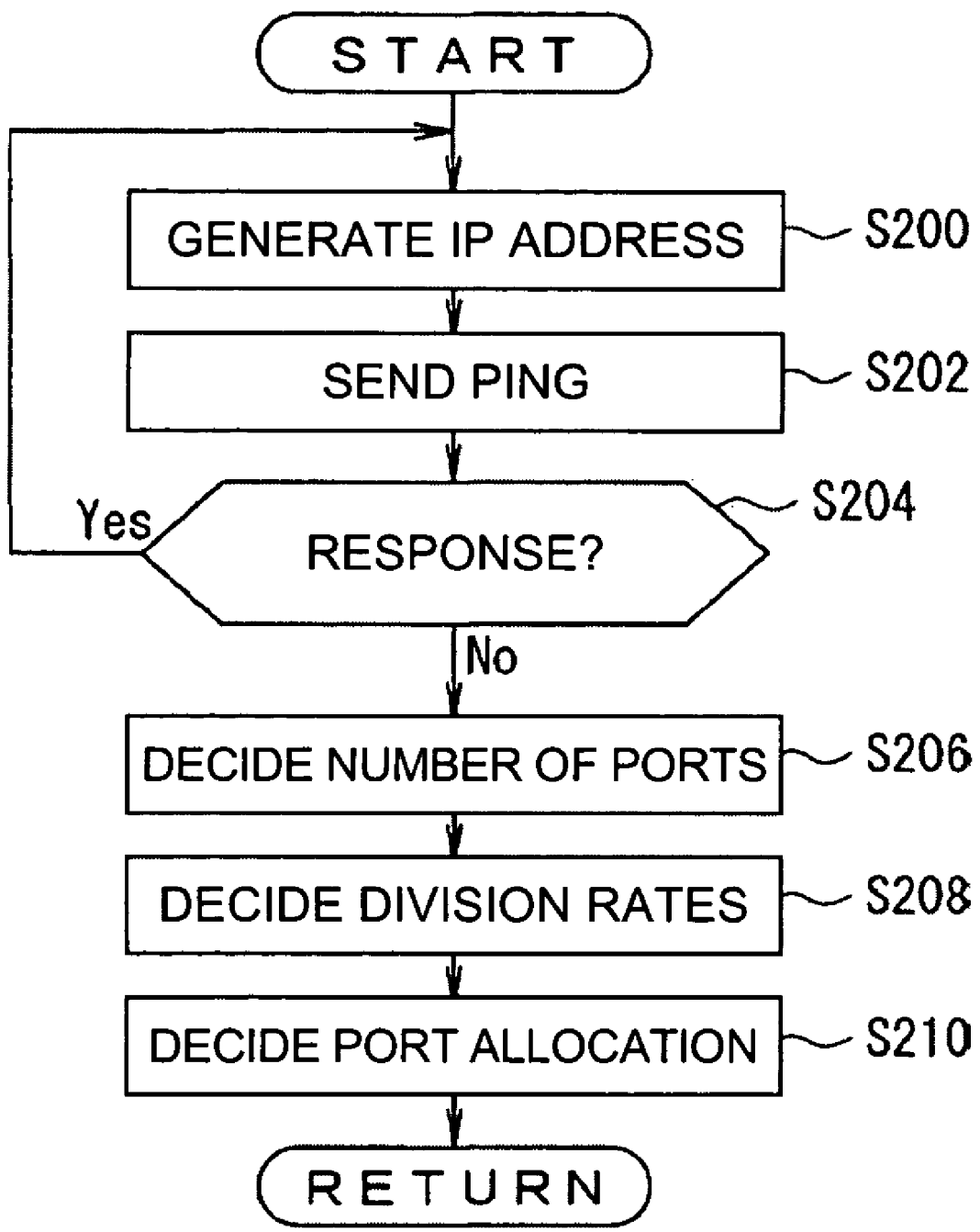
FIG. 7 is a flowchart showing communication setting content decision processing of step S156.

FIG. 7 is a flowchart showing the communication setting content decision processing of step S156. As the communication setting content decision processing is executed at step S156, the processing first shifts to step S200 as shown in FIG. 7.

At step S200, an IP address is randomly generated. The processing shifts to step S202 and a ping command is executed using the generated IP address as a destination address. The ping command is a command for issuing an IP packet based on ICMP to a terminal to which the user wants to confirm network understanding and for confirming whether the packet has correctly reached the terminal and the terminal responds or not.

Next, the processing shifts to step S204 and it is judged whether a response to the execution of the ping command is acquired or not. If it is judged that no response is acquired (No), the processing shifts to step S206 and the number of communication ports and their numbers are decided. The communication port numbers may be decided randomly within a range of 0 to 65535 or may be decided within a preset range or from preset numbers.

Next, the processing shifts to step S208 and division rates representing data sizes to which print data should be divided in the case of dividing print data by the decided number of communication ports are decided.

FIGS. 8A and 8B are views for explaining the case of deciding division rates.

First, division numbers are issued by the number of communication ports. The division numbers are serial numbers starting at an initial value of "1". Next, an initial rate is uniformly allocated to each division number. In the example shown in FIG. 8A, the number of communication ports is 8 and an initial rate of 5% is uniformly allocated to each division number. Then, a division number is randomly selected and a predetermined rate is added to the selected division number. In the example shown in FIG. 8B, division number 5 is selected and a predetermined rate of 5% is added to the division number 5, thus resulting in 10%. This processing is repeated until the total of the division rates allocated to all the division numbers reaches 100%. While the initial rates of the same value and the predetermined rates of the same value are used in the example shown in FIGS. 8A and 8B, these rates are not limited to the same value and initial rates and predetermined rates of different values may be used. Also, these rates are not limited to fixed values and may be dynamically decided in accordance with the number of communication ports.

Referring again to FIG. 7, as the processing of step S208 ends, the processing shifts to step S210 and allocation of the divided print data to the decided plural communication ports is decided.

FIG. 9 shows the results of deciding the communication port numbers, division rates and port allocation.

Division numbers are allocated to the individual numbers of the decided communication ports. In the example shown in FIG. 9, the number of communication ports is 8, and when "46", "11564", "22465", "348", "8080", "161", "5487" and "11115" are decided as the communication port numbers, division numbers are allocated to these port numbers in ascending order. Moreover, in the example shown in FIG. 9, the decided division rates are also allocated corresponding to the division numbers. Division rates of 10%, 15%, 10%, 15%, 15%, 20%, 5% and 10% are allocated to the division numbers in ascending order. This indicates that, at the source of print data, the print data should be divided at rates of 10:15:10:15:15:20:5:10 sequentially from the leading part and the individual divided print data should be sent via the communication ports 46, 11564, . . . , 11115 sequentially from the leading part. In the network printer 100, the divided print data of the data sizes of the corresponding division rates are received from these communication ports. For example, when the data size of the print data is 100 kbytes, the divided print data of 10 kbytes is received from the communication port 46.

Referring again to FIG. 7, as the processing of step S210 ends, the series of processing ends and the original processing is restored.

Meanwhile, if it is judged at step S204 that a response to the execution of the ping command is acquired (Yes), the processing shifts to step S200.

Next, the print control processing will be described in detail with reference to FIG. 10.

Figure 10:
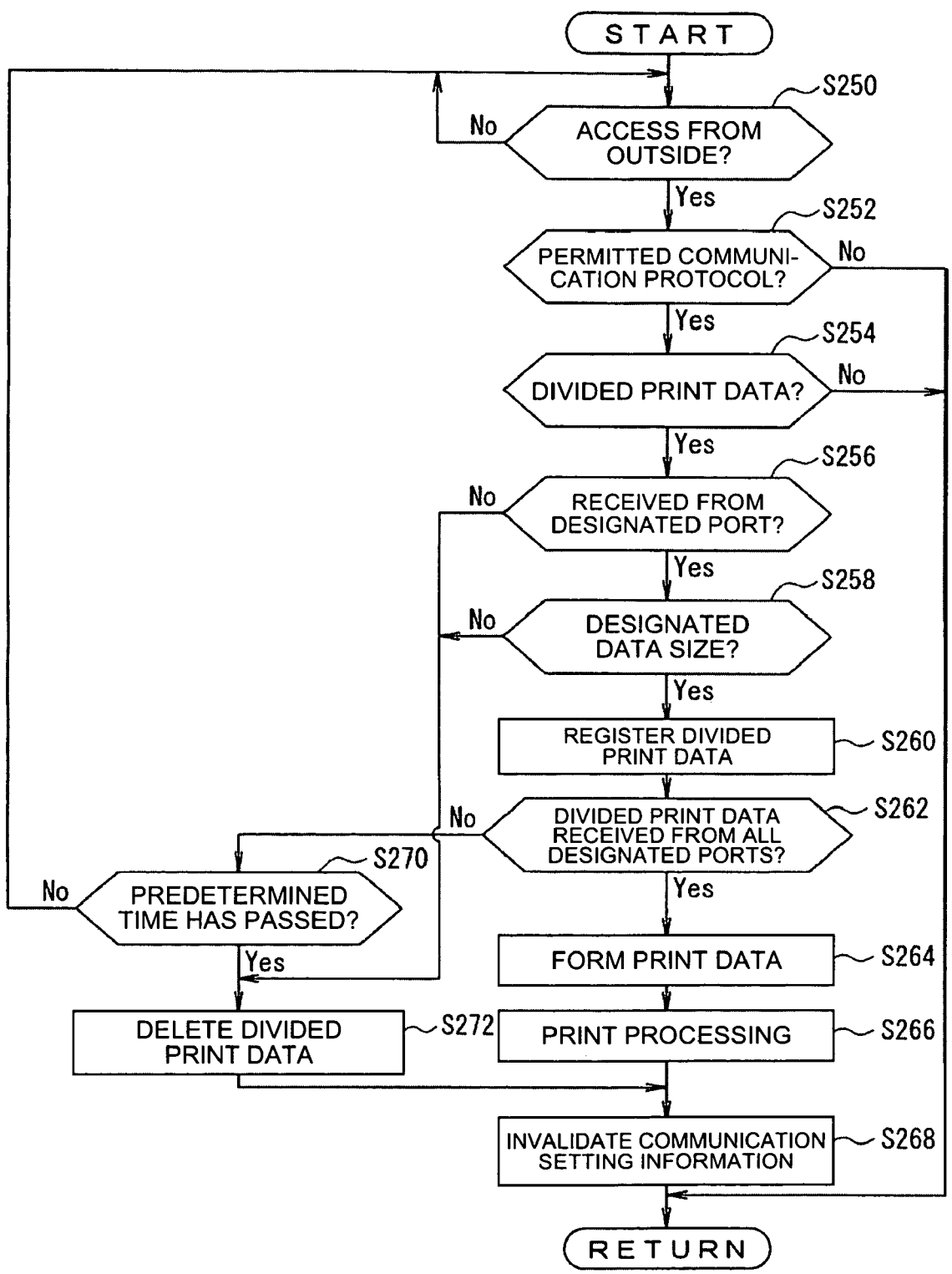
FIG. 10 is a flowchart showing print control processing executed by the network printer 100.

FIG. 10 is a flowchart showing the print control processing executed by the network printer 100.

As the print control processing is executed at the CPU 50, the processing first shifts to step S250 as shown in FIG. 10.

At step S250, it is judged whether there is an access from outside or not. If it is judged that there is an access from outside (Yes), the processing shifts to step S252. However, if it is judged otherwise (No), the processing waits at step S250 until an access is made from outside.

At step S252, it is judged whether the access from outside is an access using a permitted communication protocol or not.

If it is judged that the access is an access using a permitted communication protocol (Yes), the processing shifts to step S254 and it is judged whether the access from outside is transmission of divided print data or not. If it is judged that the access is transmission of divided print data (Yes), the processing shifts to step S256.

At step S256, it is judged whether the received divided print data has been received from a designated communication port or not, on the basis of the decided port allocation. If it is judged that the received divided print data has been received from a designated communication port (Yes), the processing shifts to step S258 and it is judged whether the received divided print data has a designated data size or not on the basis of the data size contained in the packet of the received divided print data and the decided division rate. If it is judged that the received divided print data has a designated data size (Yes), the processing shifts to step S260.

At step S260, the received divided print data is associated with a division number and thus registered to the storage device 62. Then, the processing shifts to step S262 and it is judged whether divided print data have been received from all the designated communication ports or not. If it is judged that divided print data have been received from all the designated communication ports (Yes), the processing shifts to step S264.

At step S264, the divided print data are read out from the storage device 62 in ascending order of the division numbers and the divided print data are combined in the read-out order to form print data. Then, the processing shifts to step S266 and printing is performed by the printer engine 64 on the basis of the formed print data. The processing then shifts to step S268 and the communication setting information in the communication setting information storage unit 10 is invalidated. The series of processing ends and the original processing is restored.

Meanwhile, if it is judged at step S262 that divided print data has not been received from a certain designated communication port (No), the processing shifts to step S270 and it is judged whether a predetermined time (for example, one minute) has passed since the reception of the first divided print data or not. If it is judged that a predetermined time has passed (Yes), the processing shifts to step S272 and all the divided print data registered to the storage device 62 are deleted. Then, the processing shifts to step S268.

On the other hand, if it is judged at step S270 that a predetermined time has not passed since the reception of the first divided print data (No), the processing shifts to step S250.

Meanwhile, if it is judged at step S258 that the received divided print data does not have a designated data size (No), or if it is judged at step S256 that the received divided print data has not been received from a designated communication port (No), the processing shifts to step S272.

On the other hand, if it is judged at step S254 that the access from outside is not transmission of divided print data (No), or if it is judged at step S252 that the access from outside is not an access using a permitted communication protocol (No), the series of processing ends and the original processing is restored.

Next, the structure of the host terminal 200 will be described.

Figure 11:
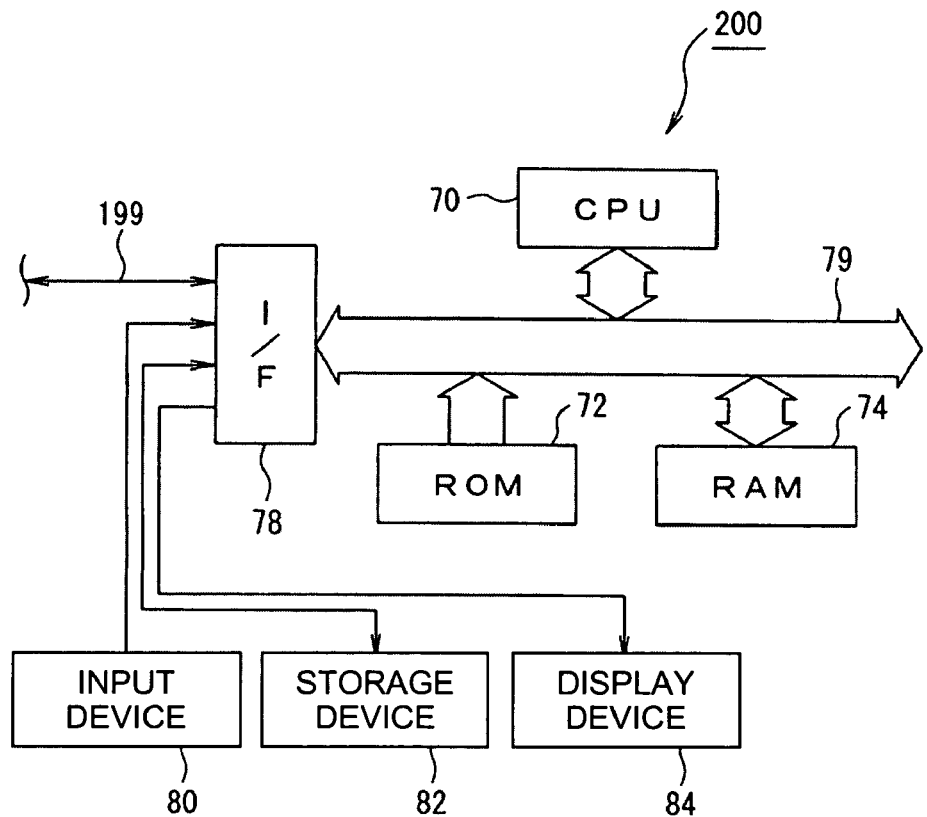
FIG. 11 is a block diagram showing the hardware structure of a host terminal 200.

FIG. 11 is a block diagram showing the hardware structure of the host terminal 200.

The host terminal 200 has a CPU 70 that controls arithmetic operations and the entire system on the basis of a control program, a ROM 72 storing the control program or the like of the CPU 70 in its predetermined area in advance, a RAM 74 for storing data read out from the ROM 72 or the like and the results of arithmetic operations that are necessary in the arithmetic operations at the CPU 70, and an I/F 78 that mediates input and output of data from and to an external device, as shown in FIG. 11. These parts are connected to each other and enable transmission and reception of data by a bus 79, which is a signal line for transferring data.

To the I/F 78, an input device 80 including a keyboard, mouse or the like that enables input of data as a human interface, a storage device 82 storing data, tables and the like as files, a display device 84 that displays a screen on the basis of an image signal, and a signal line for connecting to the network 199, are connected as external devices.

The CPU 70 includes a micro-processing unit or the like. It starts a predetermined program stored in a predetermined area in the ROM 72 and executes print request processing shown in a flowchart of FIG. 12 in accordance with the program.

Figure 12:
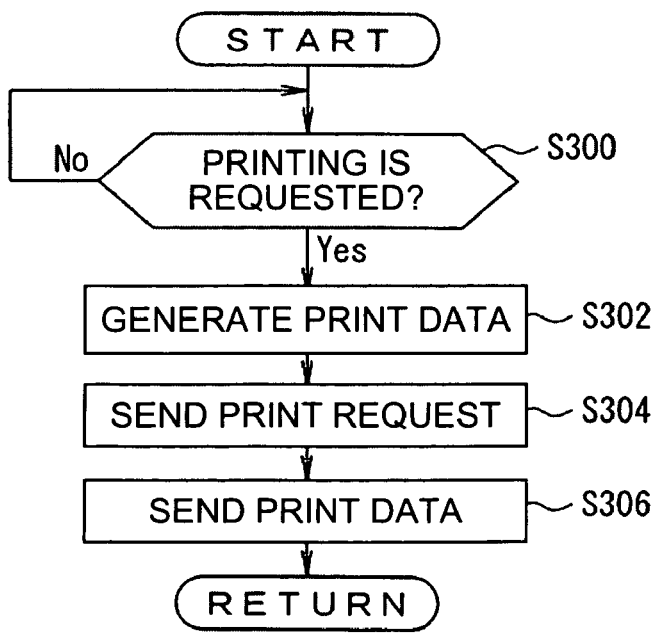
FIG. 12 is a flowchart showing print request processing executed by the host terminal 200.

FIG. 12 is a flowchart showing the print request processing executed by the host terminal 200.

As the print request processing is executed at the CPU 70, the processing first shifts to step S300 as shown in FIG. 12.

At step S300, it is judged whether or not printing is requested from a document preparation application or the like. If it is judged that printing is requested (Yes), the processing shifts to step S302. However, if it is judged otherwise (No), the processing waits at step S300 until printing is requested.

At step S302, print data is generated. The processing shifts to step S304 and a print request is sent to the printer server 300. The processing shifts to step S306 and the generated print data is sent to the printer server 300. Then, the series of processing ends and the original processing is restored.

Next, the structure of the printer server 300 will be described.

Figure 13:
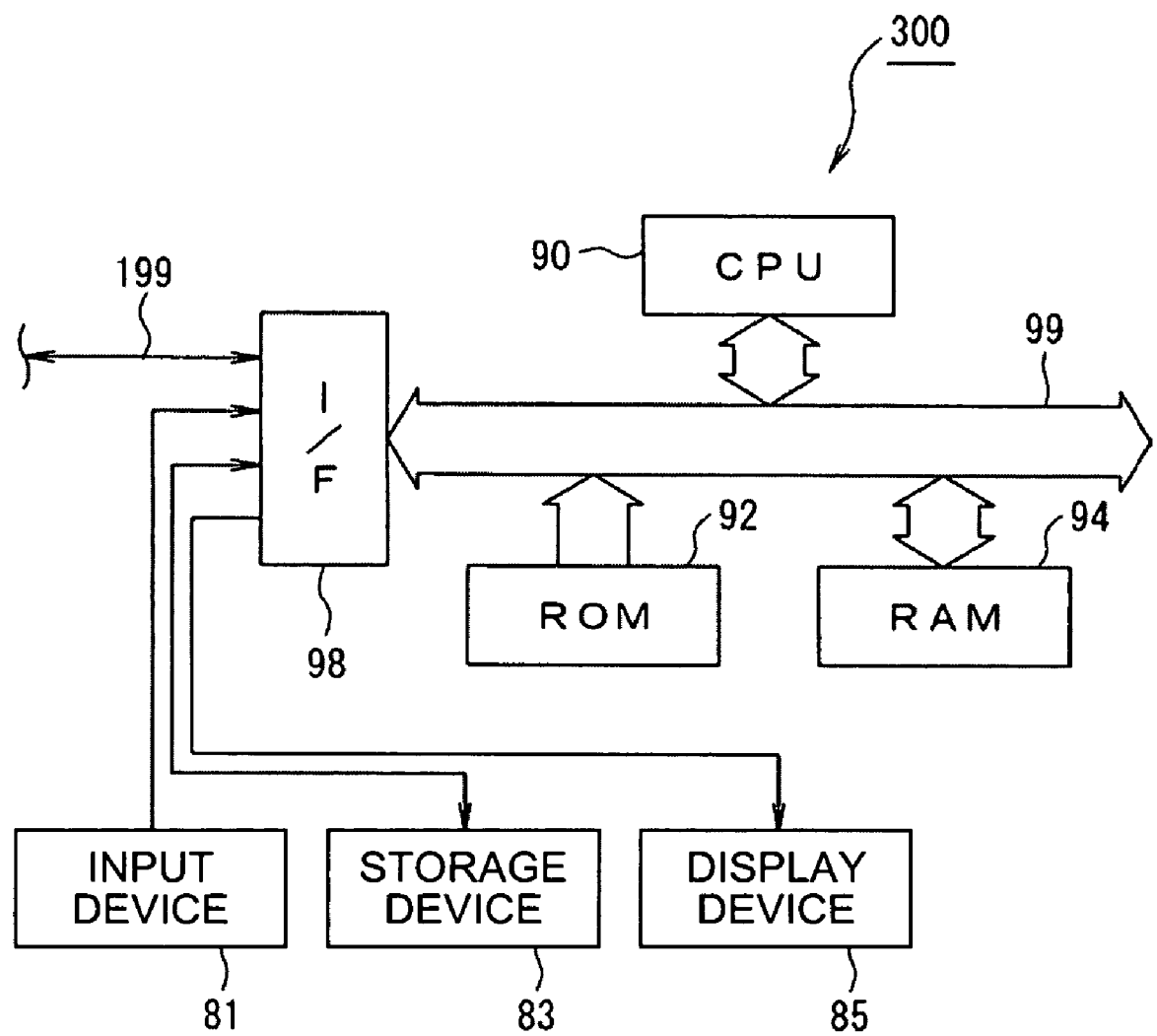
FIG. 13 is a block diagram showing the hardware structure of a printer server 300.

FIG. 13 is a block diagram showing the hardware structure of the printer server 300.

The printer server 300 has a CPU 90 that controls arithmetic operations and the entire system on the basis of a control program, a ROM 92 storing the control program or the like of the CPU 90 in its predetermined area in advance, a RAM 94 for storing data read out from the ROM 92 or the like and the results of arithmetic operations that are necessary in the arithmetic operations at the CPU 90, and an I/F 98 that mediates input and output of data from and to an external device, as shown in FIG. 13. These parts are connected to each other and enable transmission and reception of data by a bus 99, which is a signal line for transferring data.

To the I/F 98, an input device 81 including a keyboard, mouse or the like that enables input of data as a human interface, a storage device 83 storing data, tables and the like as files, a display device 85 that displays a screen on the basis of an image signal, and a signal line for connecting to the network 199, are connected as external devices.

The CPU 90 includes a micro-processing unit or the like. It starts a predetermined program stored in a predetermined area in the ROM 92 and executes print request acceptance processing shown in a flowchart of FIG. 14 in accordance with the program.

Figure 14:
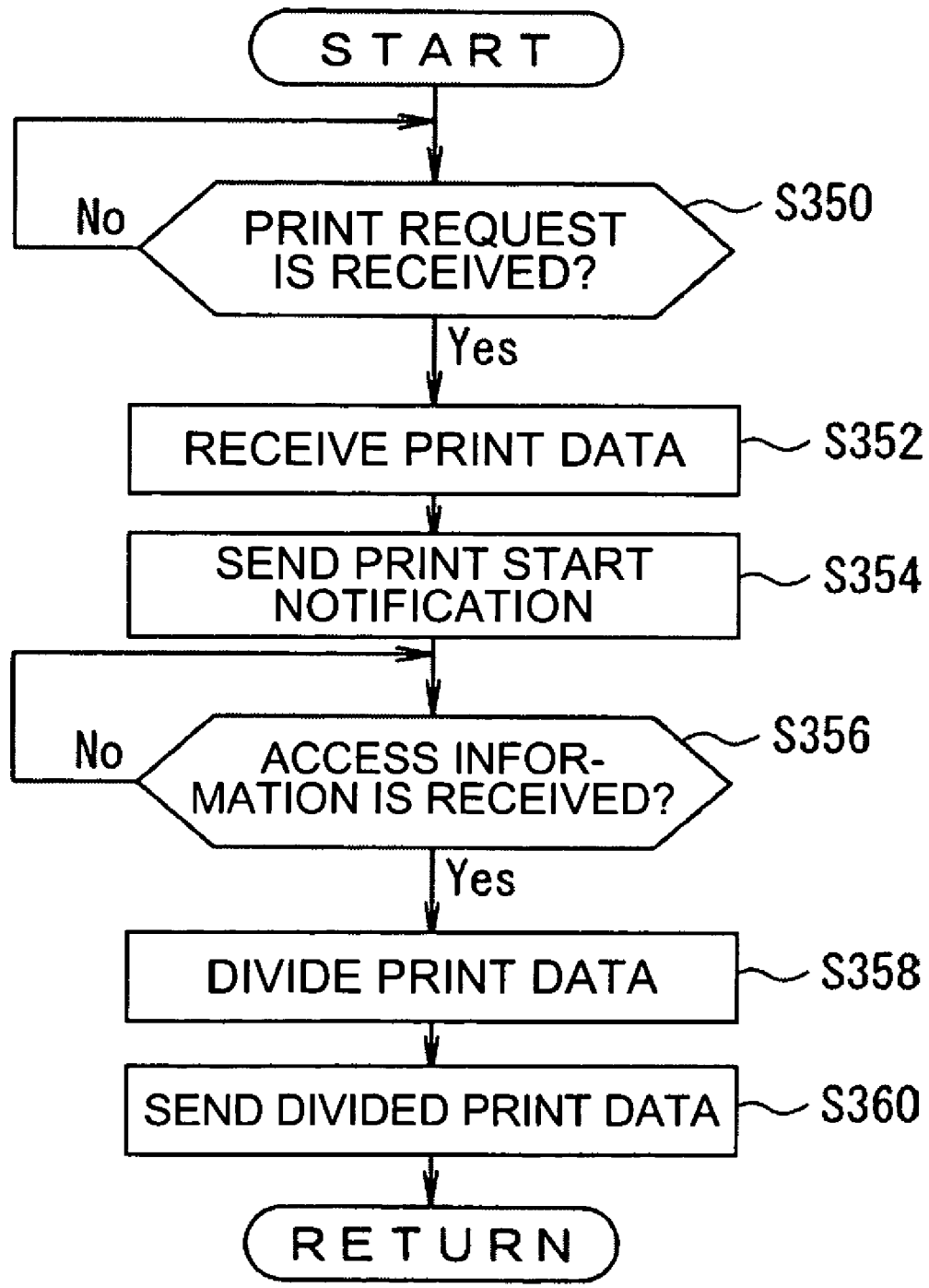
FIG. 14 is a flowchart showing print request acceptance processing executed by the printer server 300.

FIG. 14 is a flowchart showing the print request acceptance processing executed by the printer server 300.

As the print request acceptance processing is executed at the CPU 90, the processing first shifts to step S350 as shown in FIG. 14.

At step S350, it is judged whether a print request is received or not. If it is judged that a print request is received (Yes), the processing shifts to step S352. However, if it is judged otherwise (No), the processing waits at step S350 until a print request is received.

At step S352, print data is received. The processing shifts to step S354 and a print start notification is sent to the network printer 100. Then, the processing shifts to step S356.

At step S356, it is judged whether access information is received or not. If it is judged that access information is received (Yes), the processing shifts to step S358. However, if it is judged otherwise (No), the processing waits at step S356 until access information is received.

At step S358, the received print data is divided on the basis of division rates contained in the received access information. The processing shifts to step S360 and the divided print data are sent to the network printer 100 via plural communication ports on the basis of IP address, communication port numbers and port allocation contained in the received access information. The series of processing ends and the original processing is restored.

Next, the operation of this embodiment will be described.

First, a case of setting a communication protocol for permitting communication will be explained.

A user at the network printer 100 requests from the operating panel 60 that a communication protocol should be set.

At the network printer 100, when it is requested that a communication protocol should be set, the processing of step S102 is performed. A list of communication protocols is displayed on the operating panel 60 and the user is prompted to select a communication protocol. At this point, the user selects a communication protocol for permitting communication.

At the network printer 100, as the communication protocol is selected, the processing of step S104 is performed and the selected communication protocol is set as a communication protocol for permitting communication.

This setting is similarly performed to the printer server 300. Specifically, the communication protocol for permitting communication in the network printer 100 and the communication protocol for permitting communication in the printer server 300 are made coincident with each other. Hereinafter, the communication protocol set in the network printer 100 is referred to as a specified communication protocol.

Next, a case of performing printing at the network printer 100 will be described.

The user at the host terminal 200 requests printing by using a document preparation application or the like.

At the host terminal 200, when printing is requested, the processing of steps S302 to S306 is performed. Print data is generated and the generated print data is sent together with a print request to the printer server 300.

At the printer server 300, when the print request is received, the processing of steps S352 and S354 is performed. The print data is received and a print start notification is sent to the network printer 100.

At the network printer 100, when the print start notification is received, the processing of steps S156 and S158 is performed. IP address, communication port numbers, division rates and port allocation are decided, and access information representing the decided IP address, communication port numbers, division rates and port allocation is sent to the printer server 300.

Also, at the network printer 100, the processing of step S160 is performed and the communication setting information in the communication setting information storage unit 10 is updated on the basis of the decided IP address and communication port numbers. This causes the IP address and communication ports to be set in the network printer 100 and enables the network printer 100 to receive divided print data sent by using the specified communication protocol. Meanwhile, at the printer server 300, when the access information is received, the processing of steps S358 and S360 is performed. The print data is divided on the basis of the division rates contained in the received access information, and the divided print data are sent to the network printer 100 via the plural communication ports on the basis of the IP address, communication port numbers and port allocation contained in the received access information.

At the network printer 100, when divided print data of a designated data size is received from a designated communication port, the processing of step S260 is performed and the received divided print data is associated with a division number and thus registered to the storage device 62. As divided print data is received from all the designated communication ports, the processing of steps S264 and S266 is performed. The divided print data are read out from the storage device 62 in ascending order of their division numbers. The divided print data are combined in the read-out order to form print data. Printing is performed by the printer engine 64 on the basis of the formed print data.

Also, at the network printer 100, the processing of step S268 is performed and the communication setting information in the communication setting information storage unit 10 is invalidated. This disables the network printer 100 from receiving anything except for a print start notification sent by using the specified communication protocol.

A print start notification sent by using communication protocols other than the specified communication protocol is temporarily received by the network printer 100 but it is discarded via the processing of step S152.

Divided print data sent by using communication protocols other than the specified communication protocol are discarded via the processing of step S252.

Even divided print data sent by using the specified communication protocol is discarded via the processing of steps S256 and S272 if it has been sent via communication ports other than the designated communication port.

Also, even divided print data sent by using the designated communication port is discarded via the processing of steps S258 and S272 if it does not have the designated data size.

Moreover, if all the divided print data cannot be sent before a predetermined time passes from the transmission of the first divided print data, all the divided print data are discarded via the processing of steps S270 and 272.

In this manner, in this embodiment, the network printer 100 decides IP address and communication port numbers in accordance with the received print start notification, updates the communication setting information in the communication setting information storage unit 10 on the basis of the decided IP address and communication port numbers, receives print data on the basis of the communication setting information in the communication setting information storage unit 10, and performs printing based on the received print data.

Thus, since the communication setting in the network printer 100 is changed every time printing is performed, the communication port cannot be easily specified from outside and the possibility of unauthorized access can be reduced. Also, as a printer driver or the like that corresponds to changes of the communication setting can be installed in the printer server 300, it is not necessary to perform setting with respect to the network printer 100. Therefore, security in an environment used by unspecified multiple host terminals or the like can be improved, compared with the foregoing techniques.

Also, in this embodiment, the network printer 100 invalidates the communication setting information in the communication setting information storage unit 10 at the time when printing by the printer engine 64 ends.

Thus, as the number of opportunities to communicate with the network printer 100 is reduced, the possibility of unauthorized access can be reduced. This enables further improvement in security.

Moreover, in this embodiment, the network printer 100 sends access information representing IP address and communication port numbers to the source of print start notification.

Thus, even when rules for deciding the IP address and communication port numbers are changed at the network printer 100, the printer server 300 can be continuously used without updating the printer driver or the like.

Also, in this embodiment, the network printer 100 forms print data based on divided print data received via the plural communication ports and performs printing based on the formed print data.

Thus, since printing cannot be performed without dividing the print data and sending each of the divided print data via the plural communication ports, the possibility of unauthorized access can be further reduced. This can further improve security.

Moreover, the network printer 100 decides division rates of the print data and receives the divided print data via the plural communication ports on the basis of the decided division rate.

Thus, since printing cannot be performed unless the print data is divided at the division rates decided by the network printer 100, the possibility of unauthorized access can be further reduced. This enables further improvement in security.

Also, in this embodiment, the network printer 100 sends access information representing the decided division rates to the source of the print start notification.

Thus, even when rules for deciding the division rates are changed at the network printer 100, the printer server 300 can be continuously used without updating the printer driver or the like.

Moreover, in this embodiment, the network printer 100 decides port allocation, combines the divided print data on the basis of the decided port allocation, and thus forms print data.

Thus, since printing cannot be performed unless each divided output data is sent via the communication port specified by the port allocation decided by the network printer 100, the possibility of unauthorized access can be further reduced. This can further improve security.

Also, in this embodiment, the network printer 100 sends access information representing the decided port allocation to the source of the print start notification.

Thus, even when rules for deciding the port allocation are changed at the network printer 100, the printer server 300 can be continuously used without updating the printer driver or the like.

Moreover, in this embodiment, the network printer 100 sets a communication protocol for permitting communication and rejects an access using communication protocol other than the set communication protocol.

Thus, since printing cannot be performed without using the communication protocol set by the network printer 100, the possibility of unauthorized access can be further reduced. This can further improve security.

In the first embodiment, the network printer 100 is equivalent to the output device according to mode 1 to 8, 14 to 17, 19, 21, 24, 38, 39 or 53. The CPU 50 is equivalent to the arithmetic operation unit according to mode 68. The I/F 58 is equivalent to the communication unit according to mode 68. The print start notification receiving unit 11, the I/F 58 and steps S150 and S154 are equivalent to the output start notification receiving unit according to mode 1 or 15. Steps S150 and S154 are also equivalent to the reception of the output start notification according to mode 39, 53, 67 or 68. The communication setting content deciding unit 12 and step S156 are equivalent to the communication setting content deciding unit according to mode 1, 4 to 8, 15, 19 to 21, 23 or 24.

Also, in the first embodiment, step S156 is equivalent to the decision of the communication setting content according to mode 39, 42 to 46, 53, 56 to 60, 67, 68, 71 to 75. The communication setting execution unit 13 and step S160 are equivalent to the communication setting execution unit according to mode 1, 3, 15 or 17. Step S160 is also equivalent to the execution of the communication setting according to mode 39, 41, 53, 55, 67, 68 or 70. The print data receiving unit 14, the I/F 58 and steps S250 and S254 to S258 are equivalent to the output data receiving unit according to mode 1, 4, 5, 7, 15, 19, 20 or 23.

Moreover, in the first embodiment, steps S250 and S254 to S258 are equivalent to the reception of the output data according to mode 39, 42, 43, 45, 53, 56, 57, 59, 67, 68, 71, 72 or 74. The print data forming unit 15 and step S264 are equivalent to the output data forming unit according to mode 4, 7, 19 or 23. Step S264 is also equivalent to the forming of the output data according to mode 42, 45, 56, 59, 71 or 74. The print unit 16, the printer engine 64 and step S266 are equivalent to the output unit according to mode 1, 2, 4, 15, 16 or 19. Step S266 is also equivalent to the output according to mode 39, 40, 42, 53, 54, 56, 67 to 69 or 71.

Also, in the first embodiment, the access information sending unit 17, the I/F 58 and step S158 are equivalent to the communication setting information sending unit according to mode 3 or 17, the division rate information sending unit according to mode 6 or 21, or the communication path correspondence information sending unit according to mode 8 or 24. Step S158 is also equivalent to the sending of the communication setting information according to mode 41, 55 or 70, the sending of the division rate information according to mode 44, 58 or 73, or the sending of the communication path correspondence information according to mode 46, 60 or 75. The communication setting invalidating unit 18 and step S268 are equivalent to the communication setting invalidating unit according to mode 2 or 16.

Moreover, in the first embodiment, step S268 is equivalent to the invalidation of the communication setting according to mode 40, 54 or 69. The communication protocol setting unit 19 and steps S102 and S104 are equivalent to the communication protocol setting unit according to mode 14 or 38. Steps S102 and S104 are also equivalent to the setting of the communication protocol according to mode 52, 66 or 83. The communication protocol limiting unit 20 and steps S152 and S252 are equivalent to the communication protocol limiting unit according to mode 14 or 38. Steps S152 and S252 are also equivalent to the limiting of the communication protocol according to mode 52, 66 or 83. The host terminal 200 is equivalent to the output request device according to mode 15 or 17.

Also, in the first embodiment, the print data sending unit 31, the I/F 78 and step S306 are equivalent to the second output data sending unit according to mode 17, 21 or 24. The printer server 300 is equivalent to the output management device according to mode 15, 17, 21 or 24. The print data receiving unit 40, the I/F 98 and step S352 are equivalent to the second output data receiving unit according to mode 17, 21 or 24. The print start notification sending unit 41, the I/F 98 and step S354 are equivalent to the output start notification unit according to mode 15. The access information receiving unit 42, the I/F 98 and step S356 are equivalent to the communication setting information receiving unit according to mode 17, the division rate information receiving unit according to mode 21, or the communication path correspondence information receiving unit according to mode 24.

Moreover, in the first embodiment, the print data sending unit 43, the I/F 98 and steps S358 and S360 are equivalent to the output data sending unit according to mode 17. The IP address and the communication ports are equivalent to the communication paths according to mode 1, 4, 5, 7, 15, 19 to 21, 23, 24, 39, 42, 43, 45, 53, 56, 57, 59, 67, 68, 71, 72 or 74. The print data is equivalent to the output data according to mode 1, 2, 4, 5, 7, 15 to 17, 19 to 21, 23, 24, 39, 40, 42, 43, 45, 53, 54, 56, 57, 59, 67 to 69, 71, 72 or 74. The print start notification is equivalent to the output start notification according to mode 1, 3, 6, 8, 15, 39, 41, 44, 46, 53, 55, 58, 60, 67, 68, 70, 73 or 75.

Also, in the first embodiment, the access information is equivalent to the communication setting information according to mode 3, 17, 41, 55 or 70, the division rate information according to mode 6, 21, 44, 58 or 73, or the communication path correspondence information according to mode 8, 24, 46, 60 or 75.

Figure 15:
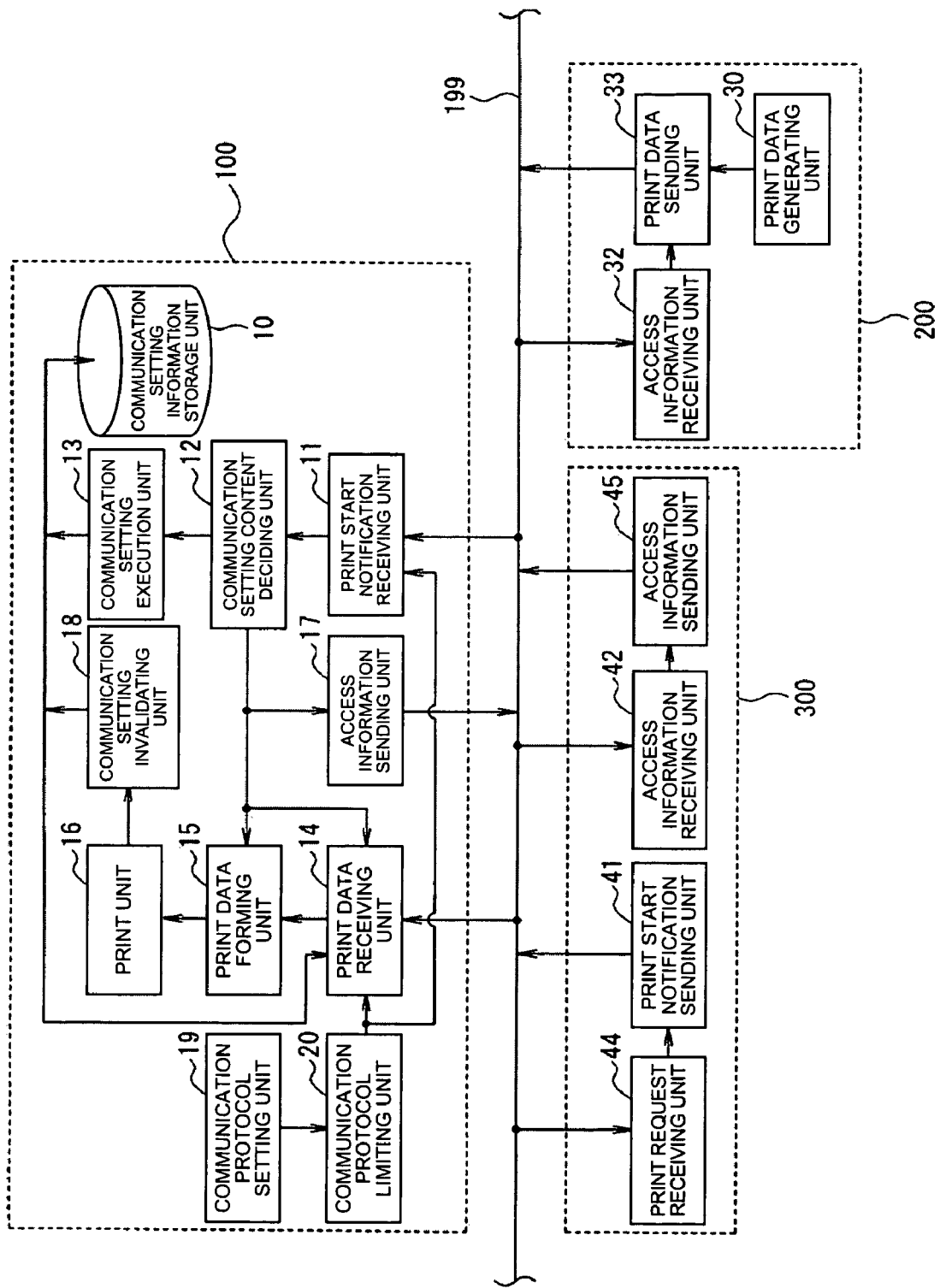
FIG. 15 is a functional block diagram showing an outline of functions of a network system.
Figure 16:
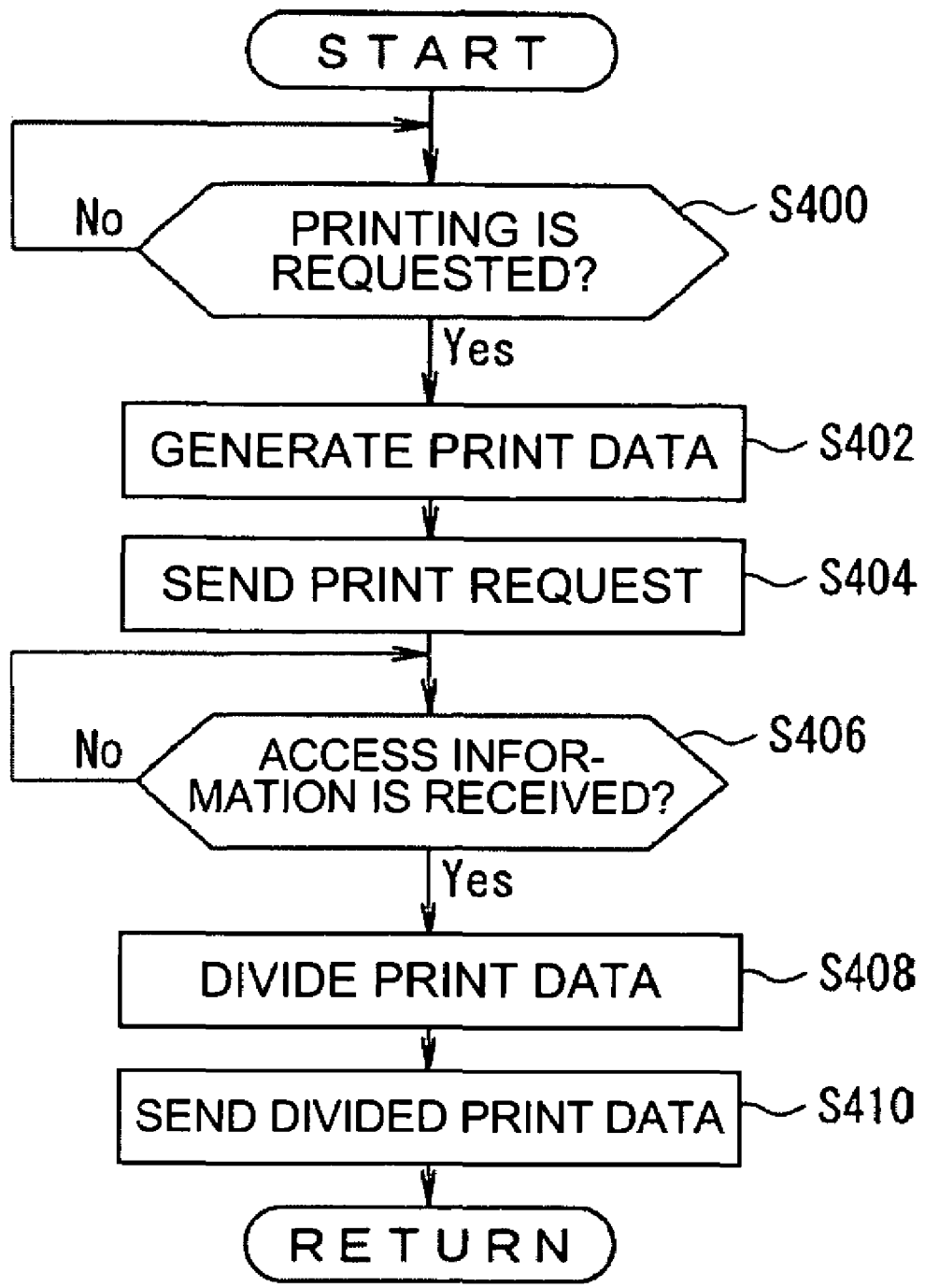
FIG. 16 is a flowchart showing print request processing executed by a host terminal 200.
Figure 17:
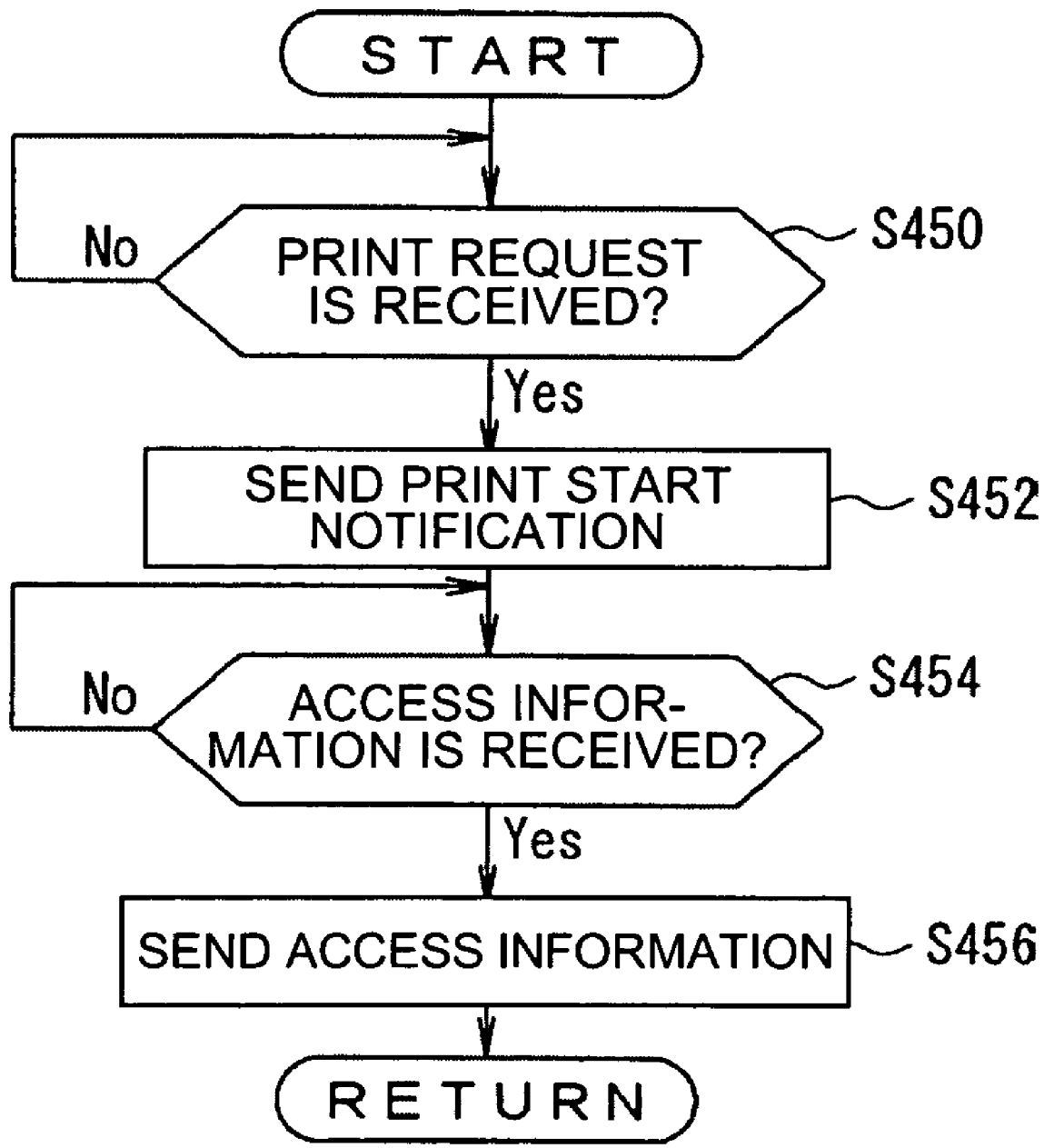
FIG. 17 is a flowchart showing print request acceptance processing executed by a printer server 300.

Next, a second embodiment of the invention will be described with reference to the drawings. FIGS. 15 to 17 show a second embodiment of a security output device, a security output system, an output device control program and storage medium, and a security output method according to the invention.

In this embodiment, a security output device, a security output system, an output device control program and storage medium, and a security output method according to the invention are applied to a case of performing security communication at a network printer 100 and thus performing printing, as shown in FIG. 15. This embodiment differs from the first embodiment in that a host terminal 200 sends print data to the network printer 100. Hereinafter, only the features different from the first embodiment will be described. The features similar to those of the first embodiment are denoted by the same numerals and will not be described further in detail.

First, an outline of functions of a network system to which the invention is applied will be described with reference to FIG. 15.

FIG. 15 is a functional block diagram showing an outline of functions of the network system.

A network printer 100, a host terminal 200, and a printer server 300 are connected to a network 199, as shown in FIG. 15. The network printer 100 has the same structure as the network printer 100 in the first embodiment.

The host terminal 200 has a print data generating unit 30, an access information receiving unit 32 that receives access information, and a print data sending unit 33 that sends the print data generated by the print data generating unit 30 to the printer server 300 on the basis of the access information received by the access information receiving unit 32.

The print data sending unit 33 sends a print request to the printer server 300 at the time when the print data is generated by the print data generating unit 30. The print data sending unit 33 also divides the print data on the basis of division rates contained in the access information and sends the divided print data to the network printer 100 via plural communication ports on the basis of IP address, communication port numbers and port allocation contained in the access information.

The printer server 300 has a print request receiving unit 44 that receives a print request, a print start notification sending unit 41 that sends a print start notification to the network printer 100 at the time when the print request is received by the print request receiving unit 44, an access information receiving unit 42, and an access information sending unit 45 that sends the access information received by the access information receiving unit 42 to the source of the print request.

Next, the structure of the host terminal 200 will be described.

The CPU 70 starts a predetermined program stored in a predetermined area of the ROM 72 and executes print request processing shown in a flowchart of FIG. 16 instead of the print request processing shown in the flowchart of FIG. 12.

FIG. 16 is a flowchart showing the print request processing executed by the host terminal 200.

As the print request processing is executed at the CPU 70, the processing first shifts to step S400 as shown in FIG. 16.

At step S400, it is judged whether or not printing is requested from a document preparation application or the like. If it is judged that printing is requested (Yes), the processing shifts to step S402. However, if it is judged otherwise (No), the processing waits at step S400 until printing is requested.

At step S402, print data is generated. The processing shifts to step S404 and a print request is sent to the printer server 300. The processing shifts to step S406 and it is judged whether access information is received or not. If it is judged that access information is received (Yes), the processing shifts to step S408. However, if it is judged otherwise (No), the processing waits at step S406 until access information is received.

At step S408, the generated print data is divided on the basis of division rates contained in the received access information. The processing shifts to step S410 and the divided print data are sent to the network printer 100 via plural communication ports on the basis of IP address, communication port numbers and port allocation contained in the received access information. Then, the series of processing ends and the original processing is restored.

Next, the structure of the printer server 300 will be described.

The CPU 90 starts a predetermined program stored in a predetermined area of the ROM 92 and executes print request acceptance processing shown in a flowchart of FIG. 17 instead of the print request acceptance processing shown in the flowchart of FIG. 14.

FIG. 17 is a flowchart showing the print request acceptance processing executed by the printer server 300.

As the print request acceptance processing is executed at the CPU 90, the processing first shifts to step S450 as shown in FIG. 17.

At step S450, it is judged whether a print request is received or not. If it is judged that a print request is received (Yes), the processing shifts to step S452. However, if it is judged otherwise (No), the processing waits at step S450 until a print request is received.

At step S452, a print start notification is sent to the network printer 100. The processing shifts to step S454 and it is judged whether access information is received or not. If it is judged that access information is received (Yes), the processing shifts to step S456. However, if it is judged otherwise (No), the processing waits at step S454 until access information is received.

At step S456, the received access information is sent to the source of the print request. Then, the series of processing ends and the original processing is restored.

Next, the operation of this embodiment will be described.

A user at the host terminal 200 requests printing by using a document preparation application or the like.

At the host terminal 200, as printing is requested, the processing of steps S402 and S404 is performed. Print data is generated and a print request is sent to the printer server 300.

At the printer server 300, when the print request is received, the processing of step S452 is performed and a print start notification is sent to the network printer 100.

At the network printer 100, when the print start notification is received, IP address, communication port numbers, division rates and port allocation are decided and access information representing the decided IP address, communication port numbers, division rates and port allocation is sent to the printer server 300 through the processing of steps S156 and S158.

Also, at the network printer 100, the processing of step S160 is performed and the communication setting information in the communication setting information storage unit 10 is updated on the basis of the decided IP address and communication port numbers. This causes the IP address and communication ports to be set in the network printer 100 and enables the network printer 100 to receive divided print data sent by using a specified communication protocol.

Meanwhile, at the printer server 300, when the access information is received, the processing of step S456 is performed and the received access information is sent to the host terminal 200.

At the host terminal 200, when the access information is received, the processing of steps S408 and S410 is performed. The print data is divided on the basis of division rates contained in the received access information and the divided print data are sent to the network printer 100 via plural communication ports on the basis of IP address, communication port numbers and port allocation contained in the received access information.

At the network printer 100, when divided print data of a designated data size is received form a designated communication port, the processing of step S260 is performed and the received divided print data is associated with a division number and thus registered to the storage device 62. When divided print data are received from all the designated communication ports, the processing of steps S264 and S266 is performed. The divided print data are read out from the storage device 62 in ascending order of their division numbers, and the divided print data are combined in the read-out order to form print data. Then, printing is performed by the printer engine 64 on the basis of the formed print data.

Also, at the network printer 100, the processing of step S268 is performed and the communication setting information in the communication setting information storage unit 10 is invalidated. This disables the network printer 100 from receiving anything except for a print start notification sent by using the specified communication protocol.

In the second embodiment, the host terminal 200 is equivalent to the output request device according to mode 15, 18, 22 or 25. The access information receiving unit 32, the I/F 78 and step S406 are equivalent to the second communication setting information receiving unit according to mode 18, the second division rate information receiving unit according to mode 22, or the second communication path correspondence information receiving unit according to mode 25. The print data sending unit 33, the I/F 78 and steps S408 and S410 are equivalent to the output data sending unit according to mode 18, 22 or 25. The printer server 300 is equivalent to the output management device according to mode 15, 18, 22 or 25. The print start notification sending unit 41, the I/F 98 and step S452 are equivalent to the output start notification unit according to mode 15.

Also, in the second embodiment, the access information receiving unit 42, the I/F 98 and step S454 are equivalent to the communication setting information receiving unit according to mode 18, the division rate information receiving unit according to mode 22, or the communication path correspondence information receiving unit according to mode 25. The access information sending unit 45, the I/F 98 and step S456 are equivalent to the second communication setting information sending unit according to mode 18, the second division rate information sending unit according to mode 22, or the second communication path correspondence information sending unit according to mode 25.

Figure 18:
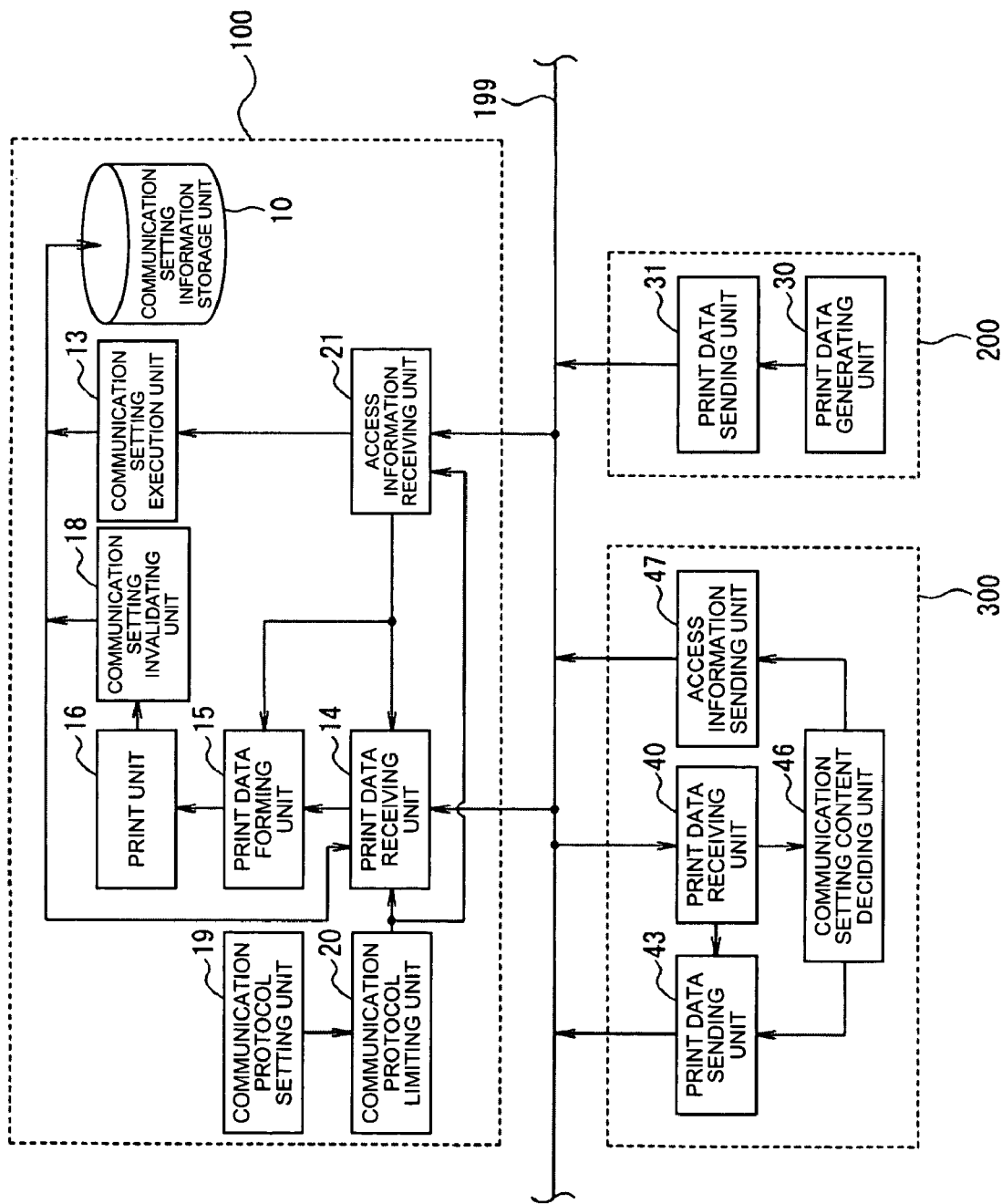
FIG. 18 is a functional block diagram showing an outline of functions of a network system.
Figure 19:
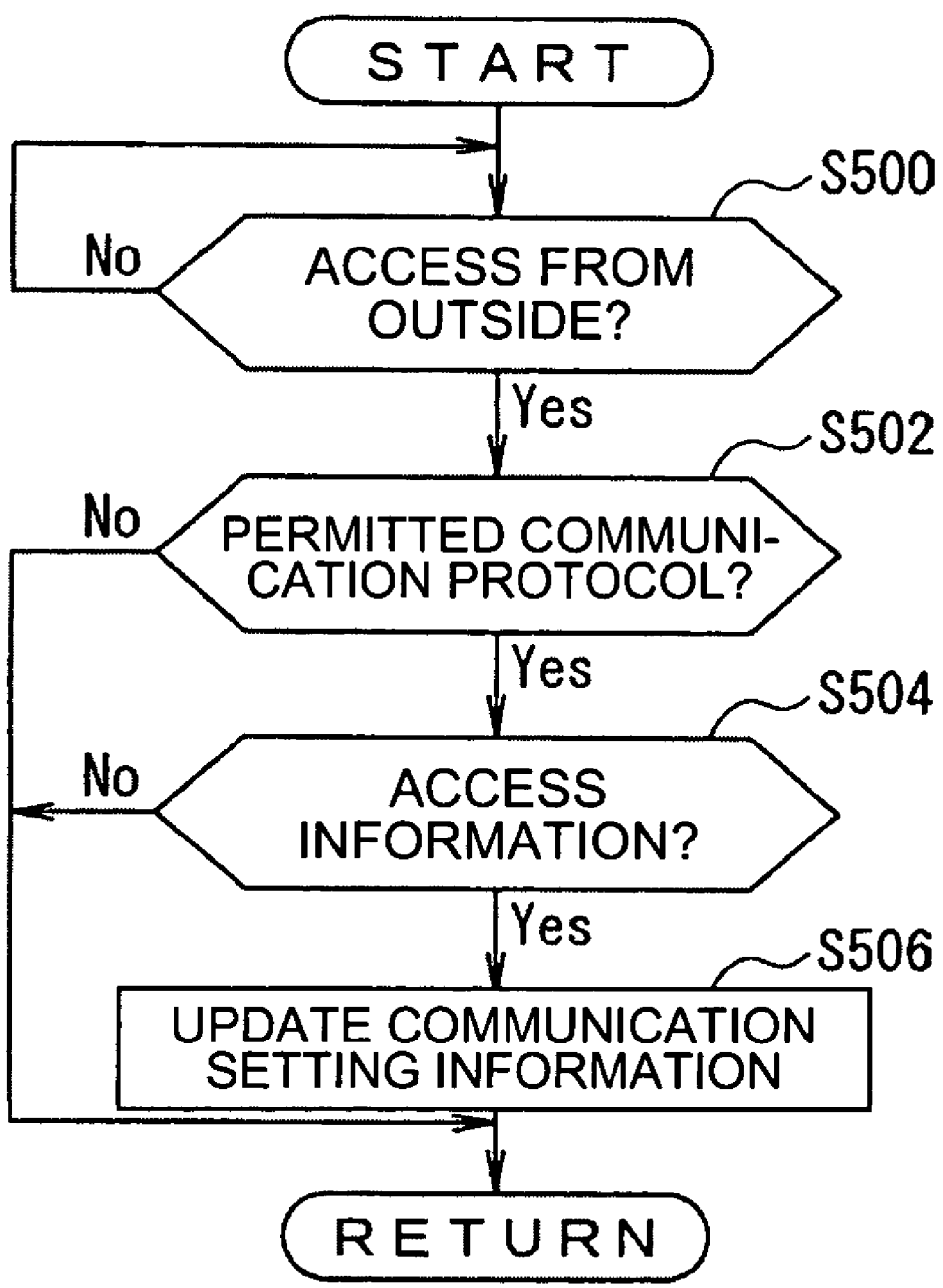
FIG. 19 is a flowchart showing communication setting processing executed by a network printer 100.
Figure 20:
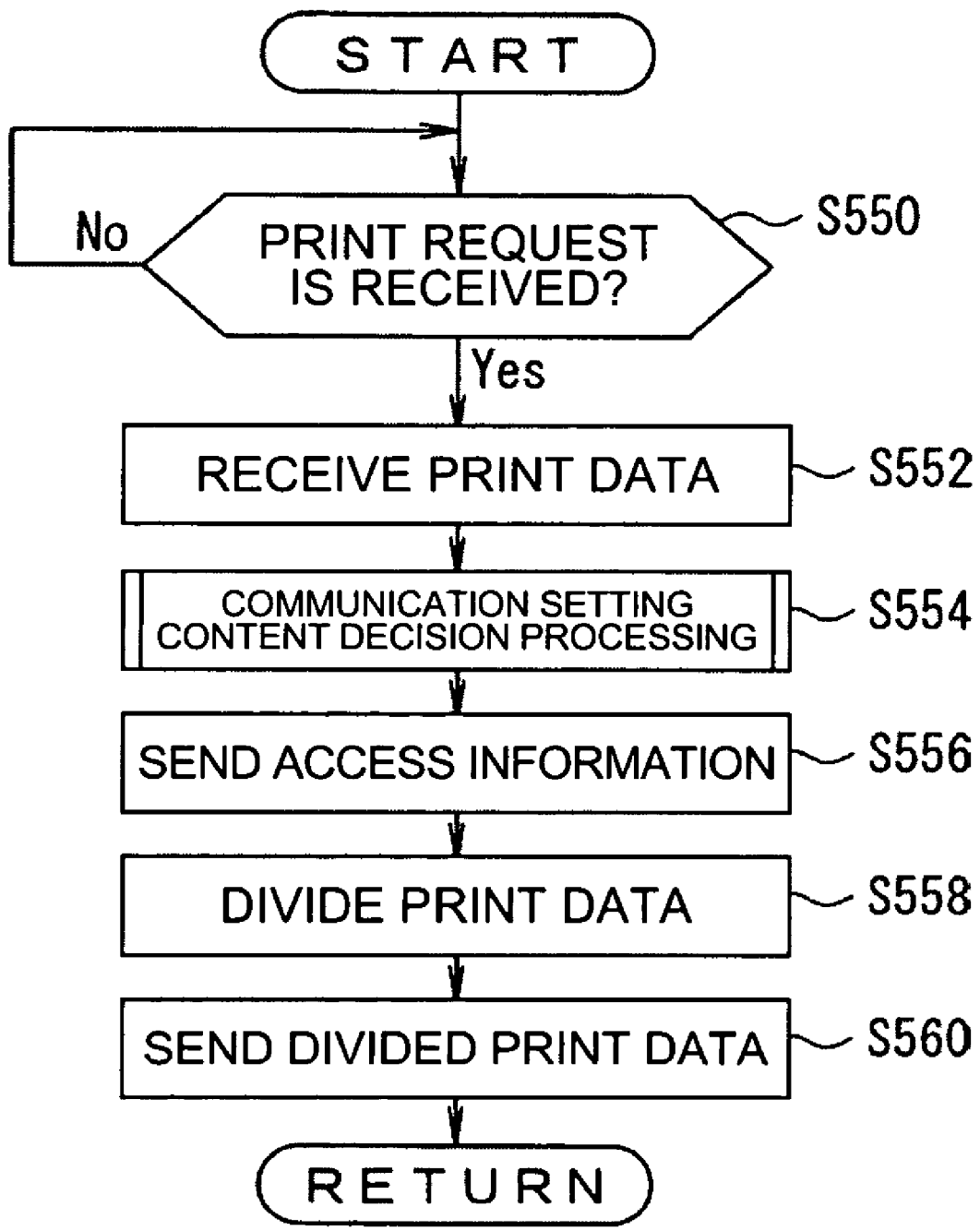
FIG. 20 is a flowchart showing print request acceptance processing executed by a printer server 300.

Next, a third embodiment of the invention will be described with reference to the drawings. FIGS. 18 to 20 show a third embodiment of a security output device, a security output system, an output device control program and storage medium, and a security output method according to the invention.

In this embodiment, a security output device, a security output system, an output device control program and storage medium, and a security output method according to the invention are applied to a case of performing security communication at a network printer 100 and thus performing printing, as shown in FIG. 18. This embodiment differs from the first embodiment in that a printer server 300 decides IP address, communication port numbers, division rates and port allocation. Hereinafter, only the features different from the first embodiment will be described. The features similar to those of the first embodiment are denoted by the same numerals and will not be described further in detail.

First, an outline of functions of a network system to which the invention is applied will be described with reference to FIG. 18.

FIG. 18 is a functional block diagram showing an outline of functions of the network system.

A network printer 100, a host terminal 200, and a printer server 300 are connected to a network 199, as shown in FIG. 18.

The network printer 100 has a communication setting information storage unit 10, an access information receiving unit 21 that receives access information, and a communication setting execution unit 13 that updates the communication setting information in the communication setting information storage unit 10 on the basis of IP address and communication port numbers contained in the access information received by the access information receiving unit 21.

The network printer 100 also has a print data receiving unit 14, a print data forming unit 15, a print unit 16, a communication setting invalidating unit 18, a communication protocol setting unit 19, and a communication protocol limiting unit 20.

The print data receiving unit 14 receives divided print data via plural communication ports specified by the communication setting information in the communication setting information storage unit 10 on the basis of division rates contained in the access information received by the access information receiving unit 21.

The print data forming unit 15 combines the divided print data received by the print data receiving unit 14 on the basis of port allocation contained in the access information received by the access information receiving unit 21, and thus forms print data.

The printer server 300 has a print data receiving unit 40, a communication setting content deciding unit 46 that decides IP address, communication port numbers, division rates and port allocation at the time when the print data is received by the print data receiving unit 40, an access information sending unit 47 that sends access information representing the IP address, communication port numbers, division rates and port allocation decided by the communication setting content deciding unit 46 to the network printer 100, and a print data sending unit 43 that sends the print data received by the print data receiving unit 40 to the network printer 100.

The print data sending unit 43 divides the print data on the basis of the division rates decided by the communication setting content deciding unit 46 and sends the divided print data to the network printer 100 via plural communication ports on the basis of the IP address, communication port numbers and port allocation decided by the communication setting content deciding unit 46.

Next, the structure of the network printer 100 will be described.

The CPU 50 starts a predetermined program stored in a predetermined area of the ROM 52 and executes communication setting processing shown in a flowchart of FIG. 19 instead of the communication setting processing shown in the flowchart of FIG. 15.

FIG. 19 is a flowchart showing the communication setting processing executed by the network printer 100.

As the communication setting processing is executed at the CPU 50, the processing first shifts to step S500 as shown in FIG. 19.

At step S500, it is judged whether there is an access from outside or not. If it is judged that there is an access from outside (Yes), the processing shifts to step S502. However, if it is judged otherwise (No), the processing waits at step S500 until an access is made from outside.

At step S502, it is judged whether the access from outside is an access using a permitted communication protocol or not. If it is judged that the access is an access using a permitted communication protocol (Yes), the processing shifts to step S504. However, if it is judged otherwise (No), the series of processing ends and the original processing is restored.

At step S504, it is judged whether the access from outside is transmission of access information or not. If it is judged that the access from outside is transmission of access information (Yes), the processing shifts to step S506 and the communication setting information in the communication setting information storage unit 10 is updated on the basis of IP address and communication port numbers contained in the received access information. Then, the series of processing ends and the original processing is restored.

On the other hand, if it is judged at step S504 that the access from outside is not transmission of access information (No), or if it is judged at step S502 that the access from outside is not an access using a permitted communication protocol (No), the series of processing ends and the original processing is restored.

Next, the structure of the printer server 300 will be described.

The CPU 90 starts a predetermined program stored in a predetermined area of the ROM 92 and executes print request acceptance processing shown in a flowchart of FIG. 20 instead of the print request acceptance processing shown in the flowchart of FIG. 14.

FIG. 20 is a flowchart showing the print request acceptance processing executed by the printer server 300.

As the print request acceptance processing is executed at the CPU 90, the processing first shifts to step S550 as shown in FIG. 20.

At step S550, it is judged whether a print request is received or not. If it is judged that a print request is received (Yes), the processing shifts to step S552. However, if it is judged otherwise (No), the processing waits at step S550 until a print request is received.

At step S552, print data is received. The processing shifts to step S554 and communication setting content decision processing similar to the processing of step S156 is performed. The processing shifts to step S556 and access information representing the decided IP address, communication port numbers, division rates and port allocation is sent to the network printer 100. The processing then shifts to step S558.

At step S558, the received print data is divided on the basis of the decided division rates. The processing shifts to step S560 and the divided print data are sent to the network printer 100 via plural communication ports on the basis of the decided IP address, communication port numbers and port allocation. Then, the series of processing ends and the original processing is restored.

Next, the operation of this embodiment will be described.

A user at the host terminal 200 requests printing by using a document preparation application or the like.

At the host terminal 200, as printing is requested, the processing of steps S302 to S306 is performed. Print data is generated and the generated print data is sent together with a print request to the printer server 300.

At the printer server 300, when the print request is received, the processing of steps S552 to S556 is performed. The print data is received, and IP address, communication port numbers, division rates and port allocation are decided. Then, access information representing the decided IP address, communication port numbers, division rates and port allocation is sent to the network printer 100.

At the network printer 100, when the access information is received, the processing of step S506 is performed and the communication setting information in the communication setting information storage unit 10 is updated on the basis of the IP address and communication port numbers contained in the received access information. This causes the IP address and communication ports to be set in the network printer 100 and enables the network printer 100 to receive divided print data sent by using a specified communication protocol.

Meanwhile, at the printer server 300, the processing of steps S558 and S560 is performed. The print data is divided on the basis of the decided division rates and the divided print data are sent to the network printer 100 via plural communication ports on the basis of the decided IP address, communication port numbers and port allocation.

At the network printer 100, when divided print data of a designated data size is received form a designated communication port, the processing of step S260 is performed and the received divided print data is associated with a division number and thus registered to the storage device 62. When divided print data are received from all the designated communication ports, the processing of steps S264 and S266 is performed. The divided print data are read out from the storage device 62 in ascending order of their division numbers, and the divided print data are combined in the read-out order to form print data. Then, printing is performed by the printer engine 64 on the basis of the formed print data.

Also, at the network printer 100, the processing of step S268 is performed and the communication setting information in the communication setting information storage unit 10 is invalidated. This disables the network printer 100 from receiving anything except for a print start notification sent by using the specified communication protocol.

In this manner, in this embodiment the network printer 100 receives access information representing IP address and communication port numbers, updates the communication setting information in the communication setting information storage unit 10 on the basis of the IP address and communication port numbers contained in the received access information, receives print data on the basis of the communication setting information in the communication setting information storage unit 10, performs printing based on the received print data, and invalidates the communication setting information in the communication setting information storage unit 10 at the time when the printing by the printer engine 64 is completed.

Thus, since the communication setting in the network printer 100 is changed every time printing is performed, the communication port cannot be easily specified from outside and the number of opportunities to communicate with the network printer 100 is reduced. This can reduce the possibility of unauthorized access. Also, since a printer driver or the like that generates an IP address and communication port numbers can be installed in the printer server 300, it is not necessary to perform setting with respect to the network printer 100. Therefore, security can be improved in an environment used by unspecified multiple host terminals or the like, compared with the foregoing techniques.

Also, in this embodiment, the network printer 100 receives access information representing division rates, and receives divided print data via the plural communication ports on the basis of the division rates contained in the received access information.

Thus, since printing cannot be performed without dividing the print data at the division rates decided by the printer server 300, the possibility of unauthorized access from the other terminals can be further reduced. This can further improve security.

Moreover, in this embodiment, the network printer 100 receives access information representing port allocation, combines individual divided print data on the basis of the port allocation contained in the received access information, and thus forms print data.

Thus, since printing cannot be performed without sending each divided print data via the communication port specified by the port allocation decided by the printer server 300, the possibility of unauthorized access from the other terminals can be further reduced. This can further improve security.

In the third embodiment, the network printer 100 is equivalent to the output device according to mode 10 to 14, 27 to 29, 31 to 33, 35, 36, 38, 48 or 62. The CPU 50 is equivalent to the arithmetic operation unit according to mode 79. The I/F 58 is equivalent to the communication unit according to mode 79. The communication setting execution unit 13 and step S506 are equivalent to the communication setting execution unit according to mode 10 or 27. Step S506 is equivalent to the execution of the communication setting according to mode 48, 62, 78 or 79. The print data receiving unit 14, the I/F 58 and steps S250 and S254 to S258 are equivalent to the output data receiving unit according to mode 10 to 13, 27, 31, 32 or 35.

Also, in the third embodiment, steps S250 and S254 to S258 are equivalent to the reception of the output data according to mode 48 to 51, 62 to 65, 78 to 82. The print data forming unit 15 and step S264 are equivalent to the output data forming unit according to mode 11, 13, 31 or 35. Step S264 is also equivalent to the forming of the output data according to mode 49, 51, 63, 65, 80 or 82. The print unit 16, the printer engine 64 and step S266 are equivalent to the output unit according to mode 10, 11, 27, 28 or 31. Step S266 is equivalent to the output according to mode 48, 49, 62, 63, 78 to 80.

Moreover, in the third embodiment, the communication setting invalidating unit 18 and step S268 are equivalent to the communication setting invalidating unit according to mode 10 or 28. Step S268 is equivalent to the invalidation of the communication setting according to mode 48, 62, 78 or 79. The access information receiving unit 21, the I/F 58 and steps S500 and S504 are equivalent to the communication setting information receiving unit according to mode 10 or 27, the division rate information receiving unit according to mode 12 or 32, or the communication path correspondence information receiving unit according to mode 13 or 35. Steps S500 and S504 are equivalent to the reception of the communication setting information according to mode 48, 62, 78 or 79, the reception of the division rate information according to mode 50, 64 or 81, or the reception of the communication path correspondence information according to mode 51, 65 or 82.

Also, in the third embodiment, the host terminal 200 is equivalent to the output request device according to mode 27 or 29. The print data sending unit 31, the I/F 78 and step S306 are equivalent to the output data sending unit according to mode 29. The printer server 300 is equivalent to the output management device according to mode 27, 29, 32 or 35. The print data receiving unit 40, the I/F 98 and step S552 are equivalent to the second output data receiving unit according to mode 29, 33 or 36. The print data sending unit 43, the I/F 98 and step S560 are equivalent to the second output data sending unit according to mode 29, 33 or 36.

Moreover, in the third embodiment, the communication setting content deciding unit 46 and step S554 are equivalent to the communication setting content deciding unit according to mode 27, 29, 31 to 33, 35 or 36. The access information sending unit 47, the I/F 98 and step S556 are equivalent to the communication setting information sending unit according to mode 27, the division rate information sending unit according to mode 32, or the communication path correspondence information sending unit according to mode 35.

Figure 21:
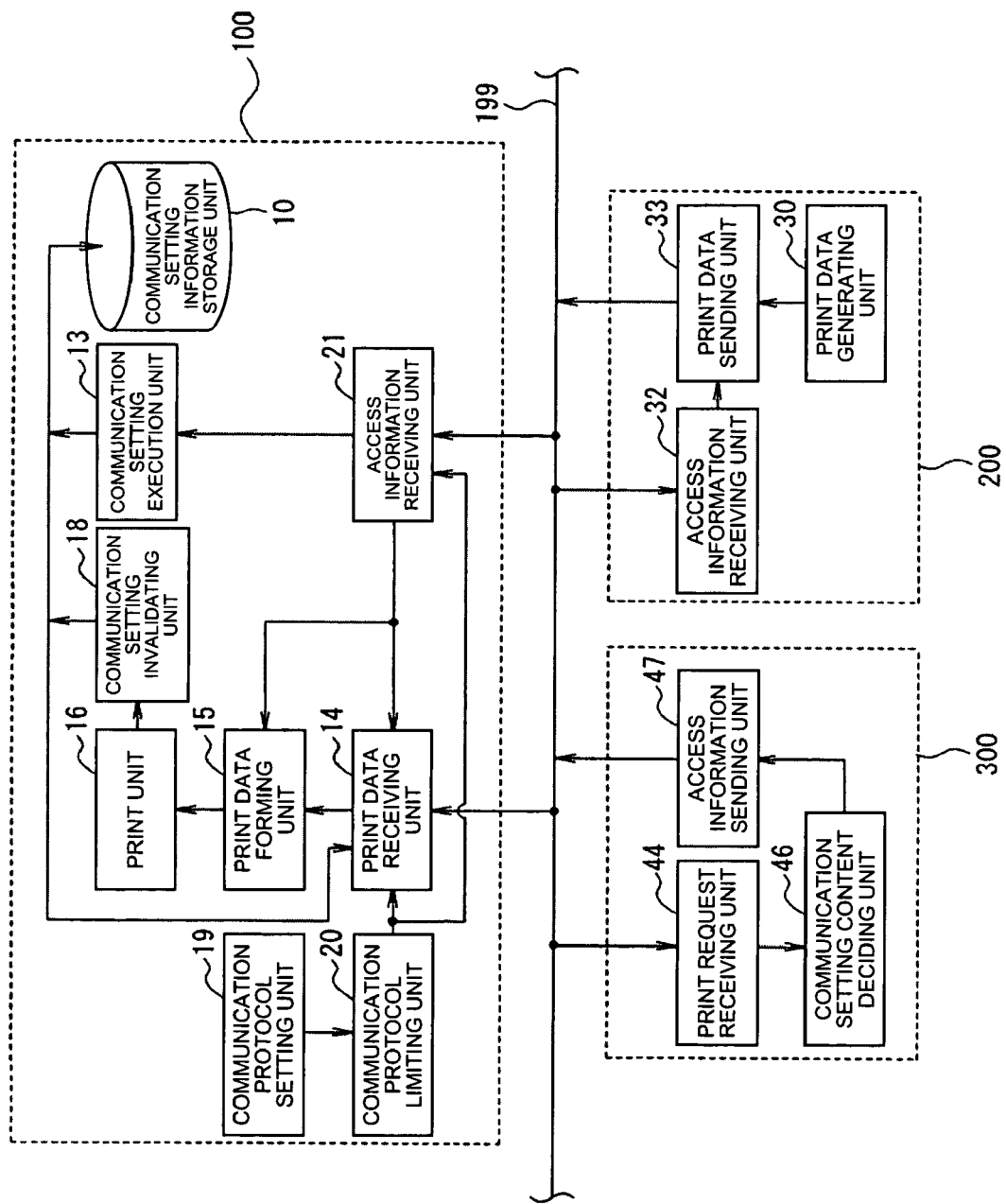
FIG. 21 is a functional block diagram showing an outline of functions of a network system.
Figure 22:
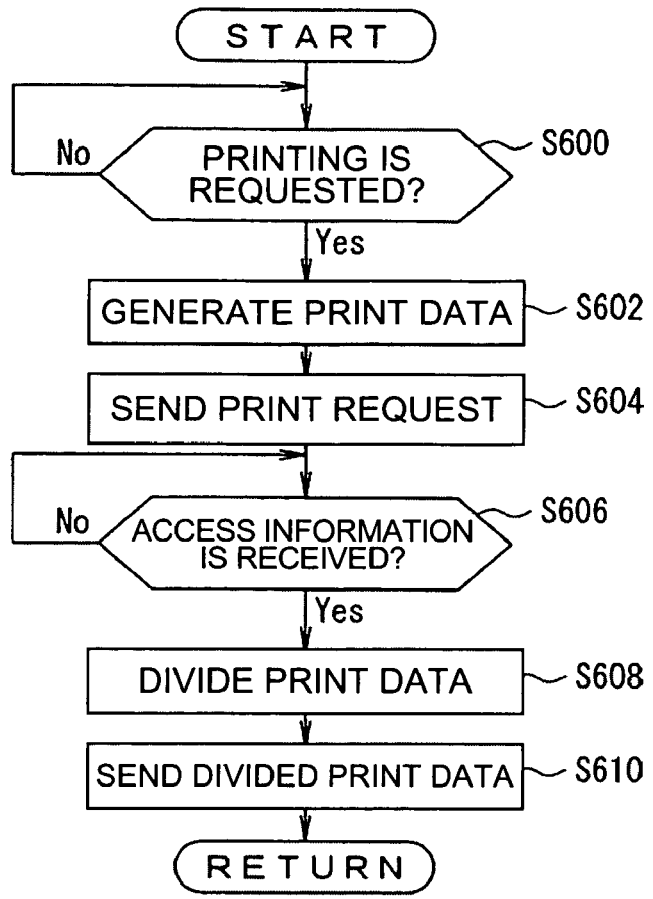
FIG. 22 is a flowchart showing print request processing executed by a host terminal 200.
Figure 23:
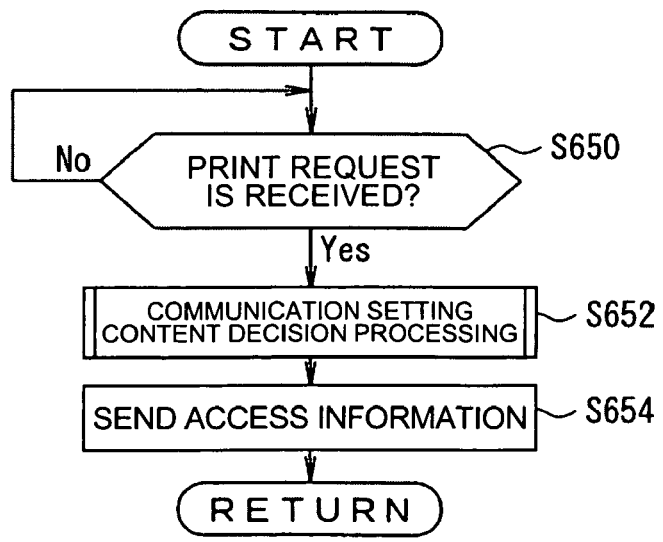
FIG. 23 is a flowchart showing print request acceptance processing executed by a printer server 300.

Next, a fourth embodiment of the invention will be described with reference to the drawings. FIGS. 21 to 23 show a fourth embodiment of a security output device, a security output system, an output device control program and storage medium, and a security output method according to the invention.

In this embodiment, a security output device, a security output system, an output device control program and storage medium, and a security output method according to the invention are applied to a case of performing security communication at a network printer 100 and thus performing printing, as shown in FIG. 21. This embodiment differs from the third embodiment in that a host terminal 200 sends print data to the network printer 100. Hereinafter, only the features different from the third embodiment will be described. The features similar to those of the third embodiment are denoted by the same numerals and will not be described further in detail.

First, an outline of functions of a network system to which the invention is applied will be described with reference to FIG. 21.

FIG. 21 is a functional block diagram showing an outline of functions of the network system.

A network printer 100, a host terminal 200, and a printer server 300 are connected to a network 199, as shown in FIG. 21. The structure of the network printer 100 is the same as in the third embodiment.

The host terminal 200 has a print data generating unit 30, an access information receiving unit 32 that receives access information, and a print data sending unit 33 that sends the print data generated by the print data generating unit 30 to the printer server 300 on the basis of the access information received by the access information receiving unit 32.

The print data sending unit 33 sends a print request to the printer server 300 at the time when the print data is generated by the print data generating unit 30. The print data sending unit 33 also divides the print data on the basis of division rates contained in the access information and sends the divided print data to the network printer 100 via plural communication ports on the basis of IP address, communication port numbers and port allocation contained in the access information.

The printer server 300 has a print request receiving unit 44 that receives a print request, a communication setting content deciding unit 46 that decides IP address, communication port numbers, division rates and port allocation at the time when the print request is received by the print request receiving unit 44, and an access information sending unit 47 that sends access information representing the IP address, communication port numbers, division rates and port allocation decided by the communication setting content deciding unit 46 to the network printer 100 and to the source of the print request.

Next, the structure of the host terminal 200 will be described.

The CPU 70 starts a predetermined program stored in a predetermined area of the ROM 72 and executes print request processing shown in a flowchart of FIG. 22 instead of the print request processing shown in the flowchart of FIG. 12.

FIG. 22 is a flowchart showing the print request processing executed by the host terminal 200.

As the print request processing is executed at the CPU 70, the processing first shifts to step S600 as shown in FIG. 22.

At step S600, it is judged whether or not printing is requested from a document preparation application or the like. If it is judged that printing is requested (Yes), the processing shifts to step S602. However, if it is judged otherwise (No), the processing waits at step S600 until printing is requested.

At step S602, print data is generated. The processing shifts to step S604 and a print request is sent to the printer server 300. The processing shifts to step S606 and it is judged whether access information is received or not. If it is judged that access information is received (Yes), the processing shifts to step S608. However, if it is judged otherwise (No), the processing waits at step S606 until access information is received.

At step S608, the generated print data is divided on the basis of division rates contained in the received access information. The processing shifts to step S610 and the divided print data are sent to the network printer 100 via plural communication ports on the basis of IP address, communication port numbers and port allocation contained in the received access information. Then, the series of processing ends and the original processing is restored.

Next, the structure of the printer server 300 will be described.

The CPU 90 starts a predetermined program stored in a predetermined area of the ROM 92 and executes print request acceptance processing shown in a flowchart of FIG. 23 instead of the print request acceptance processing shown in the flowchart of FIG. 20.

FIG. 23 is a flowchart showing the print request acceptance processing executed by the printer server 300.

As the print request acceptance processing is executed at the CPU 90, the processing first shifts to step S650 as shown in FIG. 23.

At step S650, it is judged whether a print request is received or not. If it is judged that a print request is received (Yes), the processing shifts to step S652. However, if it is judged otherwise (No), the processing waits at step S650 until a print request is received.

At step S652, communication setting content decision processing similar to the processing of step S156 is performed. The processing shifts to step S654 and access information representing the decided IP address, communication port numbers, division rates and port allocation is sent to the network printer 100 and to the source of the print request. Then, the series of processing ends and the original processing is restored.

Next, the operation of this embodiment will be described.

A user at the host terminal 200 requests printing by using a document preparation application or the like.

At the host terminal 200, as printing is requested, the processing of steps S602 to S604 is performed. Print data is generated and a print request is sent to the printer server 300.

At the printer server 300, when the print request is received, the processing of steps S652 and S654 is performed. IP address, communication port numbers, division rates and port allocation are decided, and access information representing the decided IP address, communication port numbers, division rates and port allocation is sent to the network printer 100 and the host terminal 200.

At the network printer 100, when the access information is received, the processing of step S506 is performed and the communication setting information in the communication setting information storage unit 10 is updated on the basis of the IP address and communication port numbers contained in the received access information. This causes the IP address and communication ports to be set in the network printer 100 and enables the network printer 100 to receive divided print data sent by using a specified communication protocol.

Meanwhile, at the host terminal 200, when the access information is received, the processing of steps S608 and S610 is performed. The print data is divided on the basis of the division rates contained in the received access information, and the divided print data are sent to the network printer 100 via plural communication ports on the basis of the IP address, communication port numbers and port allocation contained in the received access information.

At the network printer 100, when divided print data of a designated data size is received form a designated communication port, the processing of step S260 is performed and the received divided print data is associated with a division number and thus registered to the storage device 62. When divided print data are received from all the designated communication ports, the processing of steps S264 and S266 is performed. The divided print data are read out from the storage device 62 in ascending order of their division numbers, and the divided print data are combined in the read-out order to form print data. Then, printing is performed by the printer engine 64 on the basis of the formed print data.

Also, at the network printer 100, the processing of step S268 is performed and the communication setting information in the communication setting information storage unit 10 is invalidated. This disables the network printer 100 from receiving anything except for a print start notification sent by using the specified communication protocol.

In the fourth embodiment, the host terminal 200 is equivalent to the output request device according to mode 27, 30, 34 or 37. The access information receiving unit 32, the I/F 78 and step S606 are equivalent to the second communication setting information receiving unit according to mode 30, the second division rate information receiving unit according to mode 34, or the second communication path correspondence information receiving unit according to mode 37. The print data sending unit 33, the I/F 78 and step S610 are equivalent to the output data sending unit according to mode 30, 34 or 37. The printer server 300 is equivalent to the output management device according to mode 27, 30, 32, 34, 35 or 37. The communication setting content deciding unit 46 and step S652 are equivalent to the communication setting content deciding unit according to mode 27, 30 to 32, 34, 35 or 37.

Also, in the fourth embodiment, the access information sending unit 47, the I/F 98 and step S654 are equivalent to the communication setting information sending unit according to mode 27, the division rate information sending unit according to mode 32, the communication path correspondence information sending unit according to mode 35, the second communication setting information sending unit according to mode 30, the second division rate information sending unit according to mode 34, or the second communication path correspondence information sending unit according to mode 37.

Next, a fifth embodiment of the invention will be described with reference to the drawings. FIGS. 24 to 27 show a fifth embodiment of a security output device, a security output system, an output device control program and storage medium, and a security output method according to the invention.

Figure 24:
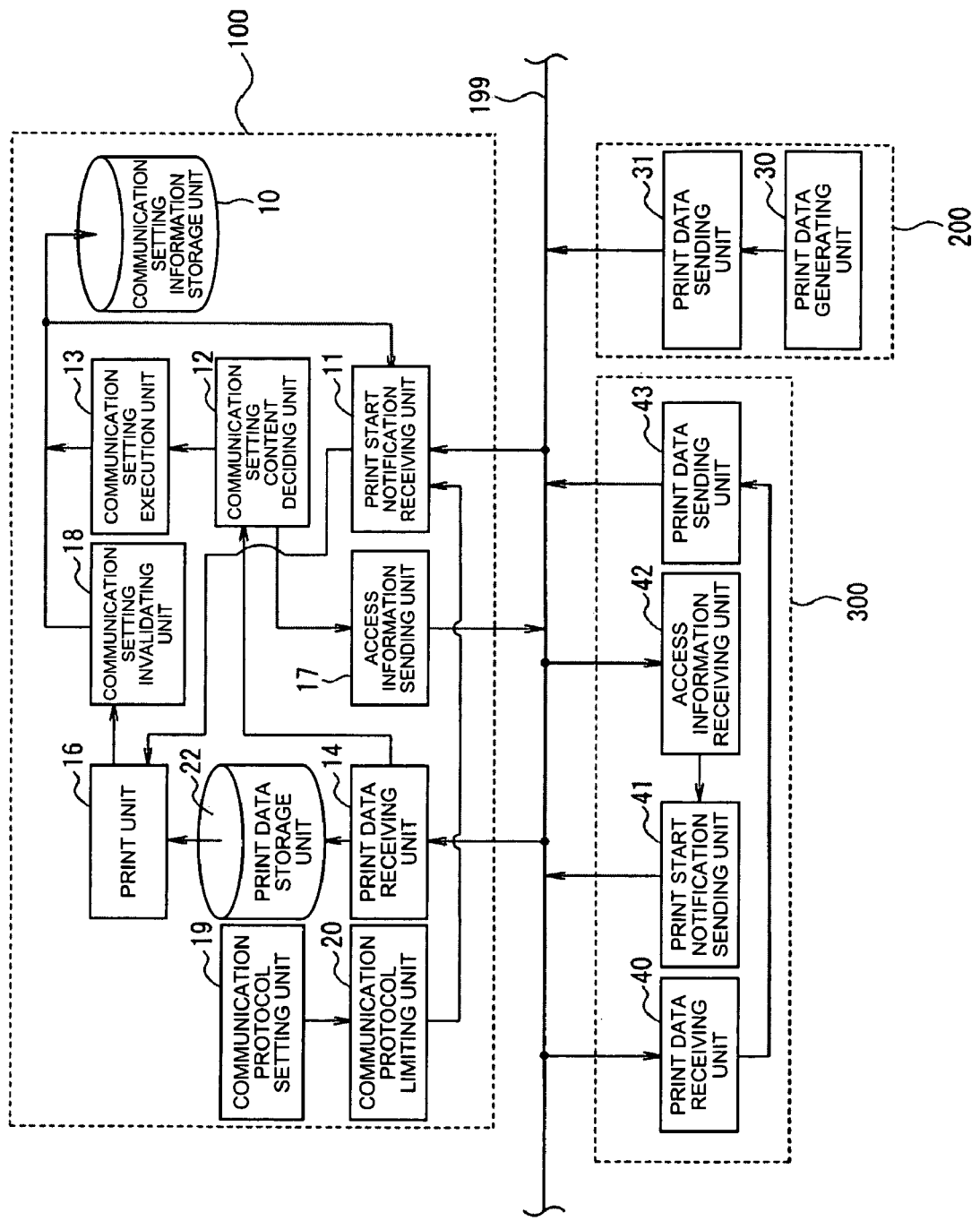
FIG. 24 is a functional block diagram showing an outline of functions of a network system.

In this embodiment, a security output device, a security output system, an output device control program and storage medium, and a security output method according to the invention are applied to a case of performing security communication at a network printer 100 and thus performing printing, as shown in FIG. 24. This embodiment differs from the first embodiment in that a print start notification is sent by security communication after print data is sent. Hereinafter, only the features different from the first embodiment will be described. The features similar to those of the first embodiment are denoted by the same numerals and will not be described further in detail.

First, an outline of functions of a network system to which the invention is applied will be described with reference to FIG. 24.

FIG. 24 is a functional block diagram showing an outline of functions of the network system.

A network printer 100, a host terminal 200, and a printer server 300 are connected to a network 199, as shown in FIG. 24. The host terminal 200 has the same structure as the host terminal 200 in the first embodiment.

The network printer 100 has a communication setting information storage unit 10, a print start notification receiving unit 11, a communication setting content deciding unit 12, a communication setting execution unit 13, a print data receiving unit 14, a print unit 16, an access information sending unit 17, a communication setting invalidating unit 18, a communication protocol setting unit 19 and a communication protocol limiting unit 20, and also has a print data storage unit 22 that stores print data.

The print data receiving unit 14 receives print data by ordinary communication, not by security communication according to the invention, and saves the received print data into the print data storage unit 22.

The communication setting content deciding unit 12 decides IP address and communication port numbers at the time when the print data is received by the print data receiving unit 14.

The access information sending unit 17 sends access information representing the IP address and communication port numbers decided by the communication setting content deciding unit 12 to the source of the print data.

The print start notification receiving unit 11 receives a print start notification via a communication port specified by the communication setting information in the communication setting information storage unit 10.

The print unit 16 reads out the print data in question from the print data storage unit 22 at the time when the print start notification is received by the print start notification receiving unit 11, and performs printing based on the read-out print data.

The printer server 300 has a print data receiving unit 40, a print start notification sending unit 41, an access information receiving unit 42 and a print data sending unit 43.

The print data sending unit 43 sends the print data received by the print data receiving unit 40 to the network printer 100.

The print start notification sending unit 41 sends the print start notification via the designated communication port on the basis of the IP address and communication port numbers contained in the access information.

Next, the structure of the network printer 100 will be described.

Figure 25:
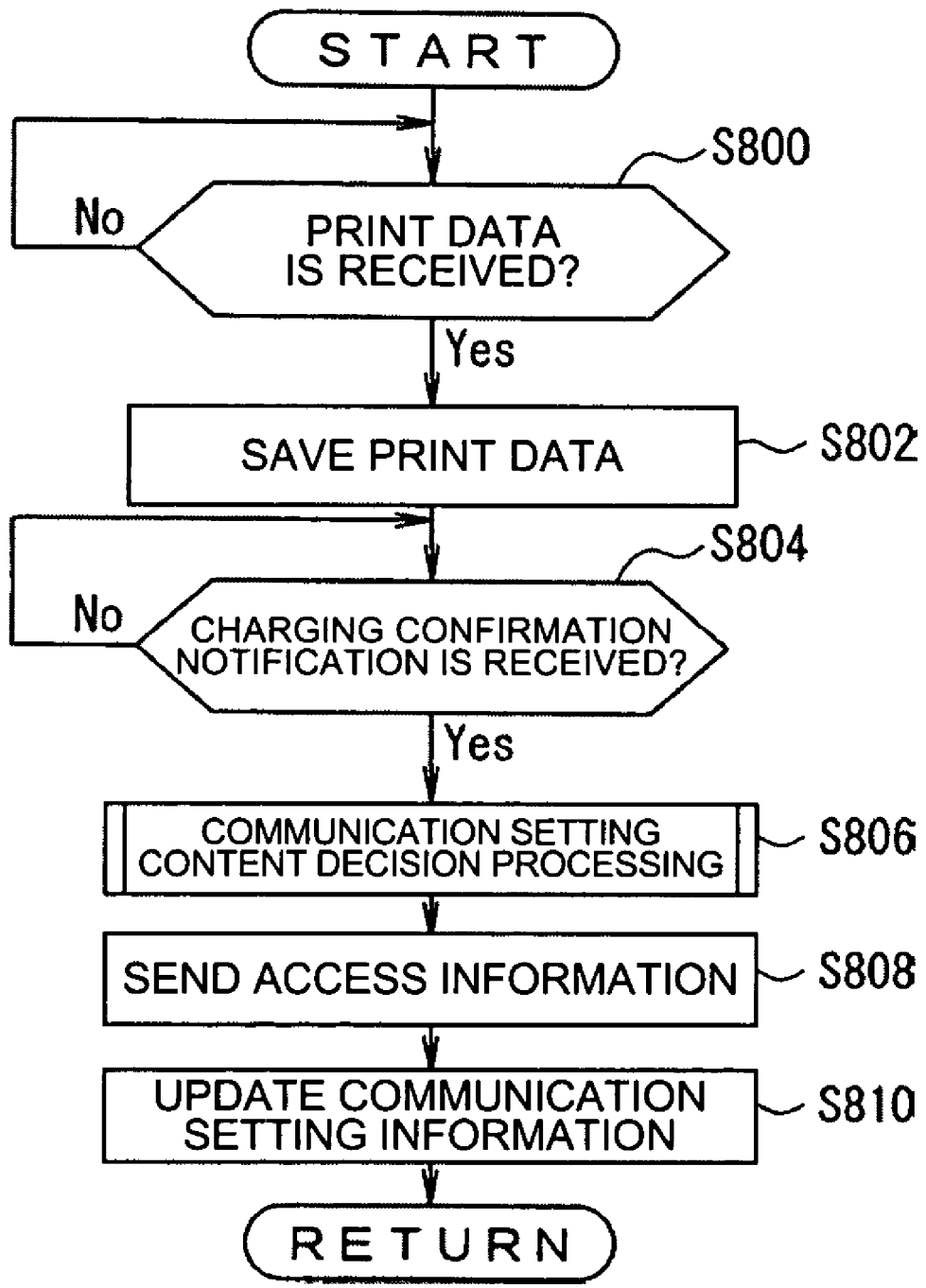
FIG. 25 is a flowchart showing communication setting processing executed by a network printer 100.
Figure 26:
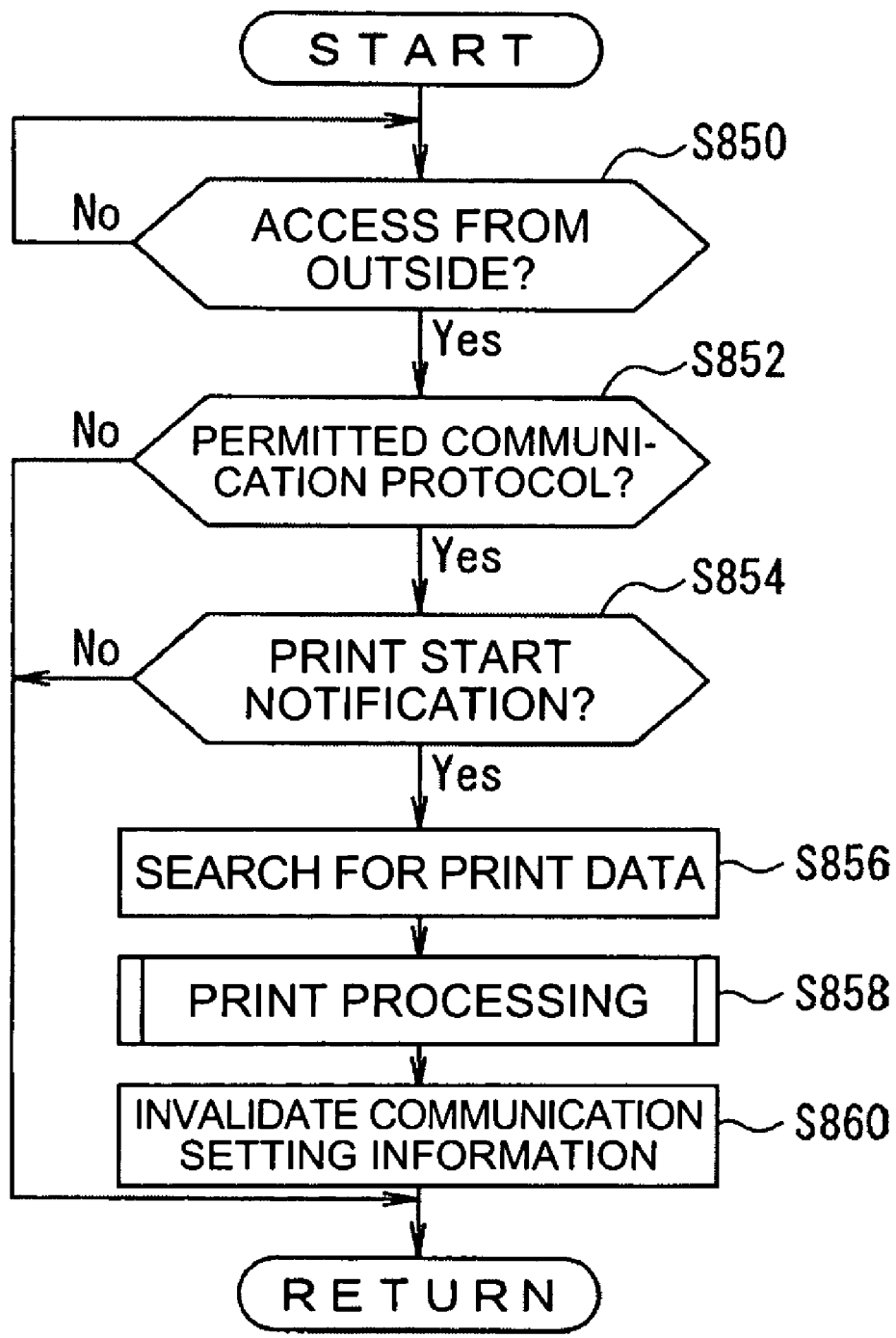
FIG. 26 is a flowchart showing print control processing executed by the network printer 100.

The CPU 50 starts a predetermined program stored in a predetermined area of the ROM 52 and executes communication setting processing and print control processing shown in flowcharts of FIGS. 25 and 26 instead of the communication setting processing and print control processing shown in the flowcharts of FIGS. 5 and 10.

First, the communication setting processing will be described in detail with reference to FIG. 25.

FIG. 25 is a flowchart showing the communication setting processing executed by the network printer 100.

As the communication setting processing is started at the CPU 50, the processing first shifts to step S800 as shown in FIG. 25.

At step S800, it is judged whether print data is received or not. If it is judged that print data is received (Yes), the processing shifts to step S802 and the received print data is saved into the storage unit 62. The processing then shifts to step S804.

At step S804, it is judged whether a charging confirmation notification representing that the user has paid predetermined fee for printing is received or not from a charging processing server, not shown. When a charging confirmation notification is received, the processing shifts to step S806.

At step S806, communication setting content decision processing to decide IP address and communication port numbers is executed. This communication setting content decision processing is performed in the same way as the communication setting content decision processing shown in the flowchart of FIG. 7.

Next, the processing shifts to step S808 and access information representing the decided IP address and communication port numbers is sent to the source of the print data. The processing shifts to step S810 and the communication setting information in the communication setting information storage unit 10 is updated on the basis of the decided IP address and communication port numbers. Then, the series of processing ends and the original processing is restored.

On the other hand, if it is judged at step S804 that a charging confirmation notification is not received (No), the processing waits at step S804 until a charging confirmation notification is received.

Meanwhile, if it is judged at step S800 that print data is not received (No), the processing waits at step S800 until print data is received.

Next, the print control processing will be described in detail with reference to FIG. 26.

FIG. 26 is a flowchart showing the print control processing executed by the network printer 100.

As the print control processing is executed at the CPU 50, the processing first shifts to step S850 as shown in FIG. 26.

At step S850, it is judged whether there is an access from outside or not. If it is judged that there is an access from outside (Yes), the processing shifts to step S852. However, if it is judged otherwise (No), the processing waits at step S850 until an access is made from outside.

At step S852, it is judged whether the access from outside is an access using a permitted communication protocol or not. If it is judged that the access is an access using a permitted communication protocol (Yes), the processing shifts to step S854 and it is judged whether the access from outside is transmission of a print start notification or not. If it is judged that the access is transmission of a print start notification (Yes), the processing shifts to step S856.

At step S856, the storage device 62 is searched for the print data in question. The processing shifts to step S858 and printing is performed by the printer engine 64 on the basis of the print data found by the search. The processing then shifts to step S860 and the communication setting information in the communication setting information storage unit 10 is invalidated. The series of processing ends and the original processing is restored.

Meanwhile, if it is judged at step S854 that the access from outside is not transmission of a print start notification (No), or if it is judged at step S852 that the access from outside is not an access using a permitted communication protocol (No), the series of processing ends and the original processing is restored.

Next, the structure of the printer server 300 will be described.

Figure 27:
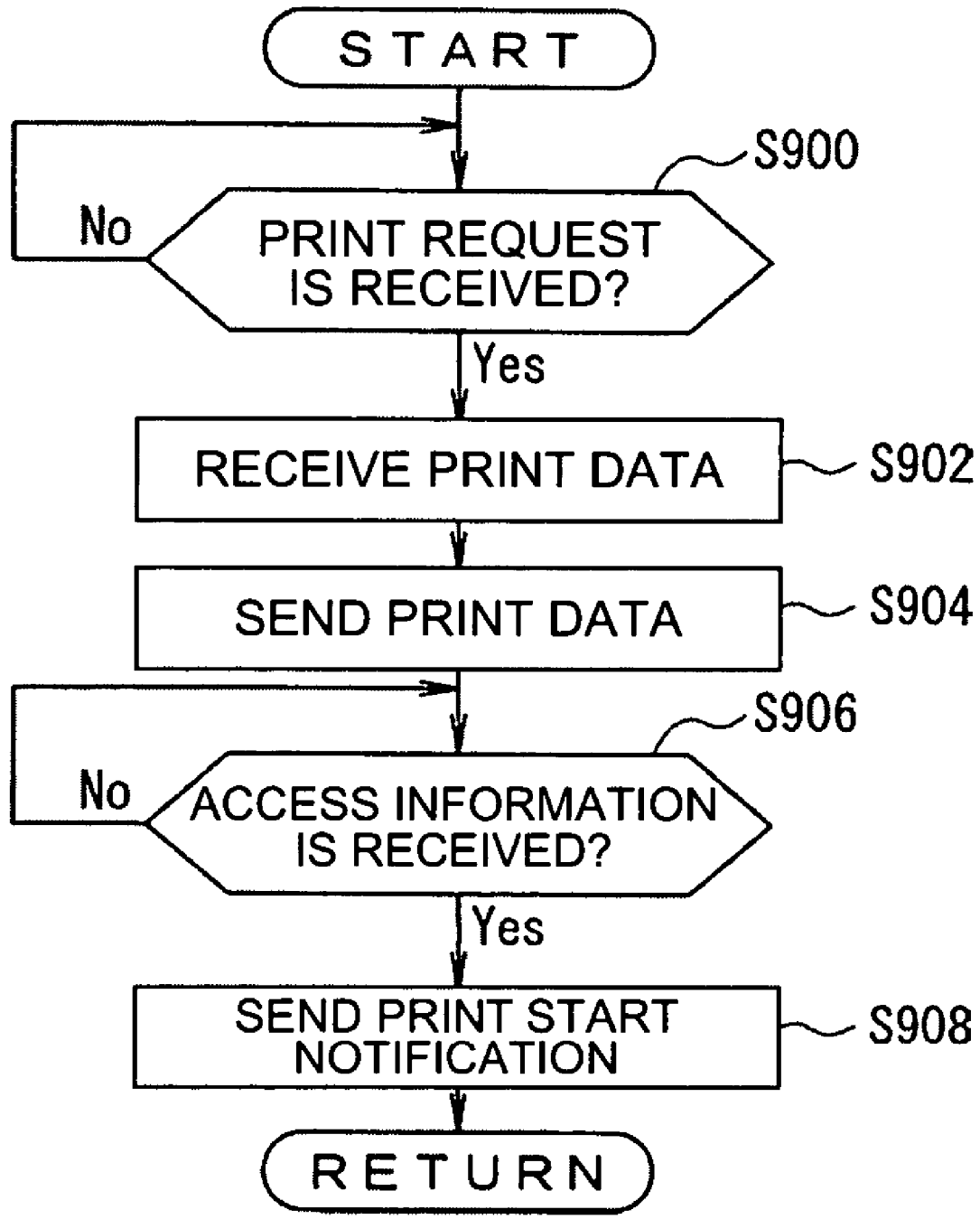
FIG. 27 is a flowchart showing print request acceptance processing executed by the printer server 300.

The CPU 90 starts a predetermined program stored in a predetermined area of the ROM 92 and executes print request acceptance processing shown in a flowchart of FIG. 27 instead of the print request acceptance processing shown in the flowchart of FIG. 14.

FIG. 27 is a flowchart showing the print request acceptance processing executed by the printer server 300.

As the print request acceptance processing is executed at the CPU 90, the processing first shifts to step S900 as shown in FIG. 27.

At step S900, it is judged whether a print request is received or not. If it is judged that a print request is received (Yes), the processing shifts to step S902. However, if it is judged otherwise (No), the processing waits at step S900 until a print request is received.

At step S902, print data is received. The processing shifts to step S904 and the received print data is sent to the network printer 100. The processing then shifts to step S906.

At step S906, it is judged whether access information is received or not. If it is judged that access information is received (Yes), the processing shifts to step S908. However, if it is judged otherwise (No), the processing waits at step S906 until access information is received.

At step S908, a print start notification is sent to the network printer 100 via a designated communication port on the basis of IP address and communication port numbers contained in the received access information. Then, the series of processing ends and the original processing is restored.

Next, the operation of this embodiment will be described.

At the printer server 300, when a print request is received, the processing of steps S902 and S904 is performed. Print data is received and the received print data is sent to the network printer 100.

At the network printer 100, when the print data is received, the processing of step S802 is performed and the received print data is saved into the storage device 62.

Next, the user pays a predetermined fee at the charging processing server, not shown. At the charging processing server, when the payment of the fee is confirmed, a charging confirmation notification is sent to the network printer 100.

At the network printer 100, when the charging confirmation notification is received, the processing of steps S806 and S808 is performed. IP address and communication port numbers are decided, and access information representing the decided IP address and communication port numbers is sent to the printer server 300.

At the printer server 300, when the access information is received, the processing of step S908 is performed and a print start notification is sent to the network printer 100 via a designated communication port on the basis of the IP address and communication port numbers contained in the received access information.

At the network printer 100, when the print start notification is received from the designated communication port, the processing of steps S856 and S858 is performed. The storage device 62 is searched for the print data in question and printing is performed on the print data found by the search.

In this manner, in this embodiment, the network printer 100 receives print data, saves the received print data into the storage device 62, decides IP address and communication port numbers, updates the communication setting information in the communication setting information storage unit 10 on the basis of the decided IP address and communication port numbers, receives a print start notification on the basis of the communication setting information in the communication setting information storage unit 10, and performs printing based on the print data in the storage device 62 in accordance with the received print start notification.

Thus, since the communication setting in the network printer 100 is changed every time printing is performed, the communication port cannot be easily specified from outside and the possibility of unauthorized access can be reduced. Also, as a printer driver or the like that corresponds to changes of the communication setting can be installed in the printer server 300, it is not necessary to perform setting with respect to the network printer 100. Therefore, security in an environment used by unspecified multiple host terminals or the like can be improved, compared with the foregoing techniques.

In the fifth embodiment, the network printer 100 is equivalent to the output device according to mode 9, 26, 47 or 61. The CPU 50 is equivalent to the arithmetic operation unit according to mode 77. The I/F 58 is equivalent to the communication unit according to mode 77. The print data storage unit 22 and the storage device 62 are equivalent to the output data storage unit according to mode 9, 26, 47, 61, 76 or 77. The print data receiving unit 14, the I/F 58 and step S800 are equivalent to the output data receiving unit according to mode 9 or 26. Step S800 is equivalent to the reception of the output data according to mode 47, 61, 76 or 77. The print data receiving unit 14 and step S802 are equivalent to the output data saving unit according to mode 9 or 26.

Also, in the fifth embodiment, step S802 is equivalent to the saving of the output data according to mode 47, 61, 76 or 77. The communication setting content deciding unit 12 and step S806 are equivalent to the communication setting content deciding unit according to mode 9 or 26. Step S806 is equivalent to the decision of the communication setting content according to mode 47, 61, 76 or 77. The communication setting execution unit 13 and step S810 are equivalent to the communication setting execution unit according to mode 9 or 26. Step S810 is equivalent to the execution of the communication setting according to mode 47, 61, 76 or 77. The communication start notification receiving unit 11, the I/F 58 and step S854 are equivalent to the output start notification receiving unit according to mode 9 or 26.

In the fifth embodiment, step S854 is equivalent to the reception of the output start notification according to mode 47, 61, 76 or 77. The print unit 16, the printer engine 64 and step S858 are equivalent to the output unit according to mode 9 or 26. Step S858 is equivalent to the output according to mode 47, 61, 76 or 77. The host terminal 200 is equivalent to the output request device according to mode 26. The printer server 300 is equivalent to the output management device according to mode 26. The print data sending unit 43, the I/F 98 and step S904 are equivalent to the output data sending unit according to mode 26.

In the first embodiment, the communication setting content decision processing of step S156 is constructed as the processing shown in the flowchart of FIG. 7. However, it is not limited to the processing of FIG. 7 and can also be constructed as processing shown in a flowchart of FIG. 28.

Figure 28:
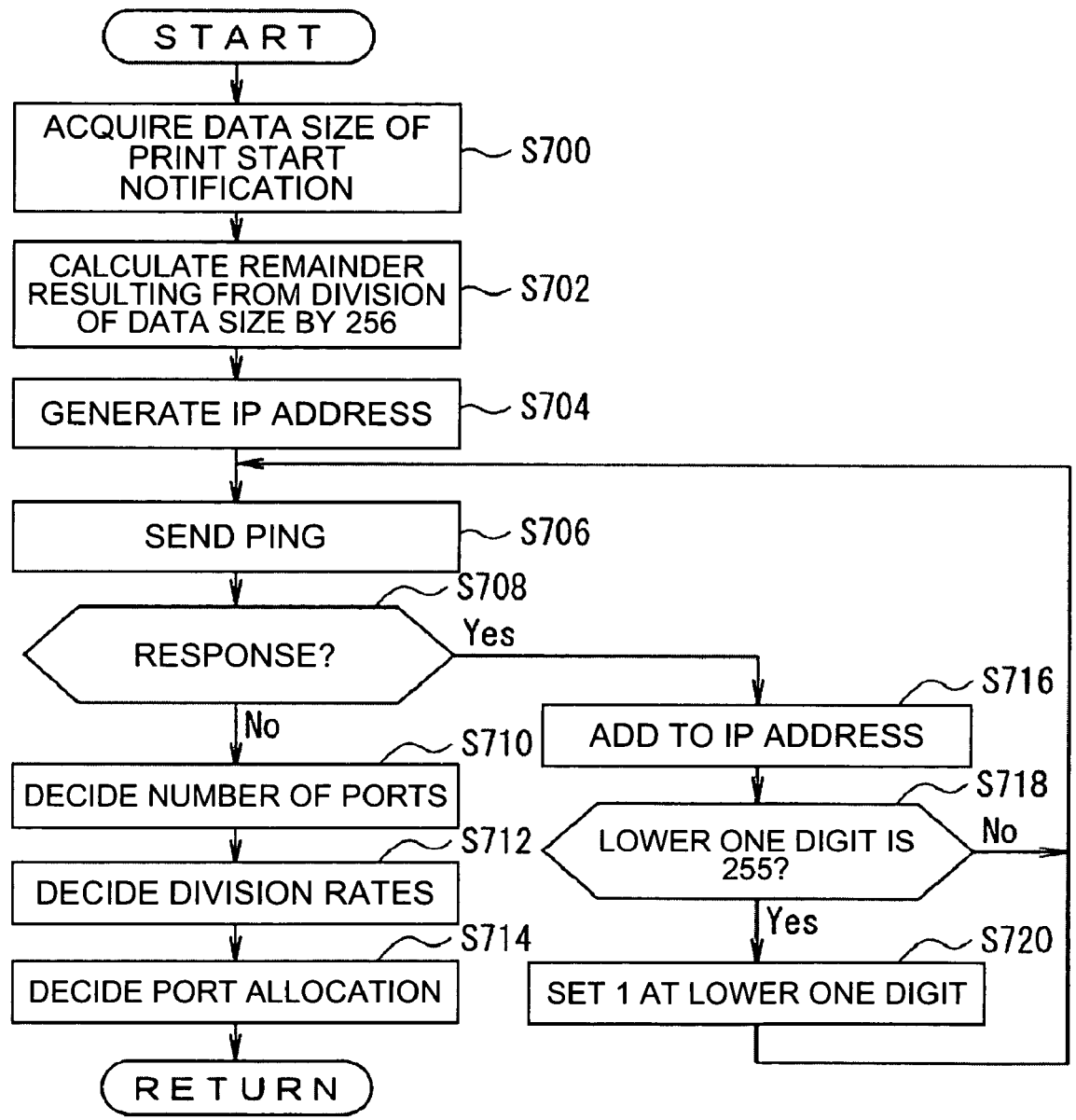
FIG. 28 is a flowchart showing communication setting content decision processing of step S156.

FIG. 28 is a flowchart showing the communication setting content decision processing of step S156.

As the communication setting content decision processing is executed at step S156, the processing first shifts to step S700 as shown in FIG. 28.

At step S700, data size of a print start notification is acquired. The processing shifts to step S702 and the remainder resulting from division of the acquired data size by 256 is calculated. The processing shifts to step S704 and the calculated remainder is set at the lower one digit of a predetermined IP address, thus generating an IP address. The processing then shifts to step S706.

At step S706, a ping command is executed by using the generated IP address as a destination address. The processing shifts to step S708 and it is judged whether a response to the execution of the ping command is acquired or not. If it is judged that a response is not acquired (No), the processing shifts to step S710 and the number of communication ports and communication port numbers are decided. The processing then shifts to step S712.

At step S712, processing similar to step S208 is executed. The processing shifts to step S714 and processing similar to step S210 is executed. Then, the series of processing ends and the original processing is restored.

Meanwhile, if it is judged at step S708 that a response to the execution of the ping command is acquired (Yes), the processing shifts to step S716 and "1" is added to the lower one digit of the IP address. The processing shifts to step S718 and it is judged whether the value of the lower one digit of the IP address is "255" or not. If it is judged that the value is not "255" (No), the processing shifts to step S706.

On the other hand, if it is judged at step S718 that the value of the lower one digit of the IP address is "255" (Yes), the processing shifts to step S720 and "1", is set at the lower one digit of the IP address. The processing then shifts to step S706.

In the first to fifth embodiment, the network printer 100 is adapted for invalidating the communication setting information in the communication setting information storage unit 10 at the time when printing by the printer engine 64 ends. However, the timing of invalidation is not limited to this and the network printer 100 can be adapted for invalidating the communication setting information in the communication setting information storage unit 10 at the time when reception of all the divided print data ends.

In the first and second embodiments, the network printer 100 is adapted for deciding IP address, communication port numbers, division rates and port allocation, and in the third and fourth embodiments, the printer server 300 is adapted for deciding IP address, communication port numbers, division rates and port allocation. However, such decision is not limited to these embodiments. The network printer 100 can be adapted for deciding one, two or three of IP address, communication port numbers, division rates and port allocation, and the printer server 300 can be adapted for deciding the remaining.

In the first embodiment, the network printer 100 is adapted for sending access information to the printer server 300 in accordance with a print start notification from the printer server 300. However, such sending is not limited to this embodiment. The host terminal 200 can be adapted for sending a print start notification to the network printer 100, and the network printer 100 can be adapted for sending access information to the printer server 300 in accordance with the print start notification from the host terminal 200. A similar structure can also be applied to the second embodiment. In this case, the network printer 100 can be adapted for sending access information to the host terminal 200 in accordance with a print start notification from the printer server 300.

In the first to fifth embodiments, the communication setting information storage unit 10 is provided in the network printer 100. However, the communication setting information storage unit 10 is not limited to this arrangement and can also be provided in the host terminal 200, the printer server 300 or another terminal.

In the first to fifth embodiments, the communication protocol setting unit 19 is provided in the network printer 100. However, the communication protocol setting unit 19 is not limited to this arrangement and can also be provided in the host terminal 200, the printer server 300 or another terminal.

In the first to fifth embodiments, the printer server 300 is provided. However, structures other than these embodiments may be possible. Instead of providing the printer server 300, the functions of the printer server 300 can be provided in the host terminal 200.

In the first to fifth embodiments, the cases of executing the control program stored in advance in the ROM 52, 72 and 92 when executing the processing shown in the flowcharts of FIGS. 3, 5, 7, 10, 12, 14, 16, 17, 19, 20, 22, 23, 25, 26, 27 and 28 are described. However, constructions other than these embodiments may be possible. From a storage medium storing a program representing these procedures, the program may be read into the RAM 54, 74 or 94 and executed, as shown in FIG. 29.

Figure 29:
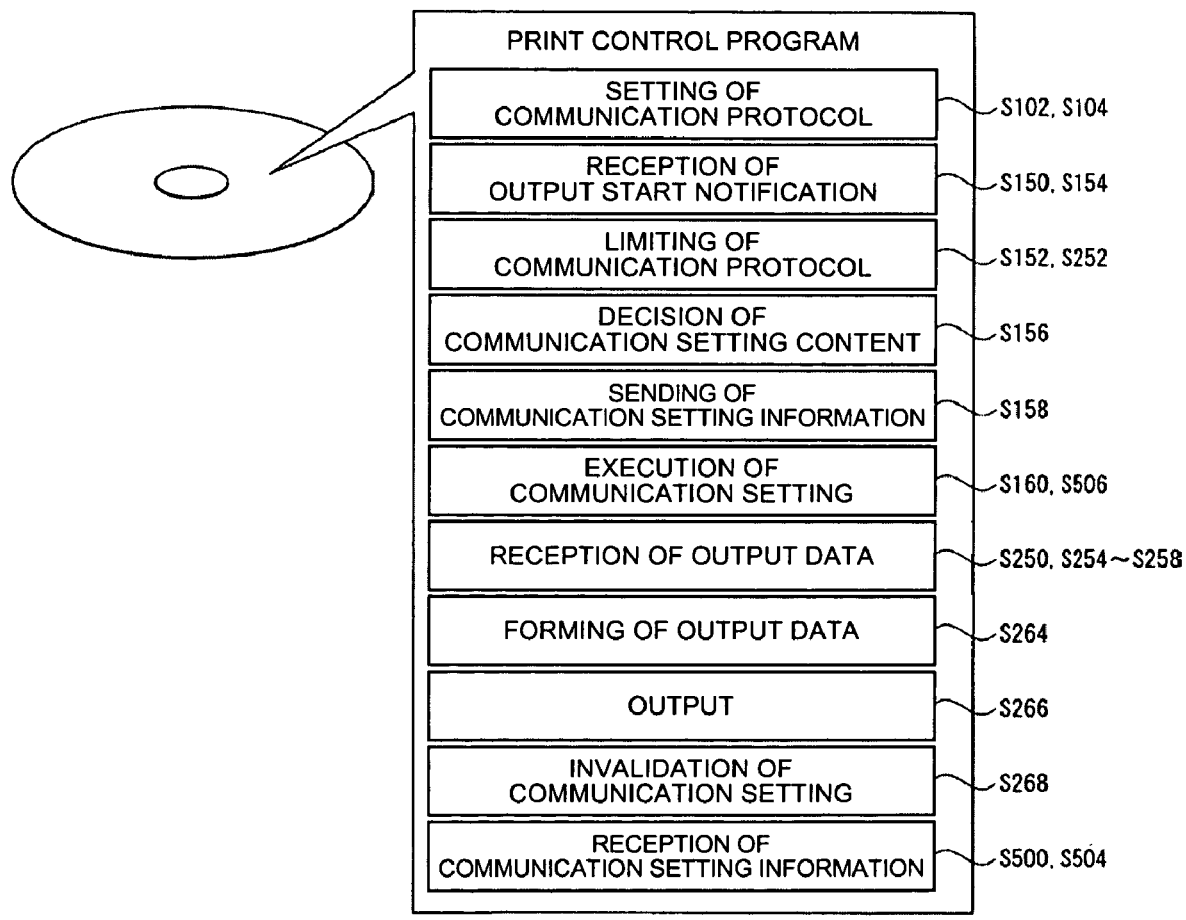
FIG. 29 shows a storage medium and its data structure.

FIG. 29 shows the storage medium and its data structure.

Here, the storage medium may be a semiconductor storage medium such as a RAM or ROM, a magnetic storage medium such as a FD or HD, an optically read storage medium such as a CD, CDV, LD or DVD, or a magneto-optically read storage medium such as a MO. It may include any storage medium as long as it is a computer-readable storage medium, whether it is read electronically, magnetically or optically.

In the first to fifth embodiments, a security output device, a security output system, an output device control program and storage medium, and a security output method according to the invention are applied to the case of performing security communication by the network printer 100 and thus performing printing. However, other cases can also be applied without departing from the scope of the invention. Instead of the network printer 100, for example, a projector, home gateway, personal computer, PDA (personal digital assistant), network storage, audio device, portable telephone, PHS (Personal Handyphone System) (registered trademark), watch-like PDA, STB (set-top box), POS (point of sale) terminal, FAX machine, telephone unit (including IP telephone) or other output devices.

What is claimed is:

1. A security output device comprising:
   an output data receiving unit that receives output data based on a communication setting related to setting of a communication path;
   an output unit that performs output based on the output data received by the output data receiving unit;
   an output start notification receiving unit that receives an output start notification indicating start of output of the output data;
   a communication setting content deciding unit that decides a content of the communication setting in accordance with the output start notification received by the output start notification receiving unit, wherein the communication setting is a setting related to setting a plurality of the communication paths,
   the output data receiving unit receives divided output data that are divided into plural data by a predetermined division technique, via the plural communication paths, wherein the predetermined division technique deciding division rates by issuing division numbers by a number of communication ports, uniformly allocating an initial rate to each division number, and adding a predetermined rate to a randomly selected division number, wherein the division rates represent data sizes to which output data should be divided in accordance with the number of communication ports; and
   a communication setting execution unit that executes the communication setting based on the content decided by the communication setting content deciding unit.

2. The security output device as claimed in claim 1, comprising a communication setting invalidating unit that invalidates the communication setting when at least one of:
   end of reception of the output data; and
   end of output by the output unit, is detected.

3. The security output device as claimed in claim 1, comprising a communication setting information sending unit that sends communication setting information representing the content of the communication setting performed by the communication setting execution unit to at least one of:
   a source of the output start notification; and
   a specified destination.

4. The security output device as claimed in claim 1, wherein
   the security output device comprises an output data forming unit that forms the output data based on each divided output data received by the output data receiving unit,
   the communication setting content deciding unit decides the plural communication paths, and
   the output unit performs output based on the output data formed by the output data forming unit.

5. The security output device as claimed in claim 4, wherein the communication setting content deciding unit decides the division rate of the output data, and
   the output data receiving unit receives the divided output data via the plural communication paths based on the division rate decided by the communication setting content deciding unit.

6. The security output device as claimed in claim 5, comprising a division rate information sending unit that sends division rate information representing the division rate decided by the communication setting content deciding unit to at least one of:
   a source of the output start notification; and
   a specific destination.

7. The security output device as claimed in claim 4, wherein the communication setting content deciding unit decides correspondence between the plural communication paths and the divided output data, and
   the output data forming unit combines the divided output data received by the output data receiving unit based on the correspondence decided by the communication setting content deciding unit.

8. The security output device as claimed in claim 7, comprising a communication path correspondence information sending unit that sends communication path correspondence information representing the correspondence decided by the communication setting content deciding unit to at least one of:
   a source of the output start notification; and
   a specific destination.

9. The security output device as claimed in claim 1, comprising:
   a communication protocol setting unit that sets a communication protocol for permitting communication; and
   a communication protocol limiting unit that rejects an access using communication protocols other than the communication protocol set by the communication protocol setting unit.

10. An output device control program stored on a non-transitory computer readable storage medium for causing a computer that operates as an output device to execute processing comprising:
    receiving an output start notification indicating start of output of output data;
    deciding a content of communication setting related to setting of a communication path in accordance with the output start notification received in the reception of the output start notification, wherein deciding the content of the communication setting is content related to setting a plurality of the communication paths;
    executing the communication setting based on the content decided in the decision of communication setting content;
    receiving the output data based on the communication setting, wherein the output data receiving unit receives divided output data that are divided into plural data by a predetermined division technique, via the plural communication paths, such that the predetermined division technique deciding division rates by issuing division numbers by a number of communication ports, uniformly allocating an initial rate to each division number, and adding a predetermined rate to a randomly selected division number, wherein the division rates represent data sizes to which output data should be divided in accordance with the number of communication ports; and
    performing output based on the output data received in the reception of the output data.

11. A non-transitory computer-readable storage medium storing an output device control program for causing a computer that operates as an output device to execute processing comprising:
    receiving an output start notification indicating start of output of output data;
    deciding a content of communication setting related to setting of a communication path in accordance with the output start notification received in the reception of the output start notification, wherein deciding the content of the communication setting is content related to setting a plurality of the communication paths;

executing the communication setting based on the content decided in the decision of communication setting content;

receiving the output data based on the communication setting, wherein the output data receiving unit receives divided output data that are divided into plural data by a predetermined division technique, via the plural communication paths, such that the predetermined division technique deciding division rates by issuing division numbers by a number of communication ports, uniformly allocating an initial rate to each division number, and adding a predetermined rate to a randomly selected division number, wherein the division rates represent data sizes to which output data should be divided in accordance with the number of communication ports; and performing output based on the output data received in the reception of the output data.

12. A security output method comprising:

receiving output data based on a communication setting related to setting of a communication path;

performing output based on the output data received in the reception of the output data;

receiving an output start notification indicating start of output of the output data;

deciding a content of the communication setting in accordance with the output start notification received in the reception of the output start notification, wherein deciding the content of the communication setting is content related to setting a plurality of the communication paths, the performing output receiving divided output data that are divided into plural data by a predetermined division technique, via the plural communication paths, wherein the predetermined division technique deciding division rates by issuing division numbers by a number of communication ports, uniformly allocating an initial rate to each division number, and adding a predetermined rate to a randomly selected division number, wherein the division rates represent data sizes to which output data should be divided in accordance with the number of communication ports; and executing the communication setting based on the content decided in the decision of the communication setting content.

13. A security output method comprising:

receiving output data based on a communication setting related to setting of a communication path, by a communication unit;

performing output based on the output data received in the reception of the output data, by an arithmetic operation unit;

receiving an output start notification indicating start of output of the output data, by the communication unit;

deciding a content of the communication setting in accordance with the output start notification received in the reception of the output start notification, by the arithmetic operation unit, wherein deciding the content of the communication setting is content related to setting a plurality of the communication paths, the performing output receiving divided output data that are divided into plural data by a predetermined division technique, via the plural communication paths, wherein the predetermined division technique deciding division rates by issuing division numbers by a number of communication ports, uniformly allocating an initial rate to each division number, and adding a predetermined rate to a randomly selected division number, wherein the division rates represent data sizes to which output data should be divided in accordance with the number of communication ports; and executing the communication setting based on the content decided in the decision of the communication setting content, by the arithmetic operation unit.

* * * * *